(12) United States Patent
Dooley et al.

(10) Patent No.: US 11,662,722 B2
(45) Date of Patent: May 30, 2023

(54) AUTONOMOUS MONITORING ROBOT SYSTEMS

(71) Applicant: iRobot Corporation, Bedford, MA (US)

(72) Inventors: Michael J. Dooley, Los Gatos, CA (US); Nikolai Romanov, Oak Park, CA (US); Orjeta Taka, Los Angeles, CA (US); Justin H. Kearns, Los Angeles, CA (US)

(73) Assignee: iRobot Corporation, Bedford, MA (US)

( * ) Notice: Subject to any disclaimer, the term of this patent is extended or adjusted under 35 U.S.C. 154(b) by 160 days.

(21) Appl. No.: 16/564,355

(22) Filed: Sep. 9, 2019

(65) Prior Publication Data

US 2020/0001475 A1 Jan. 2, 2020

Related U.S. Application Data

(63) Continuation of application No. 15/404,455, filed on Jan. 12, 2017, now Pat. No. 10,471,611.

(Continued)

(51) Int. Cl.
*H04N 7/18* (2006.01)
*G05D 1/00* (2006.01)
(Continued)

(52) U.S. Cl.
CPC .......... *G05D 1/0038* (2013.01); *B25J 19/023* (2013.01); *G05D 1/0088* (2013.01);
(Continued)

(58) Field of Classification Search
CPC ............ B25J 19/023; H04N 5/232933; H04N 5/23216; H04N 5/23293; H04N 5/2252;
(Continued)

(56) References Cited

U.S. PATENT DOCUMENTS 4,574,268 A * 3/1986 Ohnishi .............. B60R 25/1001
180/173
4,777,416 A 10/1988 George et al.
(Continued)

FOREIGN PATENT DOCUMENTS

CN 200285305 3/2002
CN 101866396 10/2010
(Continued)

OTHER PUBLICATIONS

"Appbot Link: App Controlled Robot + IP Camera :: Gadgetrfy.com," accessed online on Jun. 15, 2016, http:www.gadgetify.com/appbot-link-wifi-robot/, dated Jul. 24, 2015, 1 page.
(Continued)

*Primary Examiner* — Khoi H Tran
*Assistant Examiner* — Jorge O Peche
(74) *Attorney, Agent, or Firm* — Fish & Richardson P.C.

(57) ABSTRACT

An autonomous mobile robot includes a chassis, a drive supporting the chassis above a floor surface in a home and configured to move the chassis across the floor surface, a variable height member being coupled to the chassis and being vertically extendible, a camera supported by the variable height member, and a controller. The controller is configured to operate the drive to navigate the robot to locations within the home and to adjust a height of the variable height member upon reaching a first of the locations. The controller is also configured to, while the variable height member is at the adjusted height, operate the camera to capture digital imagery of the home at the first of the locations.

28 Claims, 33 Drawing Sheets

Related U.S. Application Data

(60) Provisional application No. 62/375,842, filed on Aug. 16, 2016, provisional application No. 62/279,560, filed on Jan. 15, 2016.

(51) Int. Cl.
*H04N 23/51* (2023.01)
*H04N 23/57* (2023.01)
*H04N 23/62* (2023.01)
*H04N 23/63* (2023.01)
*H04N 23/661* (2023.01)
*B25J 19/02* (2006.01)
*G06V 20/10* (2022.01)

(52) U.S. Cl.
CPC ............ *H04N 7/185* (2013.01); *H04N 23/51* (2023.01); *H04N 23/57* (2023.01); *H04N 23/62* (2023.01); *H04N 23/63* (2023.01); *H04N 23/631* (2023.01); *H04N 23/661* (2023.01); *G05D 2201/0209* (2013.01); *G06V 20/10* (2022.01)

(58) Field of Classification Search
CPC .. H04N 5/2257; H04N 5/23206; H04N 7/185; G05D 1/0038; G05D 1/0088; G05D 2201/0209; G06K 9/52; G06K 9/00664
See application file for complete search history.

(56) References Cited

U.S. PATENT DOCUMENTS

| | | | |
|---|---|---|---|
| 4,815,757 A * | 3/1989 | Hamilton | B60S 9/06 348/148 |
| 4,857,912 A | 8/1989 | Everett et al. | |
| 5,084,828 A | 1/1992 | Kaufman et al. | |
| 5,201,814 A | 4/1993 | Kitchell et al. | |
| 5,448,696 A | 9/1995 | Shimada et al. | |
| 5,473,368 A * | 12/1995 | Hart | G09F 27/00 348/169 |
| 5,475,378 A * | 12/1995 | Kaarsoo | G07F 17/13 235/382 |
| 5,634,237 A * | 6/1997 | Paranjpe | G05D 1/0221 15/340.1 |
| 5,732,401 A | 3/1998 | Conway | |
| 5,780,787 A * | 7/1998 | Kamani | B66B 13/143 187/390 |
| 5,793,900 A | 8/1998 | Nourbakhsh et al. | |
| 5,802,494 A | 9/1998 | Kuno | |
| 5,808,663 A | 9/1998 | Okaya | |
| 5,835,022 A * | 11/1998 | Amano | G07C 9/00182 340/5.72 |
| 5,905,653 A * | 5/1999 | Higham | G07F 17/0092 700/242 |
| 6,072,489 A * | 6/2000 | Gough | G09G 5/395 715/803 |
| 6,198,537 B1 * | 3/2001 | Bokelman | G01N 21/89 356/429 |
| 6,208,379 B1 | 3/2001 | Oya et al. | |
| 6,272,237 B1 | 8/2001 | Hashima | |
| 6,292,713 B1 | 9/2001 | Jouppi | |
| 6,389,329 B1 | 5/2002 | Colens | |
| 6,415,203 B1 | 7/2002 | Inoue et al. | |
| 6,445,978 B1 | 9/2002 | Takamura et al. | |
| 6,454,708 B1 | 9/2002 | Ferguson et al. | |
| 6,509,926 B1 | 1/2003 | Mills et al. | |
| 6,529,234 B2 | 3/2003 | Urisaka et al. | |
| 6,532,404 B2 | 3/2003 | Colens | |
| 6,542,788 B2 | 4/2003 | Hosonuma et al. | |
| 6,594,844 B2 | 7/2003 | Jones | |
| 6,658,325 B2 | 12/2003 | Zweig | |
| 6,690,134 B1 | 2/2004 | Jones et al. | |
| 6,718,232 B2 | 4/2004 | Fujita et al. | |
| 6,781,338 B2 | 8/2004 | Jones et al. | |
| 6,809,490 B2 | 10/2004 | Jones et al. | |
| 6,914,622 B1 | 7/2005 | Smith | |
| 6,917,855 B2 | 7/2005 | Gonzalez-Banos et al. | |
| 6,925,357 B2 * | 8/2005 | Wang | H04N 7/142 700/261 |
| 6,965,209 B2 | 11/2005 | Jones et al. | |
| 6,980,956 B1 | 12/2005 | Takagi et al. | |
| 7,015,831 B2 * | 3/2006 | Karlsson | G05D 1/0246 340/988 |
| 7,037,038 B1 * | 5/2006 | Haski | E04H 4/1263 405/60 |
| 7,117,190 B2 | 10/2006 | Sabe et al. | |
| 7,123,285 B2 | 10/2006 | Smith et al. | |
| 7,136,090 B1 * | 11/2006 | McDuffie White | H04N 7/144 348/E13.058 |
| 7,155,308 B2 | 12/2006 | Jones | |
| 7,173,391 B2 | 2/2007 | Jones et al. | |
| 7,196,487 B2 | 3/2007 | Jones et al. | |
| 7,199,817 B2 | 4/2007 | Mottur et al. | |
| 7,228,203 B2 | 6/2007 | Koselka et al. | |
| 7,289,881 B2 | 10/2007 | Ota et al. | |
| 7,289,883 B2 | 10/2007 | Wang et al. | |
| 7,332,890 B2 | 2/2008 | Cohen et al. | |
| 7,340,100 B2 | 3/2008 | Higaki et al. | |
| 7,388,343 B2 | 6/2008 | Jones et al. | |
| 7,388,879 B2 | 6/2008 | Sabe et al. | |
| 7,388,981 B2 | 6/2008 | Jouppi | |
| 7,389,156 B2 | 6/2008 | Ziegler et al. | |
| 7,430,455 B2 | 9/2008 | Casey et al. | |
| 7,448,113 B2 | 11/2008 | Jones et al. | |
| 7,467,026 B2 | 12/2008 | Sakagami et al. | |
| 7,484,391 B1 * | 2/2009 | Moore | E05B 81/58 292/155 |
| 7,515,992 B2 | 4/2009 | Sawada et al. | |
| 7,551,980 B2 | 6/2009 | Sakagami et al. | |
| 7,571,511 B2 | 8/2009 | Jones et al. | |
| 7,593,546 B2 | 9/2009 | Jouppi | |
| 7,624,438 B2 | 11/2009 | White et al. | |
| 7,636,982 B2 | 12/2009 | Jones et al. | |
| 7,643,051 B2 | 1/2010 | Sandberg et al. | |
| 7,702,420 B2 | 4/2010 | Goto et al. | |
| 7,706,917 B1 | 4/2010 | Chiappetta et al. | |
| 7,761,954 B2 | 7/2010 | Ziegler | |
| 8,077,963 B2 | 12/2011 | Wang et al. | |
| 8,359,122 B2 | 1/2013 | Koselka et al. | |
| 8,515,577 B2 | 8/2013 | Wang et al. | |
| 8,704,793 B1 * | 4/2014 | Artino | G07C 9/15 235/382 |
| 8,918,209 B2 * | 12/2014 | Rosenstein | G06T 7/521 700/250 |
| 9,198,728 B2 | 12/2015 | Wang | |
| 9,344,561 B2 * | 5/2016 | Wohlert | H04W 4/029 |
| 9,396,599 B1 * | 7/2016 | Malhotra | H04W 12/08 |
| 9,611,579 B2 * | 4/2017 | Brasseur | D06F 34/28 |
| 9,934,657 B2 * | 4/2018 | Tkachenko | G07F 9/002 |
| 10,112,539 B2 * | 10/2018 | Kameshima | B60K 35/00 |
| 10,471,611 B2 | 11/2019 | Dooley et al. | |
| 10,798,188 B2 * | 10/2020 | Shin | H04W 4/48 |
| 10,924,603 B1 * | 2/2021 | Clements | G06Q 20/18 |
| 11,557,156 B1 * | 1/2023 | Knas | G06T 19/20 |
| 2001/0020837 A1 | 9/2001 | Yamashita et al. | |
| 2001/0024233 A1 | 9/2001 | Urisaka et al. | |
| 2001/0026248 A1 * | 10/2001 | Goren | G09G 5/00 283/17 |
| 2001/0037163 A1 * | 11/2001 | Allard | G05D 1/0282 700/245 |
| 2002/0016649 A1 | 2/2002 | Jones | |
| 2002/0097322 A1 | 7/2002 | Monroe et al. | |
| 2002/0103576 A1 | 8/2002 | Takamura et al. | |
| 2002/0120364 A1 | 8/2002 | Colens | |
| 2002/0128746 A1 * | 9/2002 | Boies | G06N 3/008 700/245 |
| 2002/0165790 A1 | 11/2002 | Bancroft et al. | |
| 2002/0199007 A1 | 12/2002 | Clayton | |
| 2003/0023348 A1 | 1/2003 | Inoue et al. | |
| 2003/0025472 A1 | 2/2003 | Jones et al. | |
| 2003/0037250 A1 | 2/2003 | Walker | |
| 2003/0045203 A1 | 3/2003 | Sabe et al. | |

(56) References Cited

U.S. PATENT DOCUMENTS

| | | |
|---|---|---|
| 2003/0060930 A1 | 3/2003 | Fujita et al. |
| 2003/0078696 A1 | 4/2003 | Sakamoto et al. |
| 2003/0109960 A1 | 6/2003 | Nourbakhsh et al. |
| 2003/0137268 A1 | 7/2003 | Papanikolopoulos et al. |
| 2003/0151658 A1 | 8/2003 | Smith |
| 2003/0167403 A1 | 9/2003 | McCurley |
| 2003/0182117 A1 | 9/2003 | Monchi et al. |
| 2003/0185556 A1 | 10/2003 | Stiepel et al. |
| 2003/0216834 A1* | 11/2003 | Allard ............... B25J 9/1689 700/245 |
| 2003/0229474 A1* | 12/2003 | Suzuki ............... G08B 25/009 702/188 |
| 2004/0019406 A1 | 1/2004 | Wang et al. |
| 2004/0020000 A1 | 2/2004 | Jones |
| 2004/0049877 A1 | 3/2004 | Jones et al. |
| 2004/0073368 A1 | 4/2004 | Gonzalez-Banos et al. |
| 2004/0078219 A1 | 4/2004 | Kaylor et al. |
| 2004/0089090 A1 | 5/2004 | Maeda |
| 2004/0093650 A1 | 5/2004 | Martins et al. |
| 2004/0102166 A1 | 5/2004 | Morita |
| 2004/0111273 A1 | 6/2004 | Sakagami et al. |
| 2004/0113777 A1 | 6/2004 | Matsuhira et al. |
| 2004/0117063 A1 | 6/2004 | Sabe et al. |
| 2004/0137911 A1 | 7/2004 | Hull et al. |
| 2004/0174129 A1 | 9/2004 | Wang et al. |
| 2004/0187457 A1 | 9/2004 | Colens |
| 2004/0202351 A1 | 10/2004 | Park et al. |
| 2004/0207355 A1 | 10/2004 | Jones et al. |
| 2004/0210347 A1 | 10/2004 | Sawada et al. |
| 2005/0009469 A1 | 1/2005 | Kotola |
| 2005/0026631 A1 | 2/2005 | Hull |
| 2005/0035862 A1* | 2/2005 | Wildman ............ G08B 13/2462 340/572.1 |
| 2005/0046373 A1 | 3/2005 | Aldred |
| 2005/0067994 A1 | 3/2005 | Jones et al. |
| 2005/0071047 A1* | 3/2005 | Okabayashi ......... G05D 1/0038 700/245 |
| 2005/0075759 A1* | 4/2005 | Furuta ............... G11B 27/34 701/538 |
| 2005/0091684 A1 | 4/2005 | Kawabata et al. |
| 2005/0125098 A1 | 6/2005 | Wang et al. |
| 2005/0156562 A1 | 7/2005 | Cohen et al. |
| 2005/0171636 A1 | 8/2005 | Tani |
| 2005/0197739 A1 | 9/2005 | Noda et al. |
| 2005/0204717 A1 | 9/2005 | Colens |
| 2005/0213082 A1* | 9/2005 | DiBernardo ............ G01C 3/06 356/139.03 |
| 2005/0216124 A1 | 9/2005 | Suzuki |
| 2005/0216126 A1 | 9/2005 | Koselka et al. |
| 2005/0222711 A1* | 10/2005 | Yoshimi ............. B25J 9/0003 700/245 |
| 2005/0231357 A1 | 10/2005 | Kanayama et al. |
| 2005/0234729 A1 | 10/2005 | Scholl |
| 2005/0251292 A1 | 11/2005 | Casey et al. |
| 2006/0005254 A1 | 1/2006 | Ross |
| 2006/0006316 A1 | 1/2006 | Takenaka |
| 2006/0041333 A1 | 2/2006 | Anezaki |
| 2006/0047803 A1 | 3/2006 | Shaik |
| 2006/0051084 A1* | 3/2006 | Sandhu ............... G03B 15/00 396/428 |
| 2006/0052676 A1 | 3/2006 | Wang et al. |
| 2006/0082642 A1 | 4/2006 | Wang |
| 2006/0091297 A1 | 5/2006 | Anderson et al. |
| 2006/0122712 A1* | 6/2006 | Sugiyama ............ G05B 19/042 700/19 |
| 2006/0129848 A1 | 6/2006 | Paksoy |
| 2006/0178777 A1* | 8/2006 | Park ............... H04L 12/2818 704/275 |
| 2006/0195226 A1 | 8/2006 | Matsukawa et al. |
| 2006/0217837 A1 | 9/2006 | Koga et al. |
| 2006/0238159 A1* | 10/2006 | Jung ............... G05D 1/0225 318/587 |
| 2006/0259193 A1 | 11/2006 | Wang et al. |
| 2007/0008918 A1 | 1/2007 | Stanforth |
| 2007/0027579 A1 | 2/2007 | Suzuki et al. |
| 2007/0043459 A1 | 2/2007 | Abbott et al. |
| 2007/0046237 A1 | 3/2007 | Lakshmanan et al. |
| 2007/0055116 A1 | 3/2007 | Clark et al. |
| 2007/0060105 A1 | 3/2007 | Batta |
| 2007/0061041 A1 | 3/2007 | Zweig |
| 2007/0064092 A1 | 3/2007 | Sandberg et al. |
| 2007/0198130 A1 | 8/2007 | Wang et al. |
| 2007/0266508 A1 | 11/2007 | Jones et al. |
| 2008/0027590 A1* | 1/2008 | Phillips ............... G05D 1/0088 701/2 |
| 2008/0055409 A1 | 3/2008 | Mars et al. |
| 2008/0086241 A1* | 4/2008 | Phillips ............... G05D 1/0038 701/2 |
| 2008/0140255 A1 | 6/2008 | Ziegler et al. |
| 2008/0155768 A1 | 7/2008 | Ziegler et al. |
| 2008/0215185 A1* | 9/2008 | Jacobsen ............... F41H 11/16 901/14 |
| 2008/0289383 A1* | 11/2008 | Levine ............... E05B 41/00 70/432 |
| 2008/0307590 A1 | 12/2008 | Jones et al. |
| 2009/0249222 A1 | 10/2009 | Schmidt et al. |
| 2009/0292393 A1 | 11/2009 | Casey et al. |
| 2010/0030380 A1* | 2/2010 | Shah ............... G01S 17/48 901/1 |
| 2010/0049365 A1 | 2/2010 | Jones et al. |
| 2010/0067801 A1* | 3/2010 | van den Hengel ......... G08B 13/19645 382/190 |
| 2010/0079413 A1* | 4/2010 | Kawashima ......... G06F 3/04883 715/781 |
| 2010/0082156 A1 | 4/2010 | Root et al. |
| 2010/0118112 A1 | 5/2010 | Nimri et al. |
| 2010/0183422 A1* | 7/2010 | Makela ............... G01C 21/12 414/800 |
| 2010/0204865 A1 | 8/2010 | Nakamura ............. B60L 50/16 348/148 |
| 2010/0257690 A1 | 10/2010 | Jones et al. |
| 2010/0257691 A1 | 10/2010 | Jones et al. |
| 2010/0263158 A1 | 10/2010 | Jones et al. |
| 2011/0218674 A1* | 9/2011 | Stuart ............... G16H 30/20 700/259 |
| 2012/0109376 A1* | 5/2012 | Lee ............... G05D 1/0219 700/258 |
| 2012/0113261 A1* | 5/2012 | Satoh ............... B60R 1/00 348/148 |
| 2012/0159597 A1 | 6/2012 | Thomas et al. |
| 2012/0293642 A1* | 11/2012 | Berini ............... G06F 21/6245 348/77 |
| 2012/0323690 A1* | 12/2012 | Michael ............... G01C 21/3605 705/14.58 |
| 2013/0056032 A1 | 3/2013 | Choe et al. |
| 2013/0063601 A1* | 3/2013 | Wakabayashi ............ B60R 1/00 348/148 |
| 2013/0117867 A1 | 5/2013 | Fung |
| 2013/0217421 A1* | 8/2013 | Kim ............... H04W 84/005 455/456.3 |
| 2013/0222592 A1* | 8/2013 | Gieseke ............ G08G 1/096708 348/148 |
| 2013/0231779 A1* | 9/2013 | Purkayastha ............ B25J 9/1697 700/258 |
| 2013/0245827 A1* | 9/2013 | Shetty ............... G05D 1/0246 700/259 |
| 2013/0326839 A1* | 12/2013 | Cho ............... G05D 1/0246 701/2 |
| 2014/0009561 A1 | 1/2014 | Sutherland |
| 2014/0120905 A1* | 5/2014 | Kim ............... H04W 4/80 455/426.1 |
| 2014/0122116 A1 | 5/2014 | Smythe |
| 2014/0247116 A1* | 9/2014 | Davidson ............ G05D 1/0261 901/1 |
| 2014/0324271 A1* | 10/2014 | Oh ............... G05D 1/0251 701/28 |
| 2015/0095115 A1* | 4/2015 | Hyde ............... G06Q 10/0639 705/7.38 |
| 2015/0095116 A1* | 4/2015 | Hyde ............... B60L 53/665 705/7.38 |

(56) References Cited

U.S. PATENT DOCUMENTS

| | | | |
|---|---|---|---|
| 2015/0224640 A1 | 8/2015 | Cross et al. | |
| 2015/0234386 A1* | 8/2015 | Zini | G05D 1/0225 701/25 |
| 2015/0325067 A1* | 11/2015 | Lee | G07C 9/257 340/5.65 |
| 2015/0343644 A1* | 12/2015 | Slawinski | B60L 15/40 701/2 |
| 2016/0004140 A1* | 1/2016 | Tada | G03B 17/48 396/2 |
| 2016/0147390 A1* | 5/2016 | You | H04W 4/70 715/740 |
| 2016/0171303 A1* | 6/2016 | Moore | A61F 9/08 901/1 |
| 2016/0274762 A1* | 9/2016 | Lopez | G06T 19/006 |
| 2016/0309974 A1* | 10/2016 | Abe | A47L 11/24 |
| 2016/0350988 A1* | 12/2016 | Malhotra | G07C 9/28 |
| 2016/0378084 A1* | 12/2016 | Park | G05B 15/02 700/275 |
| 2017/0066375 A1* | 3/2017 | Kato | G06V 20/58 |
| 2017/0148243 A1* | 5/2017 | Shin | G07C 9/28 |
| 2017/0203446 A1 | 7/2017 | Dooley et al. | |
| 2017/0225321 A1* | 8/2017 | Deyle | G06K 7/10297 |
| 2017/0256165 A1* | 9/2017 | Pennington | G06V 20/586 |
| 2017/0361468 A1* | 12/2017 | Cheuvront | G06F 3/01 |
| 2017/0372550 A1* | 12/2017 | Lin | H04W 4/90 |
| 2018/0035606 A1* | 2/2018 | Burdoucci | A01D 34/84 |
| 2018/0043543 A1* | 2/2018 | Buibas | G01B 11/14 |
| 2018/0050634 A1* | 2/2018 | White | G05D 1/0016 |
| 2018/0086271 A1* | 3/2018 | Kosugi | G06T 11/00 |
| 2018/0225422 A1* | 8/2018 | Feldman | G07C 9/00912 |
| 2018/0241938 A1* | 8/2018 | Buibas | B25J 9/1697 |
| 2018/0282117 A1* | 10/2018 | Baldi | B66B 13/165 |
| 2018/0319337 A1* | 11/2018 | Nagai | G01S 17/931 |
| 2018/0321687 A1* | 11/2018 | Chambers | G05D 1/0285 |
| 2018/0357400 A1* | 12/2018 | Astrakhantsev | G06F 21/30 |
| 2019/0012860 A1* | 1/2019 | Lee | H04W 4/00 |
| 2019/0052714 A1* | 2/2019 | Shin | H04L 67/1095 |
| 2019/0098260 A1* | 3/2019 | Glazer | A61B 5/4809 |
| 2019/0124301 A1* | 4/2019 | Yoshii | H04N 7/183 |
| 2019/0208024 A1* | 7/2019 | Jablonski | H04L 67/12 |
| 2019/0333954 A1* | 10/2019 | Wakiyama | A61B 1/04 |
| 2019/0368227 A1* | 12/2019 | Tabib | E05B 45/06 |
| 2020/0001475 A1* | 1/2020 | Dooley | B25J 19/023 |
| 2020/0151974 A1* | 5/2020 | Ghosh | G07C 5/0866 |
| 2020/0156543 A1* | 5/2020 | Kubota | B60R 1/006 |
| 2020/0180619 A1* | 6/2020 | Lee | B62D 15/025 |
| 2020/0180656 A1* | 6/2020 | Kim | B60W 30/0956 |
| 2020/0184654 A1* | 6/2020 | Kim | G06T 7/74 |
| 2020/0361382 A1* | 11/2020 | Kondo | B60R 1/00 |
| 2020/0398824 A1* | 12/2020 | Tsujino | B60W 60/0025 |
| 2021/0046655 A1* | 2/2021 | Deyle | B25J 9/1697 |
| 2021/0048829 A1* | 2/2021 | Deyle | G05D 1/0246 |
| 2021/0051264 A1* | 2/2021 | Prabhakar | H04N 23/745 |
| 2021/0082215 A1* | 3/2021 | Lee | G06F 3/04883 |
| 2021/0179072 A1* | 6/2021 | Yamanaka | B62D 15/0285 |
| 2021/0214970 A1* | 7/2021 | Yang | G07C 9/00309 |
| 2021/0230903 A1* | 7/2021 | Fournier | E05B 41/00 |
| 2021/0279913 A1* | 9/2021 | Hortop | G06T 11/00 |
| 2021/0370920 A1* | 12/2021 | Sakaguchi | B60W 30/08 |
| 2022/0005332 A1* | 1/2022 | Metzler | G08B 13/1968 |
| 2022/0063509 A1* | 3/2022 | Matori | B60Q 1/503 |
| 2022/0141426 A1* | 5/2022 | Kim | G06V 20/56 348/148 |
| 2022/0151419 A1* | 5/2022 | Lee | G07C 9/00912 |
| 2022/0155005 A1* | 5/2022 | Lee | F25D 29/00 |
| 2022/0335728 A1* | 10/2022 | Kim | G06V 20/58 |
| 2022/0345606 A1* | 10/2022 | Sato | H04N 23/12 |
| 2023/0077804 A1* | 3/2023 | Choi | B60K 35/00 |

FOREIGN PATENT DOCUMENTS

| | | | |
|---|---|---|---|
| CN | 102933428 A * | 2/2013 | B60R 1/00 |
| CN | 103459099 | 12/2013 | |
| CN | 103926912 | 7/2014 | |
| CN | 104142643 | 11/2014 | |
| CN | 104144326 | 11/2014 | |
| CN | 104470685 | 3/2015 | |
| CN | 104647340 | 5/2015 | |
| CN | 104772760 | 7/2015 | |
| CN | 105814555 A * | 7/2016 | G05B 11/01 |
| CN | 108632530 A * | 10/2018 | G06K 9/00825 |
| CN | 108885436 A * | 11/2018 | B25J 19/023 |
| CN | 109345662 A * | 2/2019 | |
| CN | 110347259 A * | 10/2019 | |
| CN | 110636261 A * | 12/2019 | H04N 5/23203 |
| CN | 114758100 A * | 7/2022 | |
| EP | 1 548 532 | 6/2005 | |
| EP | 1553536 | 7/2005 | |
| JP | 11104984 A * | 4/1999 | |
| JP | 2002046088 | 2/2002 | |
| JP | 2002085305 | 3/2002 | |
| JP | 2002262282 A * | 9/2002 | |
| JP | 2003291084 | 10/2003 | |
| JP | 2009509673 A * | 3/2009 | |
| JP | 2009229286 A * | 10/2009 | |
| JP | WO2016103938 A1 * | 9/2017 | |
| JP | 2019160302 A * | 9/2019 | G06Q 50/30 |
| JP | 6649120 B2 * | 2/2020 | G01R 27/04 |
| JP | 6977535 B2 * | 12/2021 | B60R 11/02 |
| KR | 20090120618 A * | 11/2009 | |
| KR | 101606162 B1 * | 4/2016 | |
| KR | 20170090170 A * | 8/2017 | |
| KR | 20200070101 A * | 6/2020 | |
| KR | 102231105 B1 * | 3/2021 | |
| TW | I598735 B * | 9/2017 | |
| WO | WO-2007041295 A2 * | 4/2007 | |
| WO | WO-2012041221 A1 * | 4/2012 | G01C 21/36 |
| WO | WO-2017123761 A1 * | 7/2017 | B25J 19/023 |
| WO | WO-2018179591 A1 * | 10/2018 | G06F 13/00 |

OTHER PUBLICATIONS

"Double Robotics review: Why go to the office when a robot can go for you?," accessed online Jun. 15, 2016, http://www.macworld.com/article/2051342/double-robotics-review-why-go-to-the-office-when-a-robot-can-go-for-you.html, dated Oct. 16, 2013, 5 pages.

"Facts on the Trilobite," Electrolux, accessed online <http://trilobite.electrolux.se/presskit_en/node1335.asp?print=yes&pressID=> Dec. 12, 2003, 2 pages.

"JSW S+ protects your home from intruders and dust," Intelligent Tech, accessed online on Sep. 21, 2017, https://www.kickstarter.com/protects/694663843/jsw-s-protects-your-home-from-intruders, dated Sep. 29, 2015 18 pages.

"LG Rolling Bot: This cute ball will watch your house and keep your pets busy," accessed online on Jun. 15, 2016, http://www.cnet.com/products/lg-rolling-bot/, dated Feburary 21, 2016, 2 pages.

"LG's robot vacuum gets cleaning instructions from your phone's camera," accessed online on Jun. 15, 2016, http://www.techhive.com/article/3017573/smart-appliance/lg-s-robot-vacuum-gets-cleaning-instructions-from-your-phone-s-camera.html, dated Dec. 21, 2015, 2 pages.

"Meet iRobot, the smartest webcam on wheels," Telefriend, Wired Magazine, Issue 8.09, Sep. 2000, 4 pages.

"Meet Zenbo, Asus's $599 Home Robot," accessed online on Jun. 15, 2016, http:fortune.com/2016/05/30/asus-senbo-robot/, dated May 30, 2016, 2 pages.

"Orbii: A Mobile Home Security Robot with HD Video," accessed online on Jun. 15, 2016, http://www.indiegogo.com/projects/orbii-a-mobile-home-security-robot-with-hd-video#/, dated May 2016, 25 pages.

"Roambotics Jr. unicycle robot wants to play security guard," accessed online on Jun. 15, 2016, http://www.slashgear.com/roambotics-jr-unicycle-robot-wants-to-play-security-guard-05339939/, dated Aug. 5, 2014, 3 pags.

"This autonomous smart home bot looks kind of creepy," accessed online on Jun. 15, 2016, http://www.cnet.com/products/blue-frog-robotics-buddy/, dated Aug. 11, 2015, 2 pages.

"This Invention Will Change The Way You Watch Movies (And More)," accessed online on Jun. 15, 2016, http://www.huffingtonpost.com/2014/01/16/keecker-robitic-butler_n_4604832.html, dated Jan. 16, 2014, 1 page.

(56) References Cited

OTHER PUBLICATIONS

"Welcome to the Electrolux Trilobite," Electrolux, accessed online <http://electroluxusa.com/node57.asp?currentURL=node142.asp%3F> Mar. 18, 2005, 2 pages.
Aly et al., "CompactKdt: Compact Signatures for Accurate Large Scale Object Recognition," IEEE Workshop on Applications of Computer Vision (WACV), Colorado, Jan. 2012, pp. 505-512.
Baker et al., "PCASSO: Applying and Extending State-of-the-Art Security in the Healthcare Domain," 1997 ACSA conf. Pgs.
Baltus et al., "Towards Personal Service Robots for the Elderly," Computer Science and Robotics, 2002.
Brooks, "Sections from "Flesh & Machines, How Robots will Change Us" Remote Presence," p. 131-147 Feb. 2002.
Doty, K. L., and Harrison, R. R., "Sweep Strategies for a Sensory-Driven, Behavior-Based Vacuum Cleaning Agent," AAAI 1993 Fall Symposium Series, Instantiating Real-World Agents, Research Triangle Park, Raleigh, NC, Oct. 22-24, 1993, pp. 1-6.
European Office Action in European Application No. 17738933.5, dated Aug. 5, 2019, 5 pages.
Everett, H.R., "Sensors for Mobile Robots," AK Peters, Ltd., Wellesley, MA. (1995).
Goel et al., "Systematic Floor Coverage of Unknown Environments Using Rectangular Regions and Localization Certainty," 2013 IEEE/RSJ International Conference on Intelligent Robots and Systems (IROS 2013), Tokyo, Japan, Nov. 3-7, 2013, pp. 1-8.
Goncalves et al., "A Visual Front-end for Simultaneous Localization and Mapping," Proceedings of the 2005 IEEE International Conference on Robotics and Automation, Barcelona, Spain, Apr. 2005, pp. 44-49.
Gutmann et al., "A Constant-Time Algorithm for Vector Field SLAM Using an Exactly Sparse Extended Information Filter," IEEE Transactions on Robotics (vol. 28, Issue: 3), Jan. 2, 2012, pp. 650-667.
Gutmann et al., "Challenges of designing a low-cost indoor localization system using active beacons," Technologies for Practical Robot Applications (TePRA), 2013 IEEE International Conference on, Apr. 22-23, 2013, pp. 1-6.
Gutmann et al., "Localization in a vector field map," 2012 IEEE/RSJ International Conference on Intelligent Robots and Systems, pp. 3144-3151.
Gutmann et al., "The Social Impact of a Systematic Floor Cleaner," Advanced Robotics and its Social Impacts (ARSO), 2012 IEEE Workshop on, 2012, pp. 50-53.
Gutmann et al., "Vector Field SLAM," IEEE Transactions on Robotics, 2012, pp. 650-667.
Hitachi: News release: The home cleaning robot of the autonomous movement type (experimental machine) is developed. May 29, 2003. Accessed online Mar. 18, 2005 <http://www.i4u.com/japanreleases/hitachirobot.htm> 5 pages.
Honda Motor Co., Ltd., English Translation of JP11212642, Aug. 9, 1999, 31 pages.
Hornyak, "Famibot patrols your home and cleans your air," CNET, accessed online on Jun. 15, 2016, http://www.cnet.com/news/famibot-patrols-yom-home-and-cleans-your-air/, dated Jan. 8, 2013, 6 pages.
International Search Report and Written Opinion in International Application No. PCT/US2017/13195, dated May 15, 2017, 5 pages.
Jeong, WooYeon et al., "CV-SLAM: A new Ceiling Vision-based SLAM technique," 2005 IEEE/RSJ International Conference on Intelligent Robots and Systems, Aug. 2-6, 2005, pp. 3195-3200.
Jones, J., Roth, D. (Jan. 2, 2004). Robot Programming: A Practical Guide to Behavior-Based Robotics. McGraw-Hill Education TAB; 288 pages.
Karcher RC 3000 Robotic Cleaner, Product page, accessed online <http://www.karcher-usa.com/showproducts.php?op=view_prod&param1=143&param2=&param3=> Mar. 18, 2005, 3 pages.
Karcher RoboCleaner RC 3000, Dec. 12, 2003, 4 pages.
Karcher, Product Manual Download, 2003, 16 pages.
Karlsson et al., "The vSLAM Algorithm for Navigation in Natural Environments," Korean Robotics Society Review, vol. 2, No. 1, pp. 51-67, 2005.
Masys et al. "Patient-Centered Access to Secure Systems Online (PCASSO): A Secure Approach to Clinical Data Access via the World Wide Web," Proc pf 1997 AMIA Fall Symp. pp. 340-343.
Munich et al., "Application of Visual Pattern Recognition to Robotics and Automation," IEEE Robotics & Automation Magazine, pp. 72-77, 2006.
Munich et al., "SIFT-ing Through Features with ViPR," IEEE Robotics & Automation Magazine, Sep. 2006, pp. 72-77.
Prassler, et al., English Translation of DE19849978, Feb. 8, 2001, 16 pages.
Stanford, "Pervasive Health Care Applications Face Tough Security Challenges," Pervasive Computing, 2002 IEEE, pp. 8-12.
Urquart, "InTouch's robotic Companion 'beams up' healthcare experts", Medical Device Daily, vol. 7, No. 39, Feb. 27, 2003, p. 1,4.
Yamamoto et al., "Optical Sensing for Robot Perception and Localization," IEEE Workshop on Advanced Robotics and its Social Impacts, 2005, Jun. 12-15, 2005, pp. 14-17.
PCT International Preliminary Report on Patentability received for PCT Patent Application No. PCT/US2017/013195, dated Jul. 26, 2018, 9 pages.
EP Extended European Search Report in European Appln. No. 17738933.5, dated Aug. 18, 2019, 7 pages.

\* cited by examiner

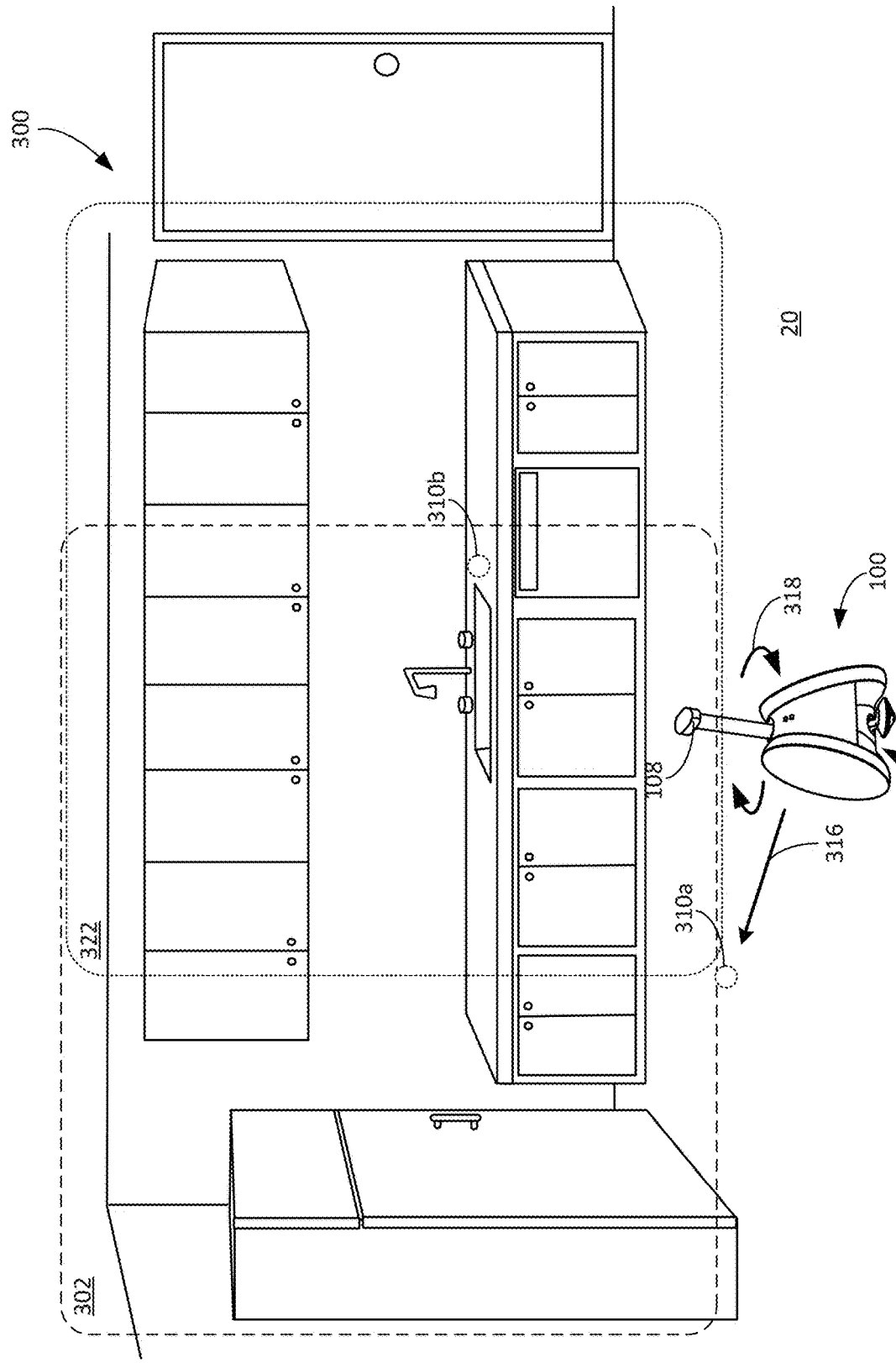

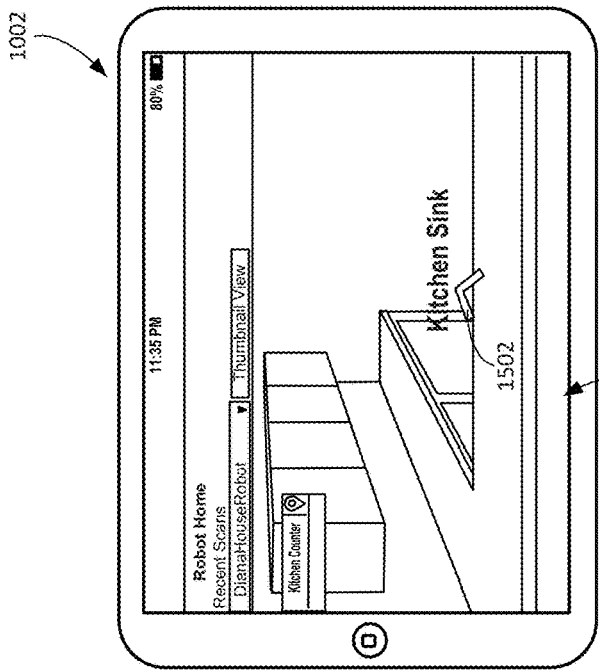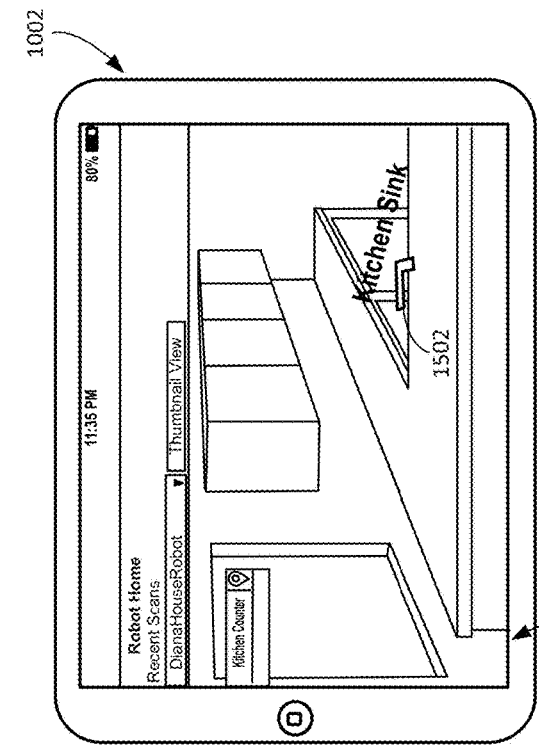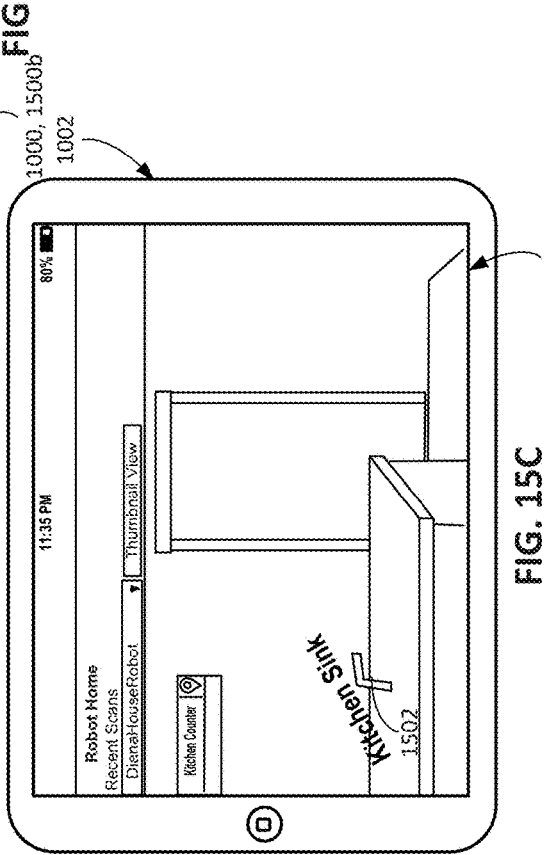

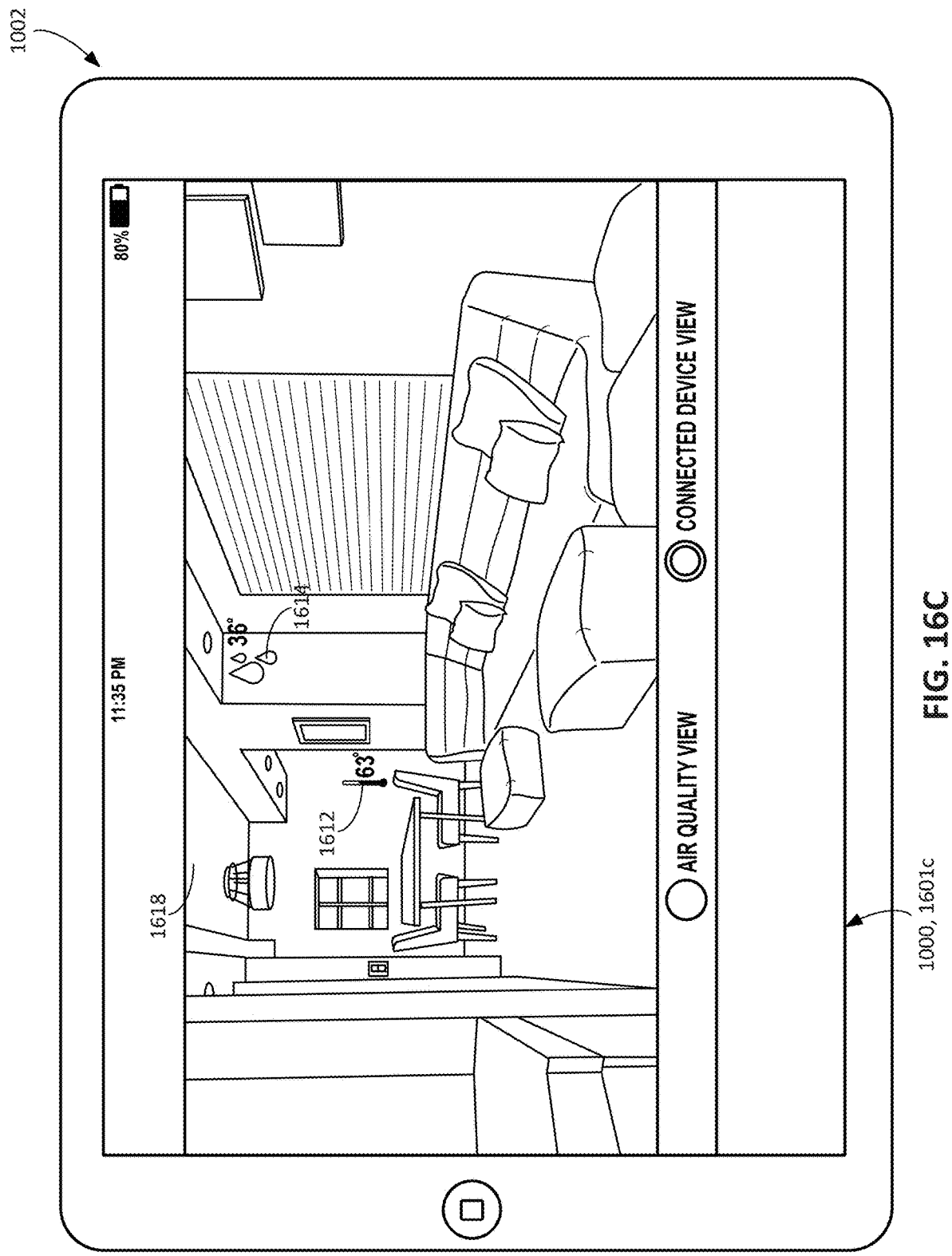

AUTONOMOUS MONITORING ROBOT SYSTEMS

CROSS-REFERENCE TO RELATED APPLICATIONS

This application is a continuation of and claims priority to U.S. application Ser. No. 15/404,455, filed on Jan. 12, 2017, which claims the benefit of priority under 35 U.S.C. § 119(e) to U.S. Application No. 62/279,560, filed on Jan. 15, 2016 and U.S. Application No. 62/375,842, filed on Aug. 16, 2016. The prior applications are incorporated herein by reference in their entirety.

TECHNICAL FIELD

The present disclosure relates to autonomous robots and, more particularly, to autonomous monitoring robot systems and related methods.

BACKGROUND

Wireless connection to the Internet and remote clients has been contemplated for Internet of Things household appliances. Remotely monitoring conditions within a home can be increasingly desirable to occupants. For example, an Internet accessible stationary thermostat can provide temperature measurements. As another example, a stationary surveillance camera aimed at a living space records activity in personal spaces from a single vantage point.

SUMMARY

In one aspect, an autonomous mobile robot includes a chassis, a drive supporting the chassis above a floor surface in a home and configured to move the chassis across the floor surface, a variable height member being coupled to the chassis and being vertically extendible, a camera supported by the variable height member, and a controller. The controller is configured to operate the drive to navigate the robot to locations within the home and to adjust a height of the variable height member upon reaching a first of the locations. The controller is also configured to, while the variable height member is at the adjusted height, operate the camera to capture digital imagery of the home at the first of the locations.

In another aspect, a method includes receiving data representing digital imagery of a home captured by a camera on an autonomous mobile robot and presented on a display of a remote computing device, determining that a user-selected location in the home is above at least a portion of a floor surface in the home, and causing the camera on the robot to be redirected toward the user-selected location while additional digital imagery is captured and presented on the display.

In yet another aspect, a method includes navigating an autonomous mobile robot to locations within the home, and adjusting a height of a camera of the robot upon reaching a first of the locations. The method further includes, while the camera is at the adjusted height, operating the camera to capture digital imagery of the home at the first of the locations.

Implementations can include one or more of the features described below and herein elsewhere. In some implementations, the variable height member is extendible from a first position in which a top surface of the variable height member is flush with a top surface of the chassis to a second position in which the top surface of the variable height member has a height of at least 1.5 meters. In some implementations, the variable height member is extendible from a height of 10 cm to a height of 1.5 meters. In some implementations, the method includes extending a variable height member from a first position in which a top surface of the variable height member is flush with a top surface of a chassis of the robot to a second position in which the top surface of the variable height member has a height of at least 1.5 meters. The method includes, for example, adjusting the height of the camera by adjusting extending the variable height member.

In some implementations, the controller is configured to, in a privacy mode, to move the variable height member to a position in which the camera is unable to capture images of the home. In some implementations, the method includes repositioning the camera, in a privacy mode, to a position in which the camera is unable to capture images of the home.

In some implementations, the controller is configured to adjust the variable height member to at least two heights when the robot is at the first of the locations, and operate the camera to capture digital imagery of the home while the variable height member is at each of the at least two heights. In some implementations, the method includes repositioning the camera to at least two heights when the robot is at a particular location within the home and causing the camera to capture images at each of the at least two heights.

In some cases, the robot further includes a wireless transceiver operable by the controller and configured to communicate with a wireless network such that the digital imagery is transmittable to a remote computing device operable to present an interactive representation of the home on a display based on the digital imagery. In some cases, the robot further includes a sensor system to detect a location and a status of a networked device in communication with the wireless network while the controller operates the drive to navigate the robot within the home. The wireless transceiver is, for example, configured to communicate with the wireless network such that the digital imagery and data representing the location and the status of the networked device is transmittable to the remote computing device to present an indicator indicative of the location and the status of the networked device on the display. In some cases, the controller is configured to operate the drive to navigate the robot along a path through the locations while operating the camera to capture digital imagery of the home, and the wireless transceiver is configured to transmit the digital imagery to a processor to combine the digital imagery captured along the path to form a sequence of views of the home along the path that is presentable in the interactive representation of the home.

In some cases, the method further includes wirelessly transmitting the captured digital imagery to a remote computing device operable to present an interactive representation of the home on a display based on the digital imagery. In some cases, the method further includes detecting a location and a status of a networked device in communication with a wireless network connected to the robot while navigating the robot within the home. The method includes, for example, communicating with the wireless network such that the digital imagery and data representing the location and the status of the networked device is transmittable to the remote computing device to present an indicator indicative of the location and the status of the networked device on the display. In some cases, the method includes navigating the robot along a path through the locations while operating the camera to capture digital imagery of the home, and transmitting the digital imagery to a processor to combine the digital imagery captured along the path to form a sequence of views of the home.

In some implementations, the robot further includes a sensor system to detect an object within the home. The controller is, for example, configured to operate the drive to navigate the robot to the locations within the home while localizing a pose of the robot based on the detected object. In some implementations, the method includes detecting an object within the home and navigating the robot to the locations within the home while localizing a pose of the robot based on the detected object.

In some implementations, the robot further includes a wireless transceiver in communication with a wireless network. The controller is configured to operate the drive to navigate the robot to the locations within the home while localizing a pose of the robot based on a signal received by the wireless transceiver. In some implementations, the method includes receiving a wireless signal and navigating the robot to the locations within the home while localizing a pose of the robot based on the wireless signal.

In some implementations, the controller is configured to adjust the variable height member to a height based on a position of an object in the home. In some implementations, the method includes adjusting a height of the camera based on a position of an object in the home.

In some implementations, the robot further includes a wireless transceiver in communication with a wireless network to receive data representing a user selection of the first of the locations and data representing a user selection of one or more heights for setting the variable height member at the first of the locations. The controller is configured to, for example, operate the drive to navigate the robot to the first of the locations, and operate the camera at the first of the locations to capture digital imagery while setting the variable height member to each of the one or more heights. In some implementations, the method includes receiving a user selection of the first of the locations and data representing a user selection of one or more eights for the camera at the first of the location, navigating the robot to the first of the locations, and operating the camera at the first of the location to capture digital imagery while setting the camera to each of the one or more heights. In some cases, the data representing the user selection of the one or more heights include data representing a user selection of a height selected from a plurality of predefined heights for the variable height member.

In some implementations, the controller is configured to rotate the robot at the first of the locations while operating the camera to capture digital imagery spanning up to 360 degrees at the first of the locations. In some implementations, the method includes rotating the robot at the first of the locations while operating the camera to capture digital imagery spanning up to 360 degrees at the first of the locations. The digital imagery spanning up to 360 degrees, for example, including between 4 and 1000 images.

In some implementations, the controller is configured to rotate the robot to multiple predefined orientations at the first of the locations while operating the camera to capture the digital imagery spanning up to 360 degrees at the first of the location. In some implementations, the method includes rotating the robot to multiple predefined orientations at the first of the locations while operating the camera to capture the digital imagery spanning up to 360 degrees at the first of the location. The digital imagery includes, for example, multiple images captured at each of the predefined orientations and captured at different exposure levels.

In some implementations, the robot further includes a wireless transceiver in communication with a wireless network to receive data representing a user selection of each of the locations and a path including each of the locations. In some implementations, the method further includes wirelessly receiving data representing a user selection of each of the locations and a path including each of the locations.

In some implementations, the robot further includes an optical detector. The controller is configured to, for example, operate the drive to rotate the robot at a location to detect light within the home using the optical detector and storing data representing the detected light, and operate the drive to rotate the robot at the location to capture digital imagery using the camera while controlling image capture based on the data representing the detected light. In some implementations, the method further includes rotating the robot at a location while detecting light within the home, and rotating the robot at the location to capture digital imagery using the camera while controlling image capture based on the data representing the detected light.

In some implementations, the robot further includes a wireless transceiver operable by the controller and configured to communicate with a wireless network such that the digital imagery is transmittable to a remote computing device operable to present a live video feed on a user display in response to data representing a user input on the remote computing device. In some implementations, the method further includes wirelessly communicating digital imagery to a remote computing device operable to present a live video feed on a user display in response to data representing a user input on the remote computing device. The data representing the user input further include, for example, data representing a user selection of one of the locations. The live video feed includes, for example, a representation of the home at the one of the locations.

In some implementations, the method further includes determining that another user-selected location is on the portion of the floor surface, and causing the robot to navigate toward the other user-selected location while additional digital imagery is captured and presented.

In some cases, causing the camera to be redirected toward the user-selected location includes causing an indicator indicative of operation of the camera to be presented proximate to a portion of the digital imagery corresponding to the user-selected location. Causing the robot to navigate toward the other user-selected location includes, for example, causing an indicator indicative of movement of the robot to be presented proximate to another portion of the digital imagery.

In some implementations, causing the camera to be redirected toward the user-selected location includes causing an indicator indicative of operation of the camera to be presented proximate to a portion of the digital imagery corresponding to the user-selected location. In some cases, the method further includes causing a location of the indicator to be updated as the additional digital imagery is captured and presented.

In some implementations, determining that the user-selected location is above at least the portion of the floor surface in the home includes determining that the user-selected location is above the floor surface. In some cases, determining that the user-selected location is above the floor surface includes determining that a vector defined by a position of the camera and the user-selected location do not intersect the floor surface.

In some implementations, determining that the user-selected location is above at least the portion of the floor surface in the home includes determining that a distance between the camera on the robot and the user-selected location is above a predefined threshold distance.

Advantages of the foregoing and other implementations described herein may include, but are not limited to, the advantages described below and herein elsewhere. An interactive representation of an enclosure space can provide a user with a virtually simulated experience of physically traveling through the enclosure space. Imagery for the interactive representation can be captured from many different perspectives throughout the enclosure space, providing the user with a greater number of vantage points of the enclosure space than would ordinarily be available to the user. In addition, the imagery can be combined in a manner that provides views that are more realistic than the views provided by the imagery prior to being combined. The views of the interactive representation can provide the user with an immersive experience of physically exploring the enclosure space. The vantage points for the imagery captured to form the interactive representation can also be selected to be familiar to the user so that the user more easily recognizes and understands the views of the interactive representation presented on the user terminal.

A user terminal remote from the enclosure space can present the interactive representation such that the user does not have to be physical present within the home to monitor conditions within the enclosure space. The interactive representation can also enable the user to remotely and continuously monitor conditions within the enclosure space. Information pertaining to the conditions of the enclosure space can be overlaid on the interactive representation to alert the user of these conditions as the user terminal presents different views of the interactive representation to the user. In some cases, information pertaining to devices in the enclosure space can be overlaid on the interactive representation so that the user terminal can keep the user informed of the status and state of these devices. The information can be provided to the user so that the user can accordingly change conditions within the enclosure space, for example, by operating these devices.

In cases in which the interactive representation presents a current vantage point of an autonomous monitoring robot, the user can interact with a user terminal presenting the interactive representation in an intuitive manner to control the autonomous monitoring robot. In particular, the user terminal can predict a navigational command that the user wishes to issue to the robot based on the user's interaction with the interactive representation.

An autonomous mobile robot can autonomously, without user intervention, capture the imagery to form the interactive representation described herein. The robot includes a camera to capture the imagery and can be easily operated to reposition and reorient the camera to capture imagery from a variety of angles and positions. The robot can be controlled remotely so that the user can monitor the enclosure space in real time and navigate the robot through the enclosure space in real time. The imagery captured by the robot can be continuously captured and transmitted so that the interactive representation presented to the user is continuously updated. The robot can also be controlled to capture imagery that can be combined to form an interactive representation of the enclosure space that is stored and later accessed by a user terminal.

The details of one or more implementations of the disclosure are set forth in the accompanying drawings and the following description. Other aspects, features, and advantages will be apparent from the description and drawings, and from the claims.

BRIEF DESCRIPTION OF THE DRAWINGS

FIG. 3A is a perspective view of an autonomous mobile robot in the enclosure space.

FIGS. 15A-15C are plan views of the user terminal presenting multiple views of an interactive representation formed from imagery captured at a single waypoint in the enclosure space.

FIGS. 16A-16C are plan views of the user terminal presenting views of an interactive representation of the enclosure space overlaid with indicators of conditions in the enclosure space.

Like reference numbers and designations in the various drawings indicate like elements.

DETAILED DESCRIPTION

Figure 1A:
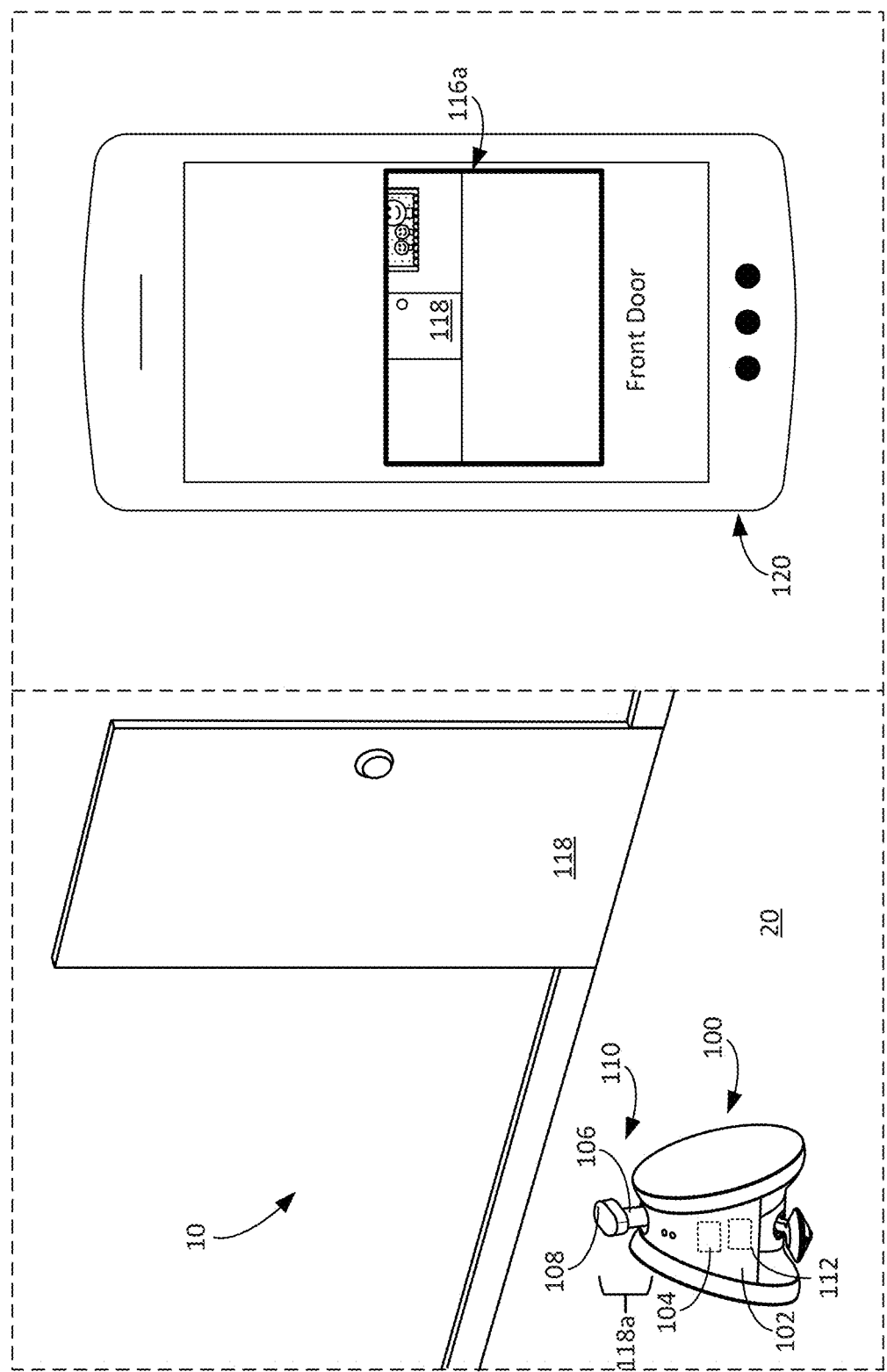
FIGS. 1A and 1B depict an autonomous mobile robot monitoring a door of an enclosure space.

The present disclosure is directed to a monitoring system including an autonomous mobile robot used for remotely monitoring conditions in an enclosure space by autonomously moving through the enclosure space. The enclosure space is a set of multiple rooms or spaces defined by a structure or a building, e.g., a home, a residential dwelling, a single family home, a multi-family dwelling, a unit of a duplex, apartment, or condominium, a mobile home, or a commercial living space, an office, a studio, a manufacturing plant, etc. A camera of the robot captures imagery of the enclosure space, e.g., digital imagery of the enclosure space, and, in some cases, detects conditions in the enclosure space. Data representing the captured images and/or detected conditions are transmitted to a network, e.g., the Internet. The data are accessible by a user terminal through a portal on the network. The user terminal is operable to present views of the enclosure space formed from imagery captured by the robot from multiple locations and directions. The views include views of the enclosure space from multiple vantage points to provide the user with a visual representation of surroundings of the robot within the enclosure space. The portal enables the user to view the enclosure space in a manner that simulates movement through and within multiple rooms and that simulates the changes in perspective of the enclosure space associated with the movement. The system described herein provides the user with an interactive representation of the enclosure space without requiring the user to manually drive the robot through the enclosure space.

The system generates an interactive photographic reconstruction of the enclosure space based on the data representing the imagery captured by the robot. The interactive photographic reconstruction is an interactive representation of the enclosure space that includes multiple views formed from imagery of the enclosure space captured by the robot at multiple locations throughout the enclosure space. In some examples, the captured imagery also includes imagery captured by the robot at multiple heights at one or more locations in the enclosure space. The imagery captured by the robot is combined, e.g., stitched, sequenced, etc., to form the interactive representation in a manner that preserves continuity of portions of the enclosure space as they are represented in the views presented by the user terminal.

In some examples, the interactive representation is presented in a manner that preserves the physical continuity of horizontally offset portions of the enclosure space. The imagery is, for example, stitched to form an unbroken panoramic view of the enclosure space that includes the physically adjacent portions of the enclosure space.

In further examples, the interactive representation preserves the physical continuity of vertically offset portions of the enclosure space. The robot captures imagery of the vertically offset portions using a camera that is vertically movable. As described herein, the camera is mounted to a member that is vertically protractible such that the camera's height can be adjusted during the robot's traversal of the enclosure space.

The monitoring system provides data that enables remote surveillance and monitoring of locations throughout the enclosure space. The robot operates in an autonomous manner without user intervention by autonomously traversing the enclosure space while capturing imagery and measuring conditions in the enclosure space. The interactive representation can be overlaid with indicators indicative of the conditions of the enclosure space, thereby keeping the user apprised of conditions in the enclosure space when the user is at a remote location. The interactive representation enables the user to remotely surveil and monitor different locations in the enclosure space without having to manually drive the robot through the enclosure space.

Example Monitoring Process for a Monitoring System

FIG. 1A depicts an example of a monitoring system including an autonomous mobile robot 100 in an enclosure space 10, e.g., a home. The robot 100 is an autonomous monitoring robot configured to capture imagery of the enclosure space 10 as the robot 100 travels through the enclosure space 10, for example, along a patrol route 200 through the enclosure space 10 depicted in FIG. 2. The robot 100 includes a chassis 102, a drive 104, a variable height member 106, and a camera 108. The drive 104 supports the chassis 102 above a floor surface 20 in the enclosure space 10. The variable height member 106 is coupled to the chassis 102 and is vertically extendible from the chassis 102. The camera 108 is supported by the variable height member 106, e.g., supported on an upper portion 110 of the variable height member 106. The robot 100 includes a controller 112 that operates the drive 104 to navigate the robot 100 to different locations on the floor surface 20 within the enclosure space 10.

Figure 2:
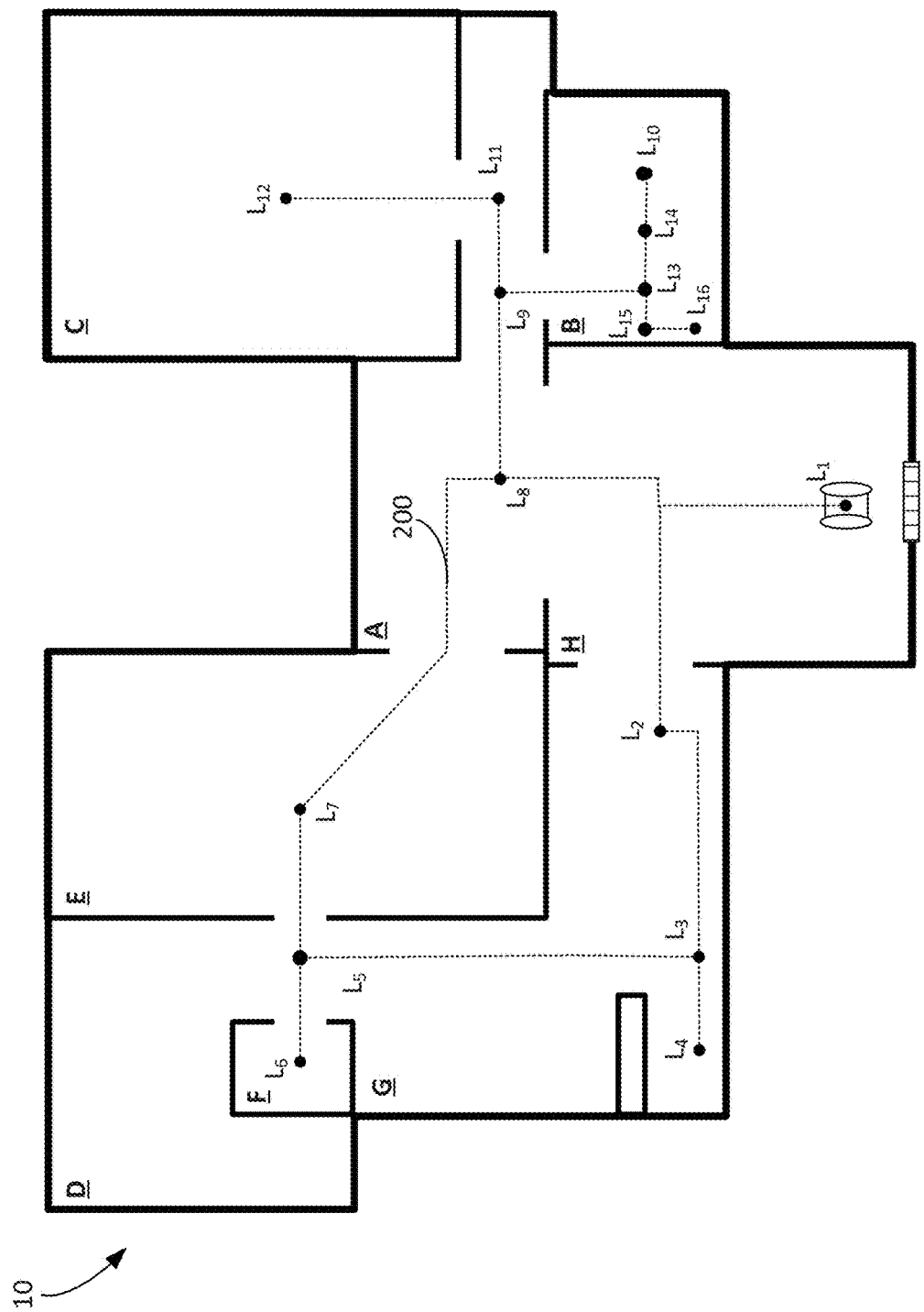
FIG. 2 depicts a floor plan of the enclosure space and a route of the robot overlaid on the floor plan.

FIG. 2 depicts a floorplan of the enclosure space 10 and shows the patrol route 200 through the enclosure space 10. In some examples, the enclosure space 10 is subdivided, e.g., physically, spatially and/or functionally, into one or more defined zones, e.g., zones A-H depicted in FIG. 2. In some implementations, the zones A-H correspond to rooms in the enclosure space 10, such as zone A being a television (TV) room, zone B being a kitchen, and zone C being a dining room. The defined zones A-C are, in some cases, divided by walls or may be open concept areas that blend together without walls dividing the zones.

The route 200 for the robot 100 includes different waypoints $L_1$-$L_{16}$ (collectively referred to as "waypoints L") each at different locations along the floor surface 20 of the enclosure space 10. While the robot 100 moves along the route 200, the camera 108 is operated to capture imagery at each of the waypoints L to form a corresponding view of an interactive representation presented to the user. The drive 104 is operated to maneuver the robot 100 to each of the waypoints L within the enclosure space 10.

In addition to navigating the robot 100 through the enclosure space 10, the controller 112 is capable of adjusting a height of the variable height member 106, e.g., relative to the chassis 102 and/or relative to the floor surface 20, by operating a drive system operable with the variable height member 106. The height is adjusted to a desired height, e.g., selected automatically or selected by the user, upon reaching one of the waypoints L within the enclosure space 10, e.g., the waypoint $L_1$ depicted in FIG. 2. In some cases, at some of or at each of the waypoints L, the camera 108 is operated to capture imagery at a waypoint while the variable height member 106 is at an adjusted height specific to the waypoint.

In the example of FIG. 1A, when the robot 100 reaches the waypoint $L_1$, the height of the variable height member 106 is adjusted such that a view 116a formed from digital imagery captured by the camera 108 of the robot 100 includes a front door 118 in the enclosure space 10 while the camera 108 is at a height 118a relative to the floor surface 20. The camera 108 captures digital imagery for a view 116b showing only a portion of the front door 118 while the camera is at a height 118b relative to the floor surface 20. On the other hand, when the camera 108 is at the height 118b, the view 116b shows an entirety of the front door 118. The views 116a, 116b are presented on a user terminal 120, which can form a part of the monitoring system.

In some implementations, when the robot 100 reaches the waypoint $L_1$, the controller 112 adjusts the variable height member 106 to be positioned at two or more distinct heights at which imagery is captured. The zones, waypoints, and/or heights can be user-selected or can be automatically selected as described herein.

Example Interactive Representation

Figure 3B:
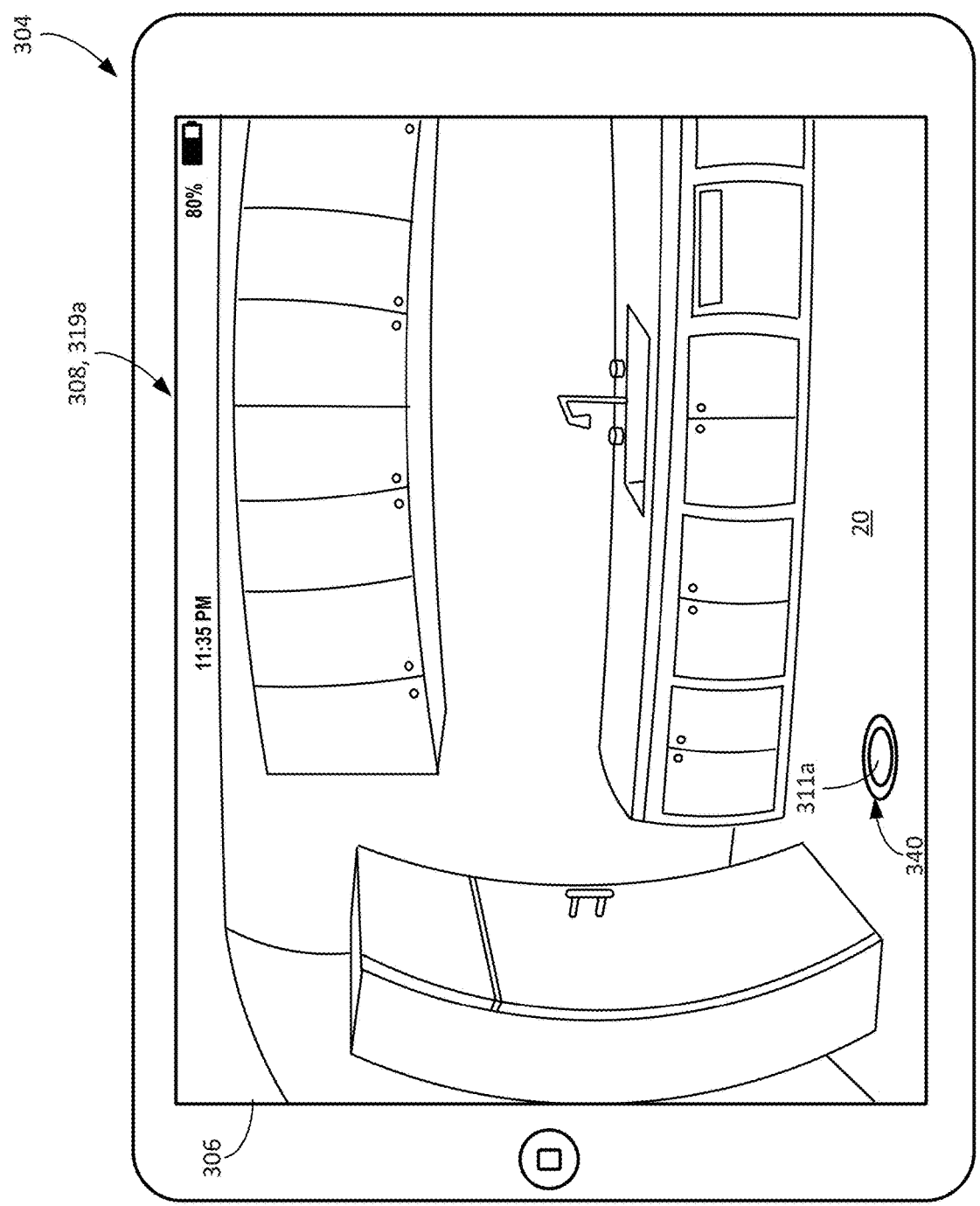
FIGS. 3B-3D are plan views of a user terminal presenting views of the enclosure space of FIG. 3A.

As described herein, the captured imagery is presented to the user in the form of an interactive representation, e.g., on a user terminal. In some implementations, in a real time monitoring mode, the interactive representation corresponds to a live video feed of imagery captured by the camera 108 of the robot 100, as shown in FIG. 3A. During the real time monitoring mode, the imagery captured by the camera 108, e.g., the current view of the camera 108, is presented to the user on a user terminal 304, shown in FIG. 3B. The digital imagery is captured and presented in the real time monitoring mode such that the digital imagery presented to the user terminal 304 corresponds to a current view of the camera 108.

Figure 7:
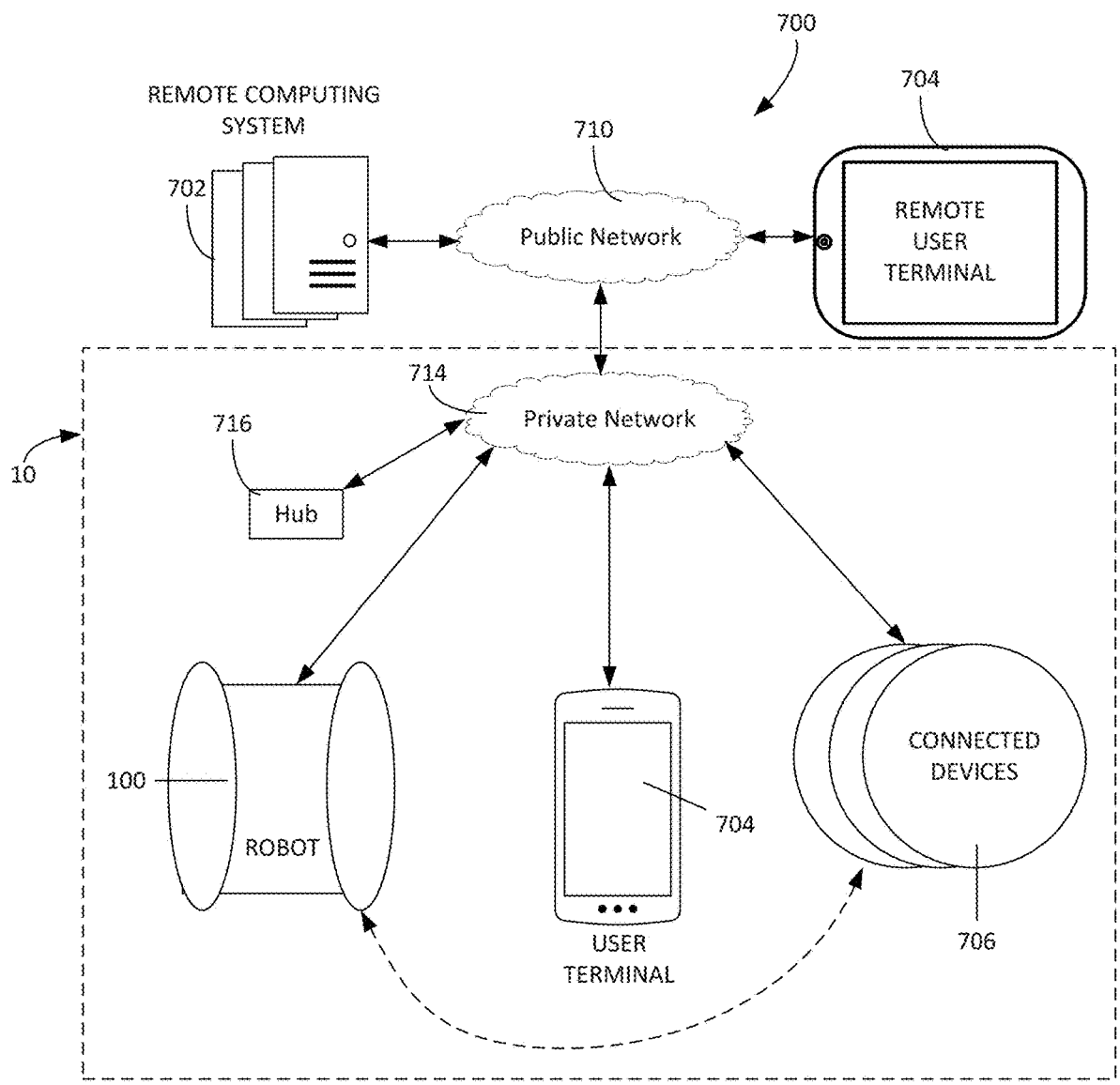
FIG. 7 is a schematic diagram of a network in which the robot of FIG. 4A operates.
Figure 8:
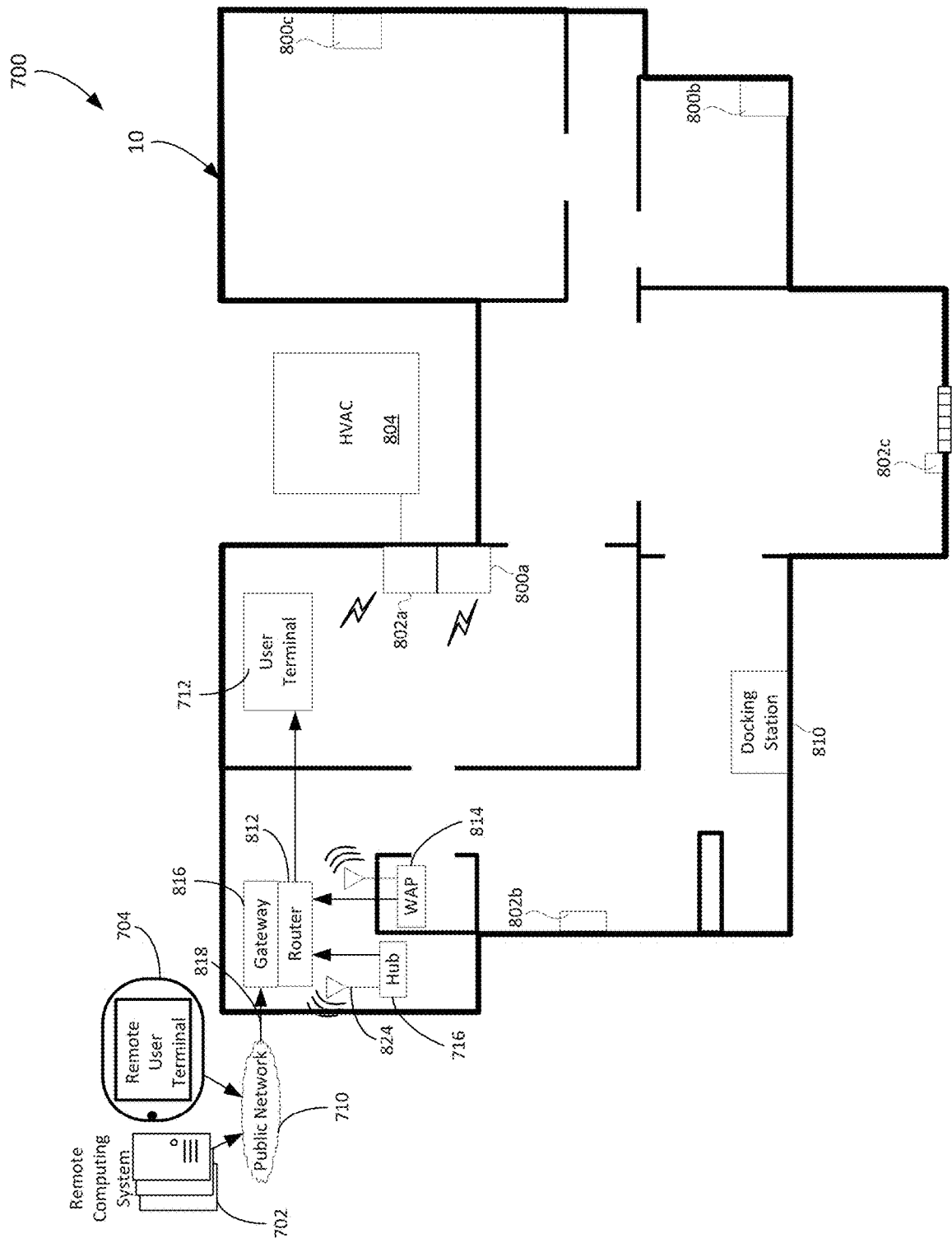
FIG. 8 is a schematic diagram illustrating the enclosure space including the robot of FIG. 4A and other connected devices.

Similar to the user terminal 120, the user terminal 304 is part of the monitoring system including the robot 100, as described herein, for example, with respect to FIGS. 7 and 8. The user terminal 304 is, for example, a personal data assistant, a personal computer (PC), a cellular terminal, a tablet computer, or other appropriate user terminal.

The user terminal 304 includes one or more user input devices operable by the user to interact with the interactive representation and manipulate the view shown on the user terminal 304. The user input devices include any suitable user input devices including, for example, a touchscreen, a touch activated or touch sensitive device, a joystick, a keyboard/keypad, a dial, a directional key or keys, and/or a pointing device (such as a mouse, trackball, touch pad, etc.).

Figure 1B:
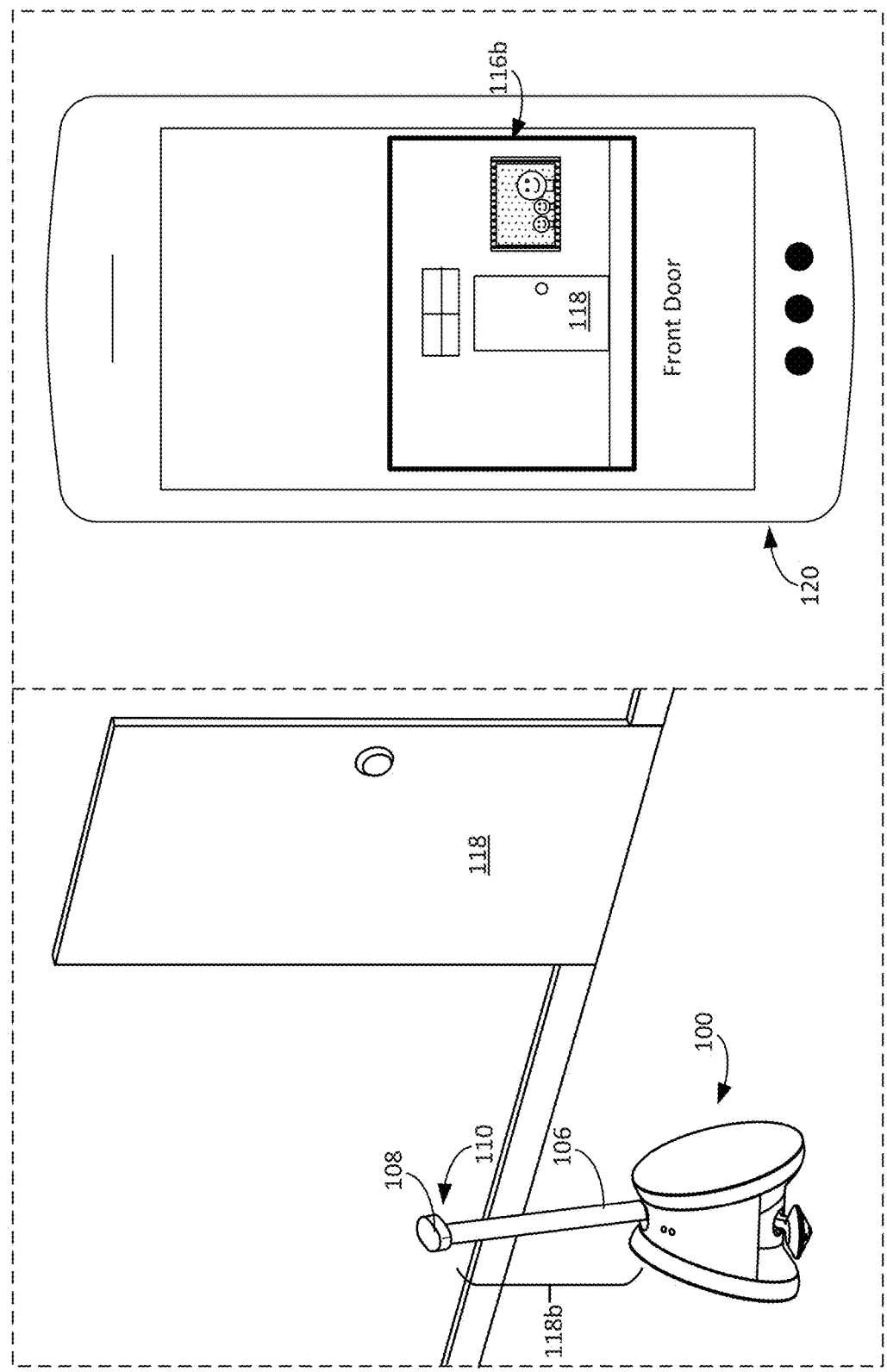

The user terminal 304 further includes one or more user output devices to present information to the user visually through a display. The display is, for example, an interactive display associated with a user input device such as a touchscreen. The display is, for example, a display screen of a tablet device. Alternatively or additionally, the display is an active matrix organic light emitting diode display (AMO-LED) or liquid crystal display (LCD) with or without auxiliary lighting (e.g., a lighting panel). In the example shown in FIGS. 3B-3D, the user terminal 304 is a tablet device having a touchscreen with which a user explores the interactive representation. Furthermore, in the example shown in FIGS. 1A and 1B, the user terminal is a smartphone device having a touchscreen.

Figure 3C:
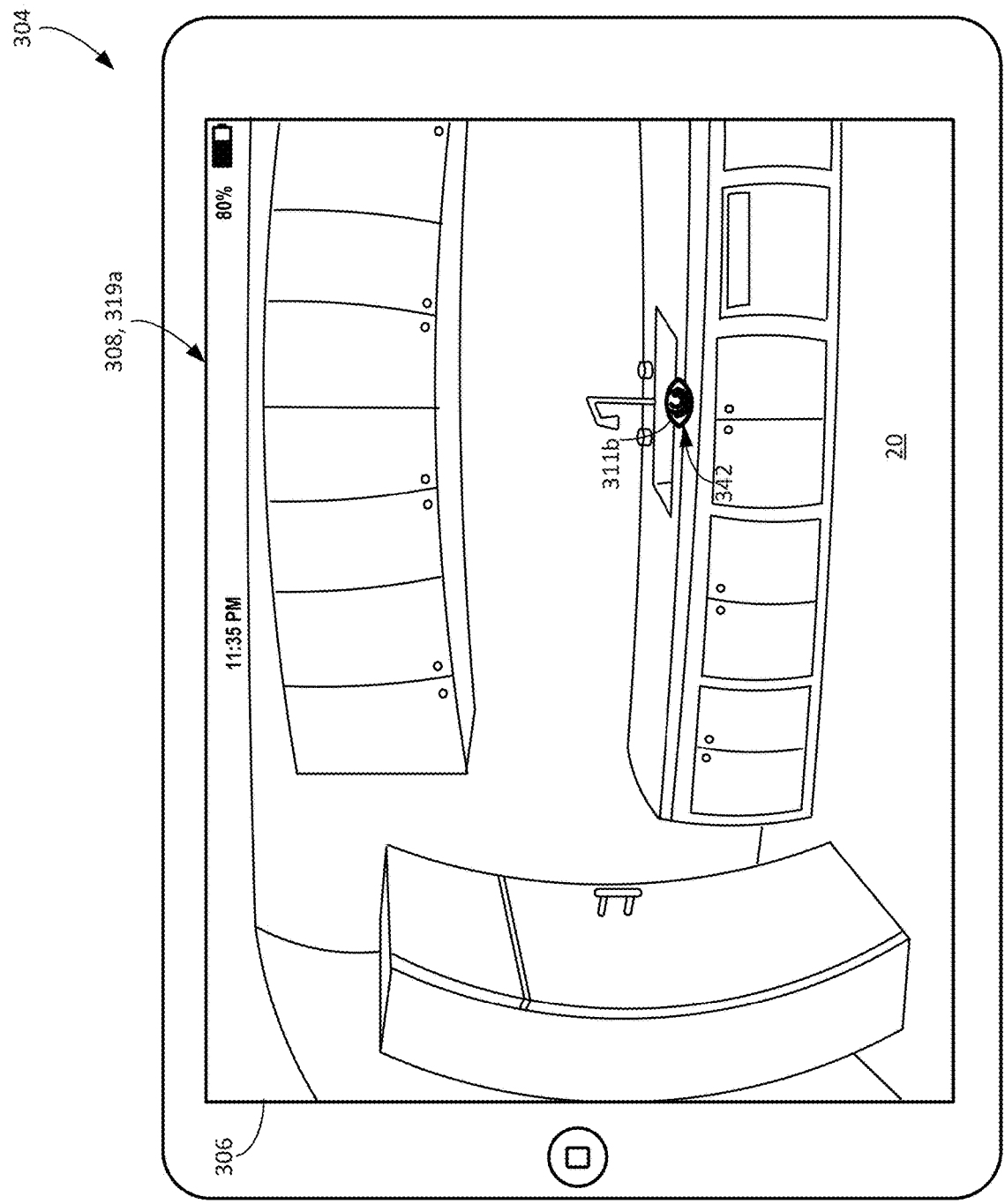
Figure 3D:
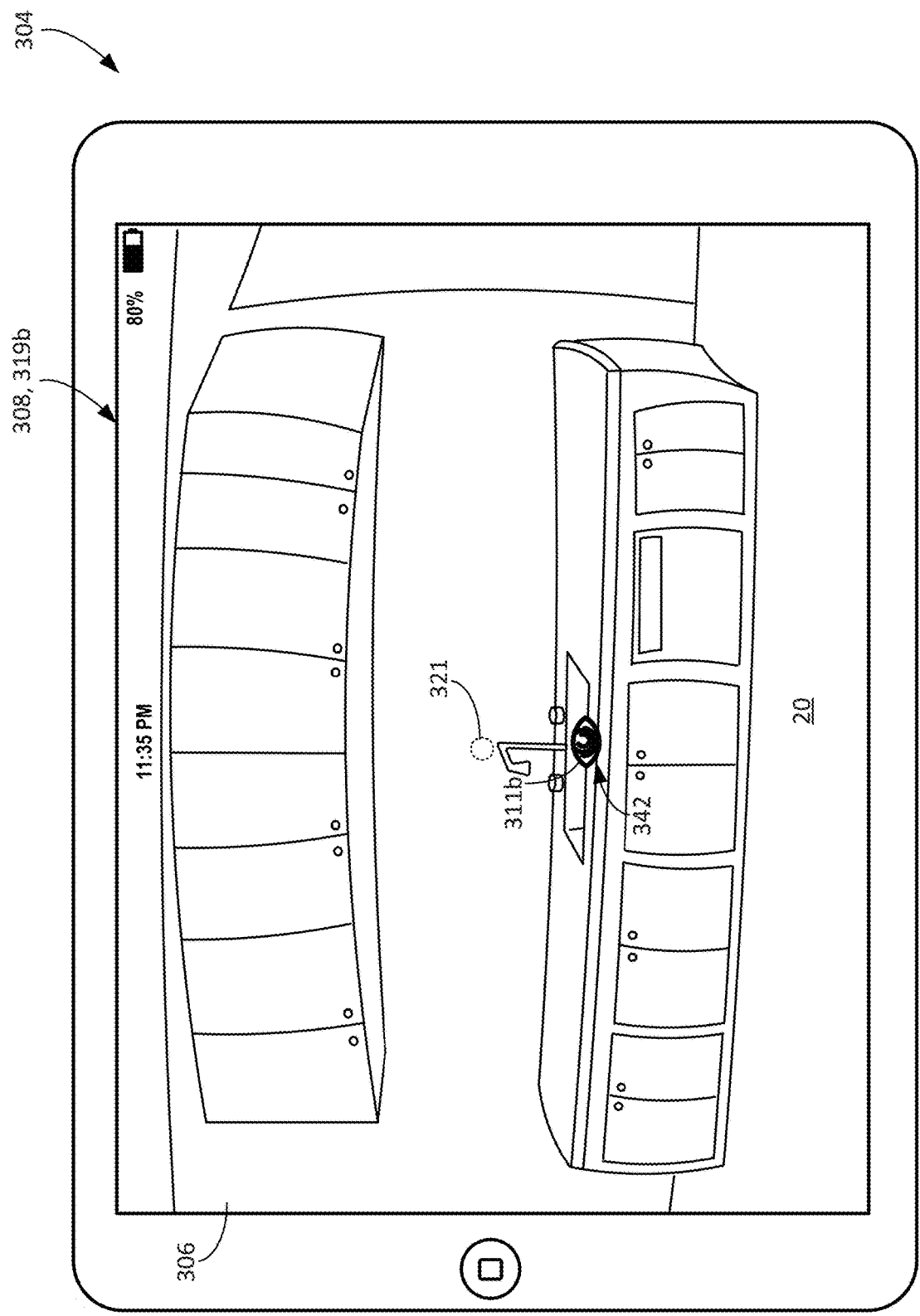

In the example shown in FIG. 3A, the robot 100 is positioned within a room 300 in the enclosure space 10, e.g., a kitchen, to capture imagery for the views presented on the user terminal 304. The camera 108 of the robot 100 is directed toward a portion 302 of the room 300. The user terminal 304 shown in FIGS. 3B, 3C, and 3D presents on its display 306 an interactive representation 308 formed from the imagery captured by the camera 108 of the robot 100.

In some implementations, the user interacts with the interactive representation 308 to select a location within the enclosure space 10, and, in response to the user selection, the camera 108 is redirected such that a center of a viewing cone of the camera 108 is redirected toward the location. Upon receiving a user selection of a point on the digital imagery, a monitoring system predicts whether the user intends to redirect the camera 108 or to reposition the robot 100. The user-selected point corresponds to, for example, a pixel or set of adjacent pixels on the digital image, which in turn corresponds to a user-selected location in the physical world, e.g., a location in the enclosure space 10.

The monitoring system determines whether the user-selected location is above the floor surface 20 or on the floor surface 20. If the user-selected is on the floor surface 20, the monitoring system causes the robot 100 to perform a translation operation 316 in which the robot 100 moves to the user-selected location, as described with respect to FIGS. 3A and 3B. If the user-selected location is above the floor surface 20, the monitoring system causes the robot 100 to perform a reorientation operation 318 in which the camera 108 is redirected toward the user-selected location, as described with respect to FIGS. 3A, 3C, and 3D.

Referring to FIG. 3B, in some examples, the user operates a user interface of the user terminal 304 to select a location 310a (shown in FIG. 3A) in the enclosure space 10. A view 319a is formed from the imagery captured when the camera 108 has a vantage point with the robot 100 at an initial location 312 (shown in FIG. 3A). In some examples, the user interacts with the user interface to select a point 311a on the view 319a of the interactive representation 308 that corresponds to the user-selected location 310a. Based on the user selection of the location 310a, the monitoring system determines that the selected location is a portion of the floor surface 20 and therefore the user intends to cause the robot 100 to autonomously navigate to the selected location. The monitoring system accordingly causes the robot 100 to navigate toward the user-selected location 310a.

As shown in FIG. 3A, the robot 100 is navigated toward the location while the camera 108 captures imagery. The robot 100 performs the translation operation 316 to cause the robot 100 to translate from its initial location 312 to the location 310a in response to the user selection of the location 310a.

During the translation operation 316, the imagery captured by the robot 100 forms the view presented to the user on the display 306. In some examples, the view presented on the user terminal 304 is formed from imagery captured in real time. The view of the interactive representation 308 shown on the display 306 is updated as the camera 108 captures imagery while the robot 100 moves from the initial location 312 to the location 310a.

In some implementations, an indicator 340 is presented on the display 306 to indicate that the user selection of the point 311a will cause the robot 100 to move toward the user-selected location 310a in the enclosure space 10 rather than cause the robot 100 to reorient the camera 108. The indicator 340 is, for example, indicative of the translation operation 316 in which the robot 100 performs a drive operation to move toward the location 310a. The indicator 340 is a destination icon such as a target ring, destination flag, or other icon commonly understood in online mapping applications to be indicative of a destination.

In some implementations, while the robot 100 moves toward the user-selected location, the indicator 340 indicating the translation operation 316 of the robot 100 remains fixed to the user-selected location 310a depicted in the interactive representation 308 even as the robot 100 moves across the floor surface 20 and the camera 108 accordingly captures imagery from a new vantage point. The indicator 340 is presented on the display 306 to be proximate to the portion of the view 319*b* corresponding to the user-selected location 310*a*. As the robot 100 moves toward the user-selected location 310*a*, the indicator 340 remains fixed to the point 311*a* and hence also remains fixed to the user-selected location 310*a* represented on the display 306. The location of the indicator 340 moves along the display 306 of the user terminal 304 such that the indicator 340 remains fixed to the user-selected location 310*a* represented on the display 306. In some cases, the indicator 340 is removed from the display 306 when the user-selected location 310*a* is no longer visible in the viewpoint of the camera 108 as the robot 100 moves toward the user-selected location 310*a*. The user-selected location 310*a*, for example, is positioned outside of an outer perimeter or frame of the imagery captured by the camera 108, thereby preventing the user-selected location 310*a* from being present within the views presented by the user terminal 304. Referring also to FIG. 3C, in some examples, the user operates the user interface of the user terminal 304 to select a location 310*b* (represented by point 311*b*) in the enclosure space 10. The user uses the user interface to select the point 311*b* on the view 319*a* that corresponds to the user-selected location 310*b* within the enclosure space 10. Based on the user-selected location 310*b*, the monitoring system determines that the user intends to cause the camera to be directed toward the user-selected location 310*b*. In some cases, this user-selected location 310*b* is above the floor surface, e.g., on an object above the floor surface, on a wall surface, etc., and not at a location traversable by the robot 100.

If the location 310*b* is determined to be above at least a portion of the floor surface 20 in the enclosure space 10, the camera 108 of the robot 100 is redirected toward the location 310*b*. As shown in FIG. 3C, the location 310*b* is not at a center 321 of the view 319*a*, which corresponds to a center of the viewing cone of the camera 108. The drive 104 of the robot 100 performs the reorientation operation 318 (shown in FIG. 3A) to cause the robot 100 to reorient itself (or reorient the camera 108) such that the camera 108 is directed toward the location 310*b*.

FIG. 3D depicts the view 319*b* of the interactive representation 308 with the camera 108 directed toward the location 311*b*. The center of the viewing cone of the camera 108 is, for example, directed toward the location 310*b* such that the center 321 of the view 319*b* coincides with the location 311*b*. The camera 108 is, for example, reoriented such that the view 319*b* is centered both horizontally and vertically. The monitoring system causes the camera 108 on the robot 100 to be redirected toward the user-selected location 310*b* while additional digital imagery is captured to form additional views of the interactive representation 308. In this regard, while the view 319*a* (shown in FIGS. 3B and 3C) is formed from imagery taken of the portion 302 of the enclosure space 10 (marked in FIG. 3A), the view 319*b* (shown in FIG. 3D) is formed from imagery taken of a portion 322 of the enclosure space 10 (marked in FIG. 3A).

While the camera 108 is described as being rotated such that the user-selected location 310*b* coincides with the center of the view 319*b*, in some cases, the camera 108 is redirected such that a central vertical axis of the view 319*b* coincides with the user-selected location 310*b*. The robot 100, for example, rotates in place to redirect a center of the viewing cone toward the user-selected location such that a central horizontal axis of the view 319*b* coincides with the user-selected location 310*b*. In some cases, to redirect the camera 108, a height of the variable height member 106, and hence a height of the camera 108, is adjusted.

In some implementations, an indicator 342 is presented on the user terminal 304 to indicate that the user selection of the point 311*b* will cause the camera 108 of the robot 100 to be redirected toward the user-selected location 310*b* in the enclosure space 10. In some examples, the indicator 342 is indicative of the reorientation operation 318 in which the robot 100 repositions the camera 108 to view the location. Alternatively or additionally, the indicator 342 is indicative of an operation of the camera, e.g., a reorientation operation of the camera, a viewing operation of the camera, etc. The indicator 342 is, for example, an icon indicative of sight such as an eye or a camera.

While the camera 108 is being redirected, the indicator 342 remains fixed to the point 311*b* on the display 306. The indicator 342 is presented to be proximate to a portion of the view 319*b* corresponding to the user-selected location 310*b*. In some implementations, a location of the indicator 342 is updated as the additional digital imagery is captured, and the view presented on the user terminal 304 is updated such that the indicator 342 remains fixed to the user-selected location 310*b* represented on the display 306. The user terminal 304 shows the indicator 342 fixed to the point 311*b* in both FIGS. 3C and 3D even though FIG. 3C presents the view 319*a* formed from imagery representing the portion 302 of the enclosure space 10 and FIG. 3D presents the view 319*b* formed from imagery representing the portion 302 of the enclosure space 10. The location of the indicator 342 appears, to the user, to move across the display 306 with the user-selected location 310*b*. For example, as the camera 108 is reoriented from its orientation for capturing the imagery for the view 319*a* in FIG. 3C to the orientation for capturing the imagery for the view 319*b* in FIG. 3D, the indicator 342 stays fixed to the user-selected location 310*b* in the interactive representation 308 and in both of the views 319*a*, 319*b*. When the camera 108 is reoriented from its orientation for capturing the imagery for the 310*b* to the orientation for capturing the imagery for the view 319*b*, the indicator 342 is no longer presented on the display 306, thereby indicating the camera reorientation operation is complete.

In addition to issuing commands to the robot 100 to perform translation and reorientation operations, in some implementations, the user interacts with the interactive representation 308 to issue a command to the robot 100 to perform a zoom operation. The monitoring system determines that the user-selected location is above the floor surface 20 and coincides with a central axis or a center of the view presented on the user terminal 304. Because the center of the viewing cone of the camera 108 is already directed toward the user-selected location, a reorientation operation would not substantially change a position of the camera 108, e.g., would not change more than 10% of an area of the view presented on the user terminal 304. In addition, because the user-selected location is above the floor surface, a translation operation may not be possible. In some cases, the monitoring system determines that the user selection corresponds to an intention of the user for the robot 100 to perform a zoom operation and generates the corresponding command to cause the camera 108 to zoom-in toward a user-selected location corresponding to the user-selected point. A zoom setting of the camera 108 is increased such that zoomed-in imagery of the enclosure space 10 is captured with the center of the viewing cone of the camera 108 directed at the user-selected location.

In some implementations, to determine whether the user-selected location is above the floor surface 20 or on the floor surface 20, the monitoring system computes a vector defined by a position of the camera 108 and the user-selected location. The monitoring system then determines whether the vector intersects with a plane defined by the floor surface 20. If the vector does not intersect with the plane, the camera 108 is redirected toward the user-selected location, as described with respect to FIGS. 3A and 3B. If the vector intersects with the plane, the robot 100 moves toward the user-selected location on the floor surface 20, as described with respect to FIGS. 3A, 3C, and 3D.

Alternatively or additionally, the monitoring system determines whether a distance between the camera 108 and the user-selected location is above or below a threshold distance from the camera 108 and issues a command to the robot 100 based on the determination. In some examples, if the user-selected location is on the floor surface 20 and is below the threshold distance, the robot 100 performs a translation operation in which the robot 100 moves toward the user-selected location. In further examples, if the user-selected location is on the floor surface 20 but is above the threshold distance, the robot 100 performs a reorientation operation in which the camera 108 is redirected toward the user-selected location. The threshold distance is between, for example, 3 and 10 meters (e.g., 3 to 5 meters, 5 to 7 meters, 7 to 9 meters, 5 to 10 meters, etc.).

In some implementations, the monitoring system determines that the user selection corresponds to a desire to (i) move the robot 100 to a user-selected location, (ii) reorient the camera 108 toward a user-selected location, or (iii) move the robot 100 toward a user-selected location and reorient the camera 108 toward the user-selected location. The robot 100 both moves toward the user-selected location and reorients the camera 108 toward the user-selected location when it would be beneficial to decrease the distance between the user-selected location and the robot 100 to provide the user with a closer view of the user-selected location.

In this regard, if the user-selected location is on the floor surface 20 and below a first threshold distance, the robot 100 performs a translation operation to move to the user-selected location. If the user-selected location is above the floor surface 20, above the first threshold distance, and below a second threshold distance, the robot 100 performs a reorientation operation to redirect the camera 108 toward the user-selected location. If the user-selected location is above the floor surface 20 and is above the second threshold distance, the robot 100 performs a translation operation to move toward the user-selected location to provide a closer view of the user-selected location. In addition, the robot 100 performs a reorientation operation of the camera 108 toward the user-selected location. In some examples, the monitoring system causes the robot 100 to stop once the robot 100 is at a distance below the second threshold distance from the object. The reorientation and translation operations are performed concurrently and/or sequentially. The first threshold distance is between, for example, 5 and 15 meters (e.g., 5 to 10 meters, 10 to 15 meters, etc.). In some examples, the second threshold distance is 2 to 5 meters (e.g., 2 to 3 meters, 3 to 4 meters, 4 to 5 meters, etc.) greater than the first threshold distance.

In some implementations, the monitoring system generates a reorientation command instead of a translation command even though the user-selected location is on the floor surface 20. In some examples, when the camera 108 is zoomed in greater than a threshold zoom value due to a zoom operation, the user selection causes the robot 100 to reorient the camera 108 rather than to move toward the user-selected location regardless of the position of the user-selected location relative to the robot 100. The user selection results in this reorientation operation to inhibit the view presented to user from shifting too quickly, which can be difficult for the user to discern. By performing the reorientation operation rather than the translation operation, the robot 100 avoids performing a translation operation that could cause objects to quickly enter and leave the viewing cone of the camera 108. The threshold zoom value is, for example, 2× to 3×.

In some implementations, if the monitoring system cannot determine a path on the floor surface 20 to a user-selected point, the robot 100 performs a reorientation operation to center a view of the camera 108 on the user-selected point. Based on a robot map, e.g., an occupancy map, used by the robot 100 for navigation, the monitoring system determines that no path for the robot 100 from its initial location 312 to a user-selected location corresponding to the user-selected point is possible.

In some examples, the monitoring system computes the vector between the user-selected location and the camera 108 when the robot 100 is at the initial location 312 and determines that the vector does not intersect with the floor surface 20 at a location in front of the robot 100. The monitoring system determines that the vector intersects with the plane defined by the floor surface 20 but also determines a path between the user-selected location and the initial location 312 of the robot is not reachable. The user-selected location is, for example, through a wall or a window, but the monitoring system determines based on the robot map that a path between the robot's initial location 312 and the user-selected location is blocked by nontraversable space. The monitoring system accordingly generates a command for the robot 100 to perform a reorientation command instead of a translation operation.

Alternatively, if the monitoring system plans a path to the user-selected location and determines a difference between a distance of the planned path and a distance of a straight line path to the user-selected location from the initial location 312 is greater than a threshold difference, the monitoring system interprets the user selection to be a reorientation command. Obstacles on the floor surface 20 can increase a distance travelled for the planned path so that the robot 100 can avoid the obstacles. The threshold difference is, for example, 3 to 5 meters. If, for example, the path goes through a wall to another room, but the path plan distance to make it through a doorway between the two rooms is only a 1-meter deviation from the straight line distance from the robot to the user-selected location, i.e., less than the threshold difference, then the robot 100 will be driven to the user-selected location 312.

In some implementations, while the robot 100 performs a translation, reorientation, and/or zoom operation in response to a user selection, the user terminal 304 is operable by the user to interrupt the operation while the robot 100 is performing the operation. The user terminal 304, for example, includes a stop button operable by the user to stop a translation operation, a reorientation operation, and/or a zoom operation. If the user interface is a touchscreen for the user terminal 304, a stop button icon appears when the robot 100 initiates the operation, and the user operates the touchscreen to invoke a stop command to interrupt the operation. Alternatively or additionally, a subsequent user selection that proceeds an initial user selection serves as an interruption of the operation performed in response to the initial user selection.

Example Systems

Figure 5:
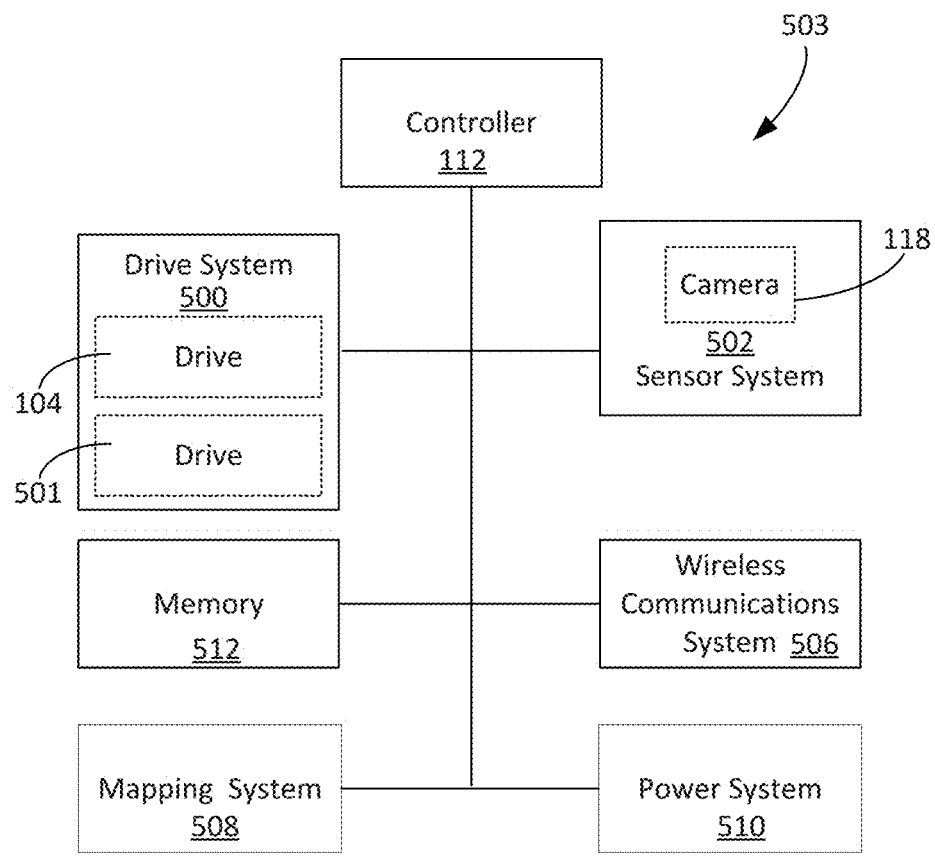
FIG. 5 is a block diagram of a control system for the robot of FIG. 4A.
Figure 6:
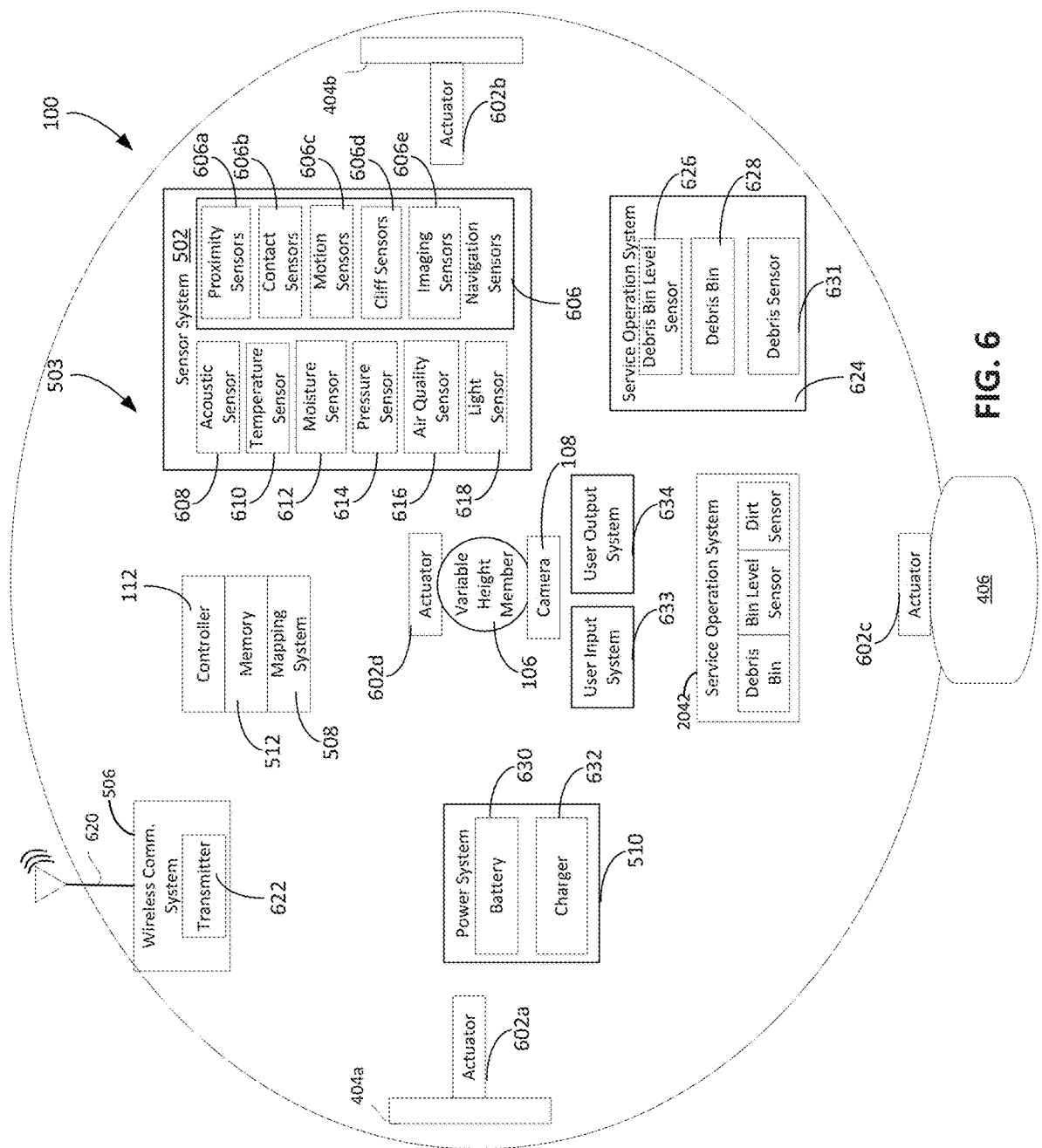
FIG. 6 is a schematic diagram of the robot of FIG. 4A.

FIGS. 4A-4D depict an example of the robot 100 configured for operation within the enclosure space 10. FIG. 5 depicts a schematic diagram of a control system 503 of the robot 100, and FIG. 6 depicts another schematic diagram of the control system 503 of the robot 100. As described herein and shown in FIG. 5, the robot 100 includes the controller 112, the drive 104, and the camera 108 described with respect to FIGS. 1A and 1B. A drive system 500 includes the drive 104. In some implementations, the drive system 500 further includes another drive 501 for the variable height member 106, e.g., to adjust a height of the variable height member 106. In some implementations, a sensor system 502 of the robot 100 includes the camera 108. In some implementations, the robot 100 includes a memory 512, a wireless communications system 506, a mapping system 508, and a power system 510.

The drive 104 of the robot 100 includes any suitable mechanism or system for actively and controllably causing the robot 100 to transit through the enclosure space 10. The drive 104 includes one or more locomotive elements such as a wheel, wheels, a roller, rollers, track or tracks, and one or more onboard electric motors operable by the controller 112 to move the one or more locomotive elements. In the example depicted in FIGS. 4A-4D and FIG. 6, the drive 104 includes two drive wheels 404a, 404b. The controller 112 is operable with one or more actuators 602a, 602b, e.g., motors, connected to the drive wheels 404a, 404b. The actuators 602a, 602b are selectively actuated to drive the drive wheels 404a, 404b, navigate the robot 100 across the floor surface 20, and reorient the robot 100 on the floor surface 20.

Figure 4A:
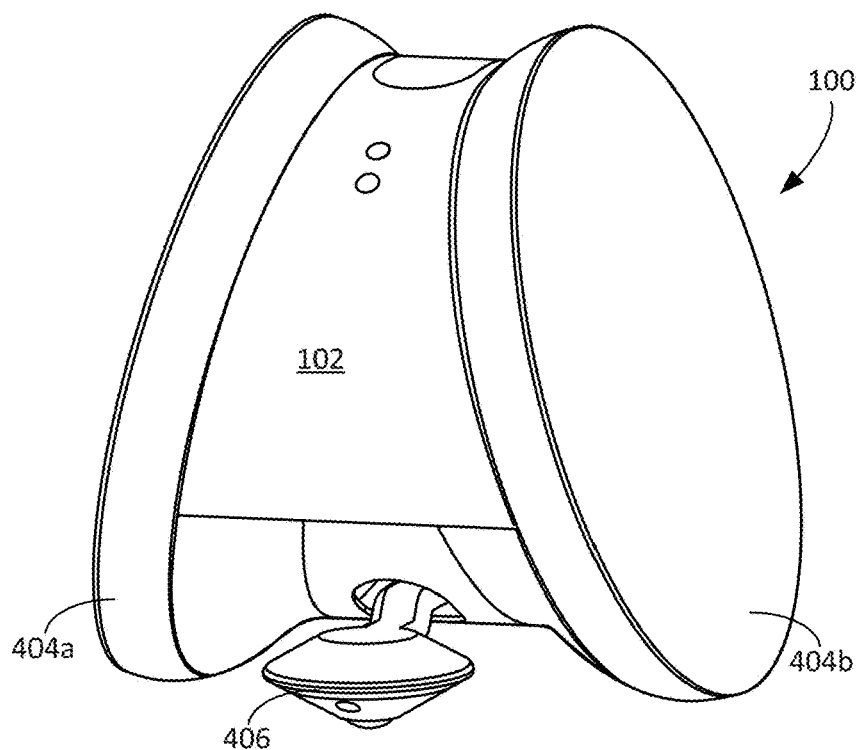
FIGS. 4A and 4B are rear perspective and front views of an autonomous mobile robot.
Figure 4B:
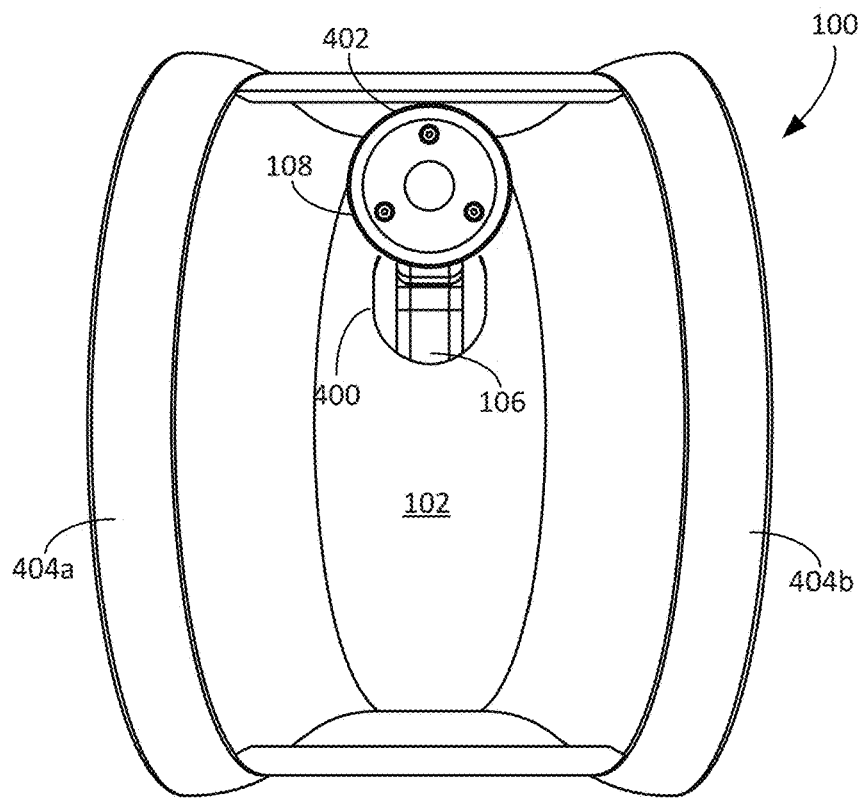

When viewed from the front as shown in FIG. 4B, the drive wheels 404a, 404b are inclined toward one another. In addition, the chassis 102 has a substantially trapezoidal profile such that a mass of the robot 100 is closer to the floor surface 20 for added stability as the robot 100 transits along the floor surface 20. In some implementations, the robot 100 has an area footprint of less than 0.5 square meters, e.g., less than 0.3 square meters, less than 0.1 square meters, less than 0.05 square meters, etc. The smaller area footprint can enable the robot 100 to be easily stored when it is not being operated and to more easily transit between objects within the enclosure space 10. If the enclosure space 10 is a cluttered enclosure space having many obstacles and having relatively small traversable areas, the smaller area footprint can enable the robot 100 to maneuver between and around the obstacles without contacting the obstacles.

In some implementations, the drive 104 further includes a rear stability wheel 406, e.g., a caster wheel, that extends outward from the chassis 102. If the stability wheel 406 is movable relative to the chassis 102, the drive 104 includes an actuator 602c operably connected to the stability wheel 406. The controller 112 operates the actuator 602c to extend the stability wheel 406 from the chassis 102. The stability wheel 406 is extended, for example, when robot 100 is performing a transit operation and is retracted when the robot 100 is stationary, e.g., is neither translating along or rotating about the floor surface 20. The stability wheel 406 can prevent the robot 100 from tipping over when the variable height member 106, and hence the camera 108, is extended. In particular, when the camera 108 and the variable height member 106 are fully protracted, e.g., in the fully protracted position (shown in FIG. 4D), the center of mass of the robot 100 is shifted upward. The rear stability wheel 406 can mitigate instability resulting from the dynamically changing location of the center of mass of the robot 100 due to protraction and retraction of the variable height member 106 during a transit operation of the robot 100.

Figure 4C:
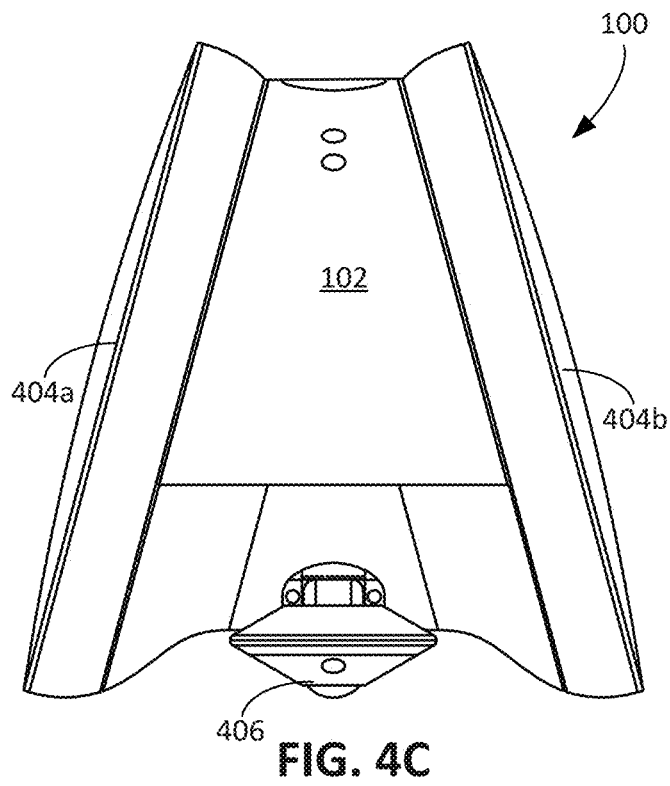
FIGS. 4C and 4D are rear views of the robot of FIG. 4A with a variable height member of the robot retracted and protracted, respectively.
Figure 4D:
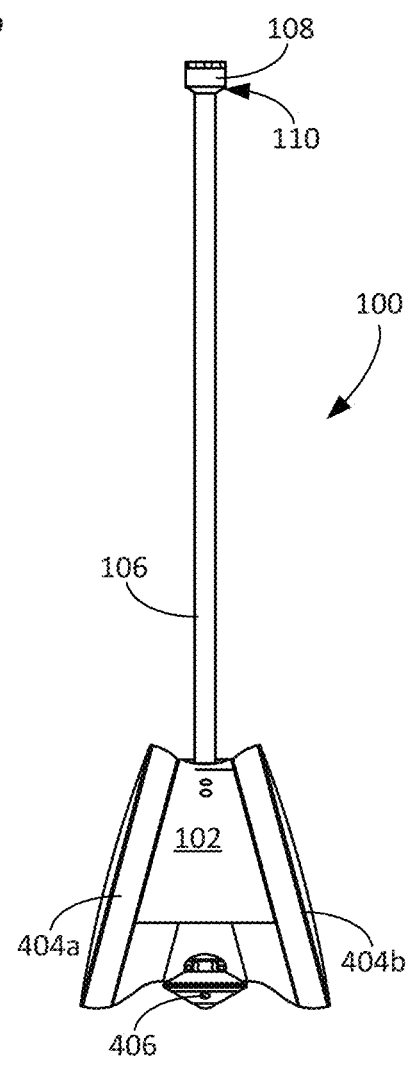

The variable height member 106 corresponds to a protractible and retractable mast configured to extend from beneath a top surface 400 of the chassis 102. The variable height member 106 is movable between a fully retracted position, as shown in FIG. 4C, and a fully protracted position, as shown in FIG. 4D. In some cases, the robot 100 is inhibited from capturing imagery of the enclosure space 10 when the robot 100 is in a privacy mode. The robot 100 is in the privacy mode, for example, when the variable height member 106 is in the fully retracted position. A top surface 402 of the camera 108 is flush with the top surface 400 of the chassis 102 when the variable height member 106 is in the fully retracted position (FIG. 4C). In some cases, the top surface 402 of the camera 108 is below the top surface 400 of the chassis 102 when the variable height member 106 is in the fully retracted position (FIG. 4C). In some cases, the lens of the camera 108 is positioned within the chassis 102 and directed at an inside portion of the chassis 102 when the variable height member 106 is in the fully retracted position, thereby preventing image capture of the enclosure space 10. Alternatively or additionally, the camera 108 is unpowered during the privacy mode to inhibit image capture.

The variable height member 106 is driven by the drive 501 including an actuator 602d operably connected to the variable height member 106. The controller 112 operates the actuator 602d to retract the variable height member 106 into the chassis 102 or protract the variable height member 106 from the chassis 102. In some examples, the variable height member 106 is extendible from the fully retracted position (FIG. 4C) to a fully protracted position in which a height of a top surface of the variable height member 106 or a height of the camera 108 is at least 1.5 meters, e.g., at least a height of between 1.5 and 2.5 meters, relative to the floor surface 20. In some implementations, the variable height member 106 is extendible from a height of 10 cm to a height of 2.5 meters relative to the floor surface 20, e.g., a height of 10 cm to 1.5 meters, 10 cm to 1 meter, 10 cm to 2 meters, etc.

The camera 108 is, for example, a high definition camera having a wide-angle lens having optical zoom capability and/or digital zoom capability. In some implementations, the camera 108 is a high definition, wide angle camera having a fisheye lens. In some implementations, the camera 108 has a virtual tilt or pan feature that enables a vantage point of the camera 108 to be changed without the camera 108 having to be physically tilted or panned.

In some implementations, the drive system 500 includes other controllable mechanisms to adjust a pose of the camera 108 relative to the chassis 102 of the robot 100. The mechanisms include actuators operable by the robot 100 to adjust, for example, a tilt orientation, a pan position, or an orientation of the camera 108. A reorientation mechanism is operable to rotate the variable height member 106 and/or the camera 108 relative to the chassis 102 to adjust the orientation of the camera 108 relative to chassis 102. Rather than operating the drive 104 to reorient the robot 100 relative to the enclosure space 10, the robot 100 operates the reorientation mechanism to rotate the variable height member 106 and the camera 108 relative to the chassis 102. A mechanism to pan the camera 108 is operable translate the camera 108 relative to the chassis 102 in lateral directions perpendicular to the forward drive direction of the robot 100 to a particular pan position. When the panning mechanism is operated, the camera 108 translates horizontally along, for example, a rail of the variable height member 106. A mechanism to tilt the camera 108 is operable to increase or decrease an angle of an image capture axis of the camera 108 relative to the forward drive direction of the robot 100 to a particular tilt position. The camera 108 is, for example, pinned to the variable height member 106 such that the camera 108 pivots upward or downward relative to the variable height member 106 when the tilting mechanism is operated.

Electrical systems of the robot 100 receive power from the power system 510. The power system 510 includes a battery 630 and a battery charger 632. In some implementations, the battery charger 632 is configured to electrically connect the battery 630 to a docking station 810 shown in FIG. 8. The docking station 810 includes a charger operative to charge the battery 630 of the robot 100 when the robot 100 is docked at the docking station 810, e.g., physically and/or electrically connected to the docking station 810.

The controller 112 is also operable with the sensor system 502. The sensor system 502 includes sensors (e.g., navigation sensors 606) usable by the controller 112 to navigate about the enclosure space 10. The navigation sensors 606 generate signals for estimating a position of the robot 100 within the enclosure space 10, for detecting objects and obstacles within the enclosure space 10, and for generating a robot map, e.g., an occupancy map of the enclosure space 10. These navigation sensors 606 include, for example, dead reckoning sensors, obstacle detection and avoidance (ODOA) sensors, and simultaneous localization and mapping (SLAM) sensors. The navigation sensors 606 include, in some cases, the camera 108 for visual identification of features and landmarks used in calculating robot pose on the robot map.

In some implementations, the navigation sensors 606 include one or more proximity sensors 606a that generate a signal used by the controller 112 to determine when an obstacle is close to the robot 100. The proximity sensors 606a include, for example, a laser scanner or a time-of-flight sensor, a volumetric point cloud sensor, a point line sensor, a time of flight line sensor such as those made by PIXART, a light detection and ranging sensor, an acoustic sensor, an infrared (IR) sensor, and/or an ultrasonic sensor. In some cases, the proximity sensors 606a include a structured light sensor that measures the three-dimensional (3D) shape of an object near the robot 100 using one or more predetermined projected light patterns. In some cases, the proximity sensor 606a is an omnidirectional sensor, e.g., a rotating IR emitter and a detector that receives a reflection of an emission transmitted by the rotating IR emitter.

In some implementations, the navigation sensors 606 include one or more contact sensors 606b that generate a signal used by the controller 112 to determine when the robot 100 physically contacts an object in the enclosure space 10. The contact sensors 606b include, for example, a bump sensor, a capacitive sensor, an inductance sensor, a Hall Effect sensor, a switch, or other sensor that generates a signal response to physical displacement. In some implementations, the robot 100 includes a bumper movably mounted to the chassis 102, and the contact sensors 606b are mounted on the bumper such that movement of the bumper causes the contact sensors 606b to generate the signal indicative of contact between the robot 100 and an object in the enclosure space 10.

In some implementations, the navigation sensors 606 include one or more motion sensors 606c that generates a signal indicative of motion of the robot 100, e.g., a distance travelled, an amount of rotation, a velocity, and/or an acceleration of the robot 100. The motion sensors 606c include, for example, a wheel odometer, an encoder to measure an amount of rotation of the actuators 602a, 602b, an accelerometer, a gyroscope, and/or an inertial measurement unit (IMU) to measure an acceleration of the robot 100 as the robot 100 traverses the floor surface 20. In some cases, the motion sensors 606c include an optical mouse sensor that illuminates the floor beneath the robot 100 as the robot navigates about the enclosure space 10 and records and compares sequential low-resolution images of the floor.

In some examples, the navigation sensors 606 include one or more cliff sensors 606d. The cliff sensors are, for example, optical sensors that detect obstacles under the robot 100, e.g., floor drop-offs, cliffs, stairs, etc. The controller 112, in response to a signal from the cliff sensors, navigates the robot 100 away from such detected obstacles.

The navigation sensors 606 include one or more imaging sensors 606e to capture imagery of the enclosure space 10. The one or more imaging sensors 606e include, for example, the camera 108. In some cases, the one or more imaging sensors 606e include an additional image capture device, e.g., a camera in addition to the camera 108, for navigation through the enclosure space 10. In some examples, the additional image capture device is a visible light camera under a top surface of the chassis 102. The visible light camera is, in some cases, angled in an upward direction. The camera is angled between, for example, 25 degrees and 90 degrees from the floor surface 20 about which the robot 100 navigates, e.g., between 30 and 70 degrees, between 35 and 60 degrees, between 45 and 55 degrees. The camera is aimed at locations on the wall and ceiling having a high concentration of elements within the enclosure space 10 that are typically static, such as window frames, pictures frames, doorway frames and other objects with visible, detectable features like lines, corners and edges.

In some implementations, the sensor system 502 further includes other sensors to detect conditions within the enclosure space 10 or conditions of the robot 100. The sensor system 502 includes, for example, an acoustic sensor 608, such as a microphone. The acoustic sensor 608 detects acoustic signals in the enclosure space 10, for example, for determining whether the enclosure space 10 is occupied by a resident.

In some cases, the sensor system 502 includes a temperature sensor 610, a moisture sensor 612, a pressure sensor 614, and/or an air quality sensor 616. The temperature sensor 610 measures a temperature of the enclosure space 10, e.g., at a current location of the robot 100 within the enclosure space 10. The moisture sensor 612 measures a moisture content of the enclosure space 10, e.g., at a current location of the robot 100 within the enclosure space 10. The pressure sensor 614 is, for example, a barometer. The pressure sensor 614 measures a barometric pressure of the enclosure space 10, e.g., at a current location of the robot 100 within the enclosure space 10. The air quality sensor 616 measures an air quality of the enclosure space 10, e.g., at a current location of the robot 100 within the enclosure space 10.

In some cases, the sensor system 502 includes a light sensor 618 to detect ambient light in the enclosure space 10. The light sensor 618, for example, detects a light level in a room or detects light entering into the enclosure space 10 through a window or opening in the enclosure space 10.

In some implementations, the sensor system 502 also generates signals indicative of operations of the robot 100. In some cases, the sensor system 502 includes a stall sensor unit integrated with the drive 104. The stall sensor unit generates signals indicative of a stall condition of the robot 100 in which the robot 100 is unable operate the drive 104 to move along the floor surface within the enclosure space 10.

Alternatively or additionally, the stall sensor unit includes optical sensors that generate signals indicative of whether a wheel of the drive 104 is moving when power is being delivered to the actuators 602a, 602b. The controller 112, upon detection of the absence of movement of the wheels 404a, 404b, determines that the robot 100 is in a stall condition. The stall sensor unit is, for example, the optical mouse sensor described herein. In some cases, an accelerometer corresponds to the stall sensor unit and generates a signal indicative of an acceleration of the robot 100 for the controller 112 to detect a stall condition.

In some implementations, the sensor system 502 includes sensors indicative of conditions of the robot 100 or indicative of components of the robot 100. These sensors include, for instance, battery charge state sensors to detect an amount of charge or a capacity for charge on a power source of the robot 100, component life sensors such as wheel tread sensors to detect a serviceability of a component or an amount of remaining life of a component, etc.

In some implementations, the sensor system 502 includes a received signal strength indicator (RSSI) sensor to measure a power of a wireless signal. The RSSI sensor is, for example, operable with a wireless transceiver of the wireless communication system 506 to detect the power of the wireless signal received at the wireless transceiver. In some cases, the RSSI sensor is part of the wireless transceiver of the wireless communication system 506.

In some implementations, one or more of the sensors of the sensor system 502, e.g., the temperature sensor 610, the moisture sensor 612, the pressure sensor 614, and/or the air quality sensor 616, are mounted to the variable height member 106. The one or more sensors are movable vertically relative to the chassis 102 such that the one or more sensors are capable of measuring a condition of the enclosure space 10 at various heights relative to the enclosure space 10.

The robot 100 can autonomously navigate using the mapping system 508, which processes readings captured by one or more of the sensors of the sensor system 502. The mapping system 508 is operable by the controller 112 to use signals from the sensor system 502 to generate a map of the enclosure space 10. The mapping system 508 estimates the position and/or orientation of the robot 100 as the robot 100 moves about the enclosure space 10 based on the signals from the sensor system 502. The mapping system 508 constructs a two-dimensional (2D) map of the floor surface of the enclosure space 10, determines the robot pose on the map and determines positions of portions of the enclosure space 10 that the robot 100 can traverse (e.g., unoccupied, traversable floor).

Using signals from the navigation sensors 606, the mapping system 508 indicates portions of the floor surface 20 that the robot 100 cannot traverse because of obstacles on the floor surface 20 or above the floor surface 20. The map constructed by the mapping system 508 is, for example, a map of walls and obstacles the robot 100 detects during its traversal of the enclosure space 10. In certain implementations, the map uses a Cartesian coordinate system or a polar coordinate system. In some cases, the map is a topological map, a representational map, or a probabilistic map.

The map is an occupancy map or an occupancy grid indicative of traversable portions and occupied portions of the enclosure space 10. Using signals from the sensor system 502, the mapping system 508 distinguishes on the robot map non-traversable portions of the floor surface 20 from traversable portions of the floor surface 20. In some examples, the mapping system 508 indicates on the robot map that the location of the object on the floor surface 20 corresponds to a non-traversable portion of the floor surface 20. The proximity sensors 606a and/or the contact sensors 606b, for example, detect an object on the floor surface 20 proximate to or contacting the robot 100. In some examples, the mapping system 508 indicates on the robot map that traversed portions of the floor surface 20 correspond to traversable portions of the floor surface 20.

In some implementations, using SLAM techniques, the mapping system 508 determines a pose of the robot 100 within a 2D map of the enclosure space 10. The pose of the robot 100 is, for example, determined based on the motion sensors 606c of the sensor system 502. Using signals from the motion sensors 606c, the mapping system 508 determines the position of the robot 100 relative to the enclosure space 10, e.g., to localize the robot 100 in the enclosure space 10.

The sensor system 502 includes one or more localization sensors that generate signals for the mapping system 508 to determine the robot's location and orientation relative to features detected in the environment. The localization sensors, in some cases, include sensors on the robot 100 capable of generating signals in response to detection of walls and objects in the environment that occupy non-traversable floor space. These sensors, alone or in combination with the SLAM sensors, determine the pose of the robot 100 on the robot map built by the robot 100. The localization sensors include for example, the navigation sensors 606, e.g., the proximity sensors 606a, the contact sensors 606b, the motion sensors 606c, the cliff sensors 606d, and the imaging sensors 606e.

The localization sensors generate signals from which unique signatures, patterns, or features are extracted. When the mapping system 508 determines that these features have been detected, the mapping system 508 determines the pose of the robot 100 on the map of the enclosure space 10 using the location and orientation of the robot 100 relative to these detected features.

In some implementations, the mapping system 508 implements other suitable techniques and systems to localize the robot 100, such as machine vision, light beacons, or radiofrequency (RF) RSSI technology. In some examples, the mapping system 508 uses RF signals to execute SLAM techniques. The localization sensors include, for example, the wireless communication system 506, e.g., the RSSI sensor of the wireless communication system 506. The mapping system 508 localizes the robot 100 based on a signal received by the RSSI sensor. The controller 112 operates the drive system 500 to navigate the robot 100 through the enclosure space 10 while the mapping system 508 localizes the pose of the robot 100 based on the signal received by the RSSI sensor. Features for SLAM are extracted from variations in the strength of the signal through the enclosure space 10.

In some implementations, the mapping system 508 uses visual simultaneous localization and mapping (VSLAM) and/or Feature Recognition or Class Recognition techniques to build its map and determine a current pose of the robot 100 on the map. The one or more localization sensors include the imaging sensors 606e, e.g., the camera 108 or other image capture device, and the mapping system 508 executes the VSLAM techniques to extract features from the captured images. Using the imagery captured by the imaging sensors 606e, the mapping system 508 determines the pose of the robot 100 on the robot map that the robot 100 builds as it navigates about the enclosure space 10, e.g., navigates through zones A-H. In some cases, the mapping system 508 localizes the robot 100 within the enclosure space 10 by determining a current pose of the robot 100 with reference to the features corresponding to objects within the enclosure space 10 that are identified in the captured imagery.

In some implementations, the extracted features indicate the room where the robot 100 is located. Referring back to FIG. 1, the extracted features form unique identifiers for each of the zones A-H. The robot 100 uses the extracted features to determine the zone within which the robot 100 is located. For example, a specific feature or features associated with a room identifier is detected, thereby enabling the zone within the robot 100 is located to be determined. In some implementations, the robot 100 recognizes pre-identified rooms through object recognition. The robot 100, for example, uses its camera 108 to capture images of objects associated with each zone, e.g., a stove, dishwasher and refrigerator. As described herein, recognized objects and zones can be associated with labels presented in the interactive representation. In some cases, indicators overlaid on the interactive representation are formed from the extracted features to inform the user when the robot 100 has entered a new zone associated with an extracted feature or has identified a particular object associated with an extracted feature.

In some implementations, the robot 100 localizes the locations of readings captured by any of the sensors of the sensor system 502 including readings captured by any of the navigation sensors 606a-606e, the acoustic sensor 608, temperature sensor 610, the moisture sensor 612, the pressure sensor 614, the air quality sensor 616, and/or the light sensor 618. The readings are localized on the robot map. As the mapping system 508 localizes the pose of the robot 100, the mapping system 508 localizes any readings collected using its sensor system 502 based on its own pose. In some examples, the robot 100 localizes the location of imagery captured by the camera 108. The robot map is, for example, used to combine the imagery such that the interactive representation formed from the imagery preserves physical continuity of the enclosure space 10.

While the robot map and the operations of the mapping system 508 are described as being performed by the robot 100, in some implementations, the robot 100 collects data for constructing the robot map, and other devices and systems of the monitoring system construct and store the robot map. The map is persistent and stored in a remote computing system of the monitoring system, e.g., the remote computing system 702 in FIG. 7, for access by the robot 100. In each subsequent mission, the robot 100 updates the persistent map according to changing conditions within the enclosure space 10, such as furniture or objects that have moved within the enclosure space 10. The robot 100 builds a progressively improving map using the mapping system 508 and transmits data representing the robot map to the remote computing system using the wireless communication system 506. In some cases, the robot 100 transmits entire sets of map data, simplified representations of map data, or abstractions of map data using the wireless communication system 506.

Turning to a memory 512 of the robot 100, the controller 112 accesses the memory 512 that stores information collected by the sensor system 502 and stores routines executable by the controller 112 to cause the robot 100 to perform operations within the enclosure space 10. Routines include navigational routines, for example, to navigate the robot 100 about the enclosure space 10. Routines also include, for example, a patrol routine in which the robot 100 navigates along the route 200 and through one or more of the waypoints L. The controller 112 initiates operations of the robot 100 in response to signals from, for example, the sensor system 502 or wireless command signals transmitted to the controller 112 through the wireless communication system 506 from a remote or local user terminal.

In some implementations, the robot 100 includes a service operation system 624 operable to execute a service operation in the enclosure space 10. The executed service operations depend on the type of the robot 100. The robot 100 includes systems for floor washing, floor mopping, floor sweeping, telecommunications, etc.

In some implementations, the service operation system 624 includes a floor cleaning system that cleans a floor surface of the enclosure space 10 as the robot 100 transits through the enclosure space 10. The cleaning system includes, for example, rotatable rollers or brushes that agitate debris from the floor surface into a debris bin (not shown) mounted on the robot 100. The cleaning system includes an air mover that, upon activation, moves air, and thereby debris on the floor surface, toward the debris bin. As the robot 100 navigates about its environment during a cleaning mission, the robot 100 activates its cleaning system to ingest debris, thereby cleaning the floor surface.

In some cases, the service operation system 624 includes a debris bin level sensor 626, e.g., a sensor of the sensor system 502, that detects an amount of debris ingested into a removable debris bin 628 for the robot 100. The service operation system 624 further includes a debris sensor 631 to detect when the robot 100 ingests debris and/or to detect a rate of debris ingestion.

In some implementations, the robot 100 includes a user input system 633 that includes, for example, manually operable buttons, a touchscreen display, etc. The user input system 633 is operable by the user to cause the controller 112 to initiate one or more operations of the robot 100. The robot 100 further includes a user output system 634 to provide indications to the user. The user output systems 634 includes, for example, a display, an audio transducer, an indicator light, or other appropriate system to provide visual or audible indications to a user of a status of the robot 100.

The wireless communication system 506 allows the robot 100 to communicate with other nodes, e.g., computing devices, in a monitoring system 700 depicted in FIG. 7. The monitoring system is, for instance, a monitoring system 700 described with respect to FIG. 7 herein including the robot 100. In some cases, the monitoring system includes remote computing systems and devices and local computing systems and devices. The monitoring system includes, for example, local user terminals and remote user terminals. In some cases, the monitoring system includes connected devices within the enclosure space 10. In this regard, the monitoring system includes a controller remote from the robot 100 and remote from the user terminal 304, the controller 112 of the robot 100, a controller of the user terminal 304, or combinations thereof.

As shown in FIG. 6, the wireless communication system 506 includes a wireless receiver 620 to receive wireless signals and a wireless transmitter 622 to transmit wireless signals, e.g., narrowband signals, broadband RF signals, Wi-Fi signals, etc. In some examples, the wireless communication system 506 enables communication of data through a cellular data interface, a Bluetooth interface, a wireless local area network interface (e.g., 802.11), another RF communication interface, and/or an optical/infra-red communication interface. In some cases, the wireless communication system 506 includes a wireless transceiver including both a wireless receiver and a wireless transmitter. The wireless transceiver is, for example, operable by the controller 112 and configured to communicate with a wireless network including other computing devices. The wireless transceiver transmits data, including the imagery captured by the camera 108, through the wireless network to a remote user terminal operable to present the interactive representation.

The monitoring system 700 includes a network of nodes, e.g., computing devices and systems in the monitoring system 700, that communicate with one another. Each of the nodes is equipped with a communication system to enable communication with other nodes in the monitoring system 700. Each of the nodes is equipped with, for example, a wireless communication system similar to the wireless communication system 506 of the robot 100 to enable wireless communication with other nodes in the system 700.

In the monitoring system 700 depicted in FIG. 7 and in other implementations of the monitoring system 700, the nodes are in wireless communication with one another. The nodes communicate to one another through communication links. The communication links include, for example, wireless links that utilize various communication schemes and protocols, such as Bluetooth classes, Wi-Fi, Bluetooth-low-energy, 802.15.4, Worldwide Interoperability for Microwave Access (WiMAX), an infrared channel or satellite band, and other appropriate schemes and protocols.

The wireless communication system 506 facilitates communication between the robot 100 and remote nodes located physically outside of the enclosure space 10, e.g., a remote computing system 702 and a remote user terminal 704. The remote user terminal 704 is, for example, one of user terminals described herein. The wireless communication system 506 also enables communication between the robot 100 and local nodes positioned within the enclosure space 10, e.g., one or more other connected devices 706 and a local user terminal 712. In some cases, the robot 100 directly communicates with the connected devices 706. The local user terminal 712 is located within the enclosure space 10. The local user terminal 712 is, for example, one of the user terminals described herein.

Referring briefly to FIG. 8, which depicts the floorplan of the enclosure space 10 showing various devices that could be in the enclosure space 10, the connected devices 706 include, for example, one or more environmental sensing devices 800a-800c and/or one or more integral automation controller devices 802a-802c. Examples of connected devices include connected thermostats, audible alarm devices, humidifiers or air quality sensing devices, connected smart devices for doors and garage doors (e.g., door locks, motorized garage door openers, door bells/door chimes and door entry intercoms, and door eye viewer), connected smart sensors (e.g., smoke detectors, carbon monoxide detectors, water leak/humidity detectors, combination smoke and carbon monoxide sensor, door/window sensors, and motion sensors), connected smart lighting/power devices (e.g., ipv6 light bulbs, in-wall outlet/switch or dimmer, power strip, and smart plug/adapter module) and other connected smart devices (e.g., sprinkler system, blinds or drapes, major home or kitchen appliances, such as refrigerators, dish washers, etc., countertop appliances, such as blenders, crockpots, etc., and ceiling or other types of fans).

The environmental sensing devices 800a-800c include any suitable sensors operable to generate data based on a condition or phenomenon in the enclosure space 10. Examples of environmental sensing devices include a temperature sensor, a contact sensor, an acoustic sensor, a microphone, a motion sensor, a passive IR motion sensor, a pressure sensor, a visible light sensor, a gas composition sensor, an air quality sensor, an ambient light sensor, or other sensors to detect conditions and phenomena in the enclosure space 10.

The automation controller devices 802a-802c are any suitable devices operable to control operation of a device or system associated with the enclosure space 10. In some implementations, the automation controller device 802a is a thermostat to operate, e.g., activate, deactivate, actuate, or deactuate, a heating, ventilation and air conditioning (HVAC) system 804. The automation controller device 802b is a device operative to open and close a window covering, e.g., automatic shades. The automation controller device 802c is an automatic latch or lock device to lock the front door 118 on the enclosure space 10. While three automation controller devices 802a-802c are shown, the enclosure space 10 includes fewer or more automation controller devices depending on the implementation.

The environmental sensing devices 800a-800c and the automation controller devices 802a-802c are, in some cases, stationary devices that remain in one location within the enclosure space 10, e.g., affixed to a wall of the enclosure space 10 throughout executing processes to monitor and control operations within the enclosure space 10. In contrast to the robot 100, in some cases, the environmental sensing devices 800a-800c and the automation controller devices 802a-802c are picked up and transported by a user be relocated within the enclosure space 10. In some cases, the environmental sensing devices 800a-800c and the automation controller devices 802a-802c are permanently installed in a given location within the enclosure space 10.

In some implementations, the connected devices 706 include autonomous mobile devices, e.g., one or more autonomous mobile robots that autonomously traverse the floor surface 20 of the enclosure space 10. The autonomous mobile devices include, for example, vacuum cleaning robots, floor washing robots, home monitoring robots, mopping robots, companion robots, sweeping robots, combinations thereof, and other appropriate robots.

In some cases, the connected devices 706 include the docking station 810. The docking station 810 includes a wireless transceiver to communicate with other devices in the monitoring system 700. The docking station 810 communicates wirelessly directly with the robot 100 through Bluetooth, nearfield induction, IR signals or radio. In some cases, the docking station 810 serves as an intermediary for transmission of information between the robot 100 and the private network 714. The docking station 810 is connected (wired or wirelessly) to the private network 714 to enable or facilitate transmission of data from the robot 100 to the private network 714 and/or from the private network 714 to the robot 100. The docking station 810 corresponds to an automation controller device that automatically transmits data from the robot 100 to the private network 714 and elsewhere when the robot 100 is docked at the docking station 810.

The controller 112 of the robot 100, using the wireless communication system 506, transmits data to the remote computing system 702. In some examples, the data include the signals generated by the sensors of the sensor system 502. The data include the imagery captured by the camera 108. Any portion of the constructed map is transmittable to and stored in a location other than on the memory 512 of the robot 100, e.g., the local hub 716, the remote computing system 702, through the gateway 816 within the enclosure space 10 to a remote user terminal, a server on the Internet, or virtualized instances of the same available on the Internet.

In some implementations, if the sensor system 502 includes the RSSI sensor, the sensor system 502 detects a location based on the measured RSSI from one of the connected devices 706. If the sensor system 502 includes the wireless transceiver of the wireless communication system 506, the sensor system 502, using the wireless transceiver, also detects a status of the connected device. In some examples, the status corresponds to a power level of the connected device. If the connected device is an environmental sensing device or includes a sensor to measure a condition of the enclosure space 10, in some cases, the status corresponds to a sensor measurement. If the connected device is an automation controller device, in some cases, the status corresponds to an operational state of the connected device, e.g., whether the device is activated or deactivated, a mode of operation of the device.

In some implementations, the robot 100 discovers connected devices 706 in the enclosure space 10 and localizes them on the robot map formed using the mapping system 508. As the robot 100 traverses the enclosure space 10, the controller 112 localizes the robot 100 based on locations of the connected devices 706 within the enclosure space 10.

In some cases, the robot 100 automatically senses the position of the connected devices 706 relative to the robot pose on the robot map and projects their location into the robot map. As the robot 100 traverses the enclosure space 10, the controller 112 uses RF signatures, visual recognition, received signal strength and other methods to recognize connected devices in the enclosure space 10 and automatically place them on the robot map of the enclosure space 10. The locations of the connected devices 706 on the robot map are determined, for example, using single point measurements or through multiple point measurements and triangulation of the locations based on orientation and/or signal intensity and/or digitally encoded information from the device. In some examples, the connected devices 706 actively emit wireless signals to aid the robot 100 in localizing itself within the enclosure space 10. The sensor system 502 detects the wireless signals, and the controller 112 localizes the robot 100 based on a property of the wireless signals, e.g., a strength of the wireless signals.

In some examples, the location of a connected device is determined by generating a signal from the robot 100 generates a signal at one or more locations at which the connected device can detect the signal. Alternatively, the robot 100 and the connected device both generate signals detectable by the other. The location of the connected device 706 is determined based on a property of the response signals that varies based on a location at which the robot 100 generates the signal. The property is, for example, a strength of the response signals.

In some examples, the robot 100 transmits the robot map to the remote computing system 702. If the robot 100 includes any sensors to detect conditions of the enclosure space 10 and/or the robot 100, the robot 100 transmits information indicative of the condition of the enclosure space 10 and/or the robot 100 to the remote computing system 702. As described herein, the data can be localized to locations within the enclosure space 10, and localization information defining the localization of the data is transmitted to the remote computing system 702.

The remote user terminal 704 retrieves data from the remote computing system 702, e.g., retrieves the data representing the imagery captured by the robot 100. The monitoring system 700 is configured such that the remote user terminal 704 is capable of retrieving the data representing the captured imagery in real time, thereby enabling real time monitoring of the enclosure space 10 from the remote user terminal 704. In some cases, the remote user terminal 704 retrieves data directly from the robot 100.

The remote computing system 702 includes computing resources remote from the environment of the robot 100, e.g., remote from the enclosure space 10. In some cases, the remote computing system 702 includes one or more servers that establish wireless links with each of the robot 100, the user terminal 704, and the connected devices 706. In some cases, the remote computing system 702 corresponds to one or more nodes in a public network 710, e.g., a wide area network (WAN), the Internet, etc. The remote computing system 702 includes, for example, a portion of a network-accessible computing platform implemented as a computing infrastructure of processors, storage, software, data access, and so forth maintained and accessible through a communication network as described herein.

In some implementations, the robot 100, the connected devices 706, and/or the local user terminal 712 are nodes in a private network 714, e.g., a broadband local area network (LAN). As shown in FIG. 8, the private network 714 is enabled by a router 812 and a broadband wireless access point (WAP) 814. The private network 714 in turn is connected to the public network 710, thereby enabling communication between devices in the enclosure space 10, e.g., the robot 100, the connected devices 706, and/or the user terminal 712, and remote devices, e.g., the remote user terminal 704 and the remote computing system 702. The private network 714 is connected to the remote computing system 702 by the public network 710 (e.g., the Internet) through a gateway 816, e.g., a broadband modem, and an external connection 818, e.g., to an Internet Service Provider (ISP). The router 812, the WAP 814 and/or the gateway 816 may be integrated in a single device.

Various alternative network configurations may be employed for the private network 714. In some cases, the robot 100, the connected devices 706, and/or the user terminal 712 are connected in the private network 714 through a hub 716 connected to the private network 714. The hub 716 is any suitable device configured to provide the functionality described herein. In some examples, the hub 716 includes a processor, memory, a human-machine interface, a wireless communications module, and an associated antenna. In some cases, the hub 716 includes connection hardware, e.g., an Ethernet connector, for wired connection to a router connected to the private network 714. The hub 716 is connected to the private network 714, for example, through a wired connection to the router 812 and/or through a wirelessly connection to the router 812 using a wireless transceiver 824 of the hub 716. The hub 716, for example, corresponds to a connected device, e.g., one of the connected devices 706. In some examples, the hub 716 includes an integral environmental sensor and/or an integral automation controller device.

In some implementations, the robot 100 communicates wirelessly directly with the hub 716, e.g., using narrowband or broadband RF communication. If the robot 100 is not equipped with a wireless transmitter to communicate with the WAP 814, the robot 100, for instance, communicates with the hub 716, which in turn relays data from the robot 100 to the private network 714 and/or the remote computing system 702. In some implementations, the system 700 includes a network bridge device that receives and converts RF signals from the robot 100 and relays them to the router 812 to be delivered to the remote computing system 702 or another device in the private network 714.

In some implementations, the monitoring system 700 includes a low power mesh data network employing a mesh topology in which RF communications signals are relayed through mesh nodes between the robot 100 and the hub 716. In some cases, the connected devices 706 serve as mesh nodes. The robot 100, in some cases, serves as a mesh node to relay signals between the hub 716 and other nodes, e.g., the connected devices 706. Alternatively or additionally, each of the nodes of the monitoring system 700 serves as a mesh node.

Example Processes

Figure 9:
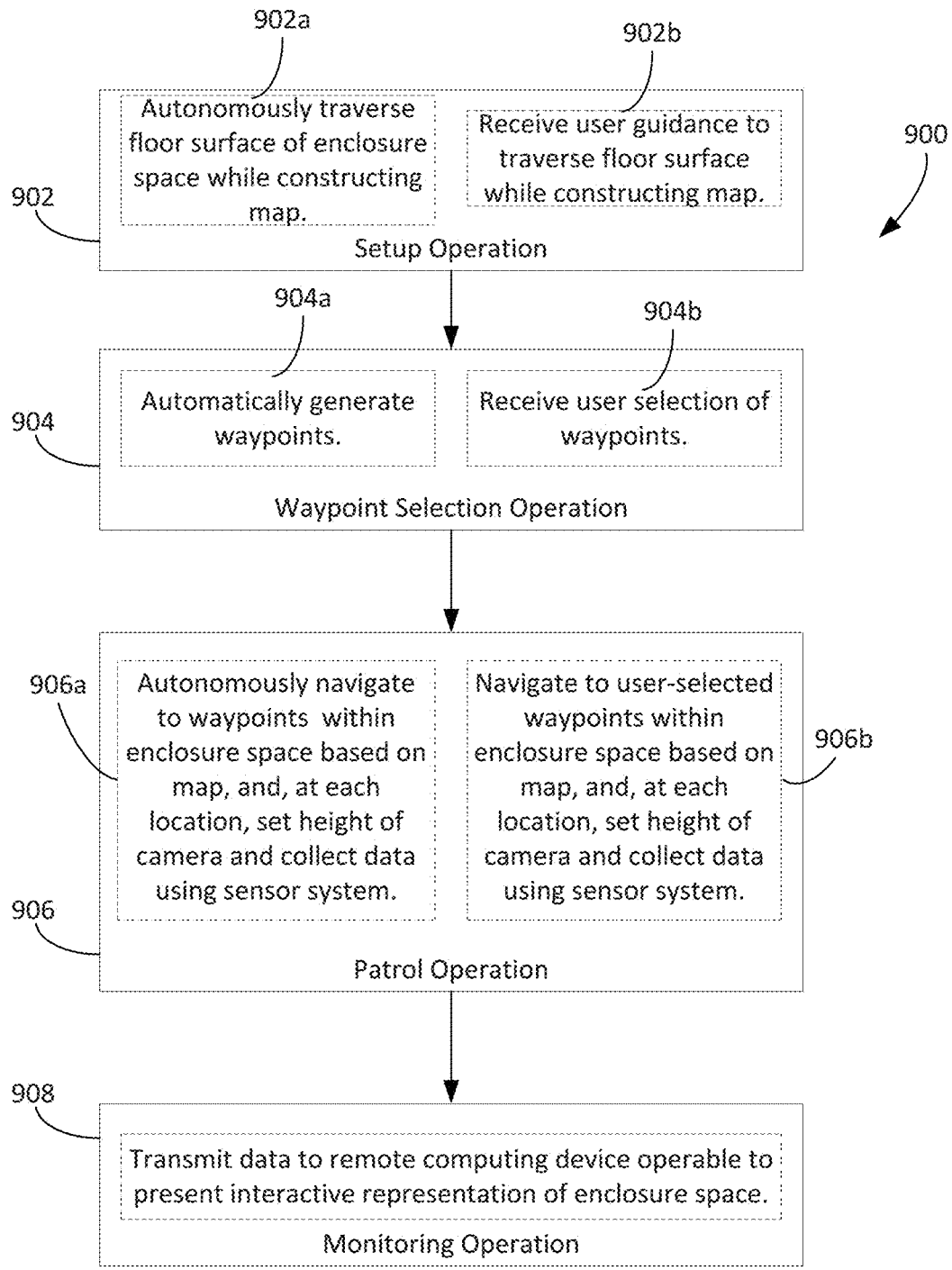
FIG. 9 is a flowchart of a process of monitoring the enclosure space.

FIG. 9 depicts a process 900 for monitoring the enclosure space 10 using the monitoring system 700 described herein. During the process 900, the robot 100 autonomously traverses or is guided by the user through the enclosure space 10 while the sensor system 502 of the robot 100 collects data. The robot 100, for example, traverses through the enclosure space 10 along the route 200. The collected data are used to construct the map and also serve as input data for generating the interactive representation to be viewed by the user on a user terminal, e.g., the remote user terminal 704 and/or the local user terminal 712.

The process 900, operations of the process 900, and other processes and operations described herein can be executed in a distributed manner using one or more of the nodes of the monitoring system 700. For example, the remote computing system 702, the robot 100, the user terminals 704, 712, and other devices connected within the monitoring system 700 may execute one or more of the operations in concert with one another. Operations described as executed by one of the nodes are, in some implementations, executed at least in part by two or all of the nodes. For example, a command may originate at one node and cause an action to be performed at another node through transmission of data through the monitoring system 700. In some cases, a command to store data originates at one of the user terminals 704, 712, and the data is stored at a second node, e.g., the robot 100 and/or the remote computing system 702.

In some examples, to perform the operations described with respect to the process 900, the user terminal accesses data from other nodes in the monitoring system 700, e.g., the robot 100 or the remote computing system 702. Imagery of the enclosure space 10 is, for example, accessed by launching an application on the user terminal. The imagery captured by the robot 100 are combined to form navigable views of the interactive representation traversed by the robot.

During a setup operation 902, a map of the enclosure space 10 is constructed. The map is constructed using the processes described with respect to the mapping system 508 of the robot 100. In some examples, during an autonomous setup operation 902a, the robot 100 performs an autonomous traversal operation in which the robot 100 autonomously traverses the floor surface 20 of the enclosure space 10 while constructing a map using the mapping system 508, e.g., gathering location information about traversable and non-traversable space in the enclosure space 10. In some cases, the robot 100 operates the drive 104 in a manner to maintain the chassis 102 at a predefined distance from objects in the enclosure space 10 during transit, e.g., between 1 cm to 30 cm from the objects. During the autonomous setup operation 902a, the robot 100 explores the enclosure space 10 by traversing through portions of the enclosure space 10 for which mapping data has not been collected. By exploring the enclosure space 10, the robot 100 collects additional data to extend the area covered by the map it constructs during the setup operation 902. Other examples of data collected to map the enclosure space 10 and of processes executed to map the enclosure space 10 are described with respect to the mapping system 508. In addition to or as an alternative to the automatic setup operation 902a, a guided setup operation 902b of the setup operation 902 is implemented. During the guided setup operation 902b, the robot 100 receives user guidance to traverse the floor surface 20 of the enclosure space 10 while constructing the map. A human user guides movement of the robot 100 by manually driving or remotely operating the robot 100 as the robot 100 constructs the map using the sensor system 502. The robot 100 is operated in a guided setup mode in which the sensor system 502 continuously generates data for constructing the map. In some cases, the user physically moves the robot 100 throughout the enclosure space 10 while the robot 100 constructs the map using the sensor system 502. In some cases, the user remotely controls the movement of the robot 100 using the user terminal. Alternatively or additionally, the user physically moves through the enclosure space 10 while the robot 100 tracks the movement of the user using sensors of the sensor system 502, e.g., using the proximity sensors 606a to detect a location of the user, using the acoustic sensor 608 to detect footsteps or other noise generated by the user as the user moves through the enclosure space 10, etc.

In some implementations, the setup operation 902 includes a combination of the guided setup operation 902b and the autonomous setup operation 902a. In some examples of a combined guided and autonomous setup operation, the robot 100 initially autonomously traverses the enclosure space 10 to construct the map. A representation of a floorplan, e.g., the floorplan shown in FIG. 2, formed from data collected during the autonomous traversal is presented to the user. The user reviews the floorplan on the user terminal to determine whether the robot 100 failed to traverse through any portions of the enclosure space 10. During the guided setup operation 902b, the user, in some cases, guides the robot 100 through portions of the enclosure space 10 that the robot 100 did not traverse during the autonomous setup operation 902a.

After the setup operation 902, during a waypoint selection operation 904, waypoints L described with respect to FIG. 2 are generated. The waypoints L are marked on the map constructed by the robot 100 using the mapping system 508. As described herein, the waypoints L correspond to locations within the enclosure space 10 at which the robot 100 collects data, e.g., captures imagery and/or other sensor data using the sensor system 502, during a patrol operation 906. Also as described herein, the waypoints L defined during the waypoint selection operation 904 determine the locations within the enclosure space 10 through which the robot 100 traverses during the patrol operation 906.

An operational setting of the robot 100 for each waypoint L is selected during the waypoint selection operation 904. The operational setting of the robot 100 corresponds to, for example, one or more selected heights at which the camera 108 is to be operated to capture imagery of the enclosure space 10.

In some implementations, rather than or in addition to a height setting for the variable height member 106 and/or the camera 108 being selected during the waypoint selection operation 904, another operational setting of the robot 100 is selected for a waypoint during the waypoint selection operation 904. In some cases, the operational setting corresponds to a setting of the camera 108, e.g., a tilt orientation, a pan position, an orientation of the camera 108, an aperture setting of the camera 108, a shutter speed of the camera 108, an exposure index or an ISO film speed for the camera 108, a frame rate for the camera 108, and other appropriate operational settings of the camera 108. In some examples, if a particular zone in the enclosure space 10 does not typically have a constant source of natural or artificial lighting, the camera setting includes an aperture setting, a shutter speed, and an exposure index for the camera 108 to improve quality of the imagery captured at waypoints in the zone. To increase the lighting for the imagery captured by the camera 108, the aperture setting for the particular zone is larger, the shutter speed is faster, and the exposure index is higher at the waypoints.

In some implementations, the operational setting corresponds to an amount of rotation of the camera 108 at a waypoint to limit an angular extent of the imagery captured at the waypoint. The amount of rotation of the camera 108 corresponds to, for example, an amount that the camera 108 is rotated relative to the chassis 102 at the waypoint. The amount of rotation of the camera 108 determines the angular extent of the imagery captured at the waypoint. As described herein, the robot 100 is capable of rotating in place to capture imagery having an angular extent up to 360 degrees. The imagery captured by the robot 100, for example, is formed into a panoramic view of a region of the enclosure space 10 surrounding the waypoint.

In some implementations, to form the panoramic view, the camera 108 is operated to capture imagery at multiple predefined orientations of the robot 100 at the waypoint. The predefined orientations are, for example, spaced between 30 degrees and 90 degrees, e.g., between 30 degrees and 45 degrees, 45 degrees and 60 degrees, 60 degrees and 90 degrees, etc. The camera 108 captures multiple images at each predefined orientation of the robot 100 with each of the images at a particular predefined orientation being captured using a different exposure setting. The multiple images captured at the particular predefined orientation are combined using a high dynamic range (HDR) technique to produce an HDR image. The images produced using this technique can be perceived to be more realistic to viewers of the image. The HDR images formed from the imagery captured at the different orientations are then combined to form the panoramic view of the region of the enclosure space 10. In some examples, exposure levels of HDR images of the different orientations are determined and blended in a manner to enable the panoramic view to have an overall exposure that is consistent between the different stitches images.

In some examples, distinctive features of the enclosure space 10 present in two images showing adjacent portions of the enclosure space 10 are used to stitch the two images together to form the panoramic view. The two images, for example, correspond to images captured at sequential orientations of the robot 100 at the waypoint. The distinctive features serve as reference points present in both images for stitching the two images together. However, if two images showing adjacent portions of the enclosure space 10 do not include such distinctive features, in some examples, a predefined relationship between images at sequential orientations is used to stitch the images together. Such images, for example, show overlapping views of a region of the enclosure space 10 with relatively few distinct features, e.g., a bare wall. The predefined relationship, for example, corresponds to an amount of overlap between the images when they are stitched together. The amount of overlap corresponds to, for example, a number of overlapping pixels, an overlapping length, an overlapping orientation, etc. If distinctive features are identified in the images, the relationship between the images is determined based on the distinctive features.

Alternatively, rather than being stitched together based on predefined relationships, images at sequential orientations that do not have shared distinctive features are not used to form the panoramic view. If the waypoint is adjacent to a portion of a wall within the enclosure space 10, e.g., within 5 to 100 centimeters of a wall, the camera setting for the waypoint defines an amount of rotation of the camera 108 that does not cause the camera 108 to capture imagery of the portion of the wall. The angular extent of captured imagery is limited to 180 degrees so that the camera 108 is not directed toward the wall during the image capture. Alternatively, the camera 108 captures the imagery of the portion of the wall, but the imagery is not used to form the panoramic view. Rather, only the imagery for the portions of the room with distinctive features is used to form the panoramic view.

In some implementations, during the waypoint selection operation 904, the route 200 described with respect to FIG. 2 is generated. In some cases, an ordering of the waypoints is selected to define the route 200 through the waypoints L. The robot 100 during the patrol operation 906 through the waypoints L follows the route 200 such that the robot 100 moves through the waypoints L in the selected ordering.

In some implementations, a name is automatically assigned to each of the waypoints L. The name for the waypoint includes, for example, a label of a room in which the waypoint is located (e.g., "Kitchen") or an object of reference near a waypoint (e.g., "Stove"). The monitoring system 700 automatically generates the name for the waypoint based on visual recognition of objects in imagery captured by the robot 100 during the setup operation 902. The names are, for example, associated with typical household objects and devices. The names include, "Refrigerator," "Stove," "Washing Machine," "Dryer," "Front Door," "Back Door," "Window," "Bookshelf," etc. In some cases, the names are associated with functional uses for rooms within the enclosure space 10. The names are, for example, "Kitchen," "Study," "Dining Room," "Bathroom," etc. In some cases, the names are associated with connected devices within the enclosure space 10. The monitoring system 700 automatically recognizes objects typically associated with these rooms and accordingly assigns the names to the waypoints L. The names assigned to the waypoints L enables the user to easily select views based on the objects or rooms that the user wishes to monitor.

The waypoint selection operation 904 includes an automatic waypoint selection operation 904*a* and/or a guided waypoint selection operation 904*b*. In an automatic waypoint selection operation 904*a*, the waypoints L are automatically generated, e.g., by the robot 100 or by other computing systems of the monitoring system 700. The waypoints L are generated based on data collected during the setup operation 902. The robot 100 provides the robot map to the remote computing system 702 and the waypoints L are generated remotely and communicated back to the robot 100.

In some cases, the waypoints L are selected such that the selected waypoints L meet one or more criteria. The waypoints can be distributed in accordance to the one or more criteria such that the imagery captured by the robot 100 at the waypoints L evenly covers the enclosure space 10. In some cases, the criteria include a desired spacing between waypoints L that are adjacent to one another. The desired spacing between waypoints L is, for example, between 0.5 and 5 meters, e.g., between 0.5 and 1 meter, 1 meter and 3 meters, 2 meters and 4 meters, 3 meters and 5 meters, etc. In some cases, the criteria include a desired spacing between a location and an object in the enclosure space 10, such as a wall or other obstacle. The desired spacing is between, for example, 0.1 and 1 meter, e.g., between 0.1 and 0.3 meters, 0.3 and 0.6 meters, 0.6 and 1 meter, etc. In some cases, the criteria include a desired number of waypoints L placed across the enclosure space 10 per square meter of the enclosure space 10, e.g., per square meter of portions of the enclosure space 10 that the robot 100 has mapped. The desired number of waypoints L per square meter is, for example, 0.1 to 3 waypoints per square meter, e.g., 0.1 to 1 waypoint per square meter, 1 to 3 waypoint per square meter, etc.

In some cases, the criteria include a desired distribution of waypoints L within the enclosure space 10, e.g., within the zones A-H of the enclosure space 10. The zones A-H, in some cases, correspond to rooms defined by objects of the enclosure space 10, such as walls, furniture, obstacles, and other objects in the enclosure space 10. If autonomously generated, the zones A-H are generated based on the distribution of traversable and non-traversable area in the map. The zones A-H are, for example, selected based on data in the map representing obstacles and/or walls dividing the enclosure space 10. The zones A-H are, in some cases, selected based on identification of objects and/or features that distinguish one zone from the other zones, e.g., a connected device in the zone, a unique object in the zone, or other distinguishing object or feature in the zone. The waypoints L are, for example, generated such each of the zones A-H includes at least one waypoint. In addition, the locations are generated such that each zone A-H includes at least one location L. In some cases, larger zones or a non-rectangular zone, e.g., zone G, includes two or more locations, e.g., waypoints $L_2$-$L_4$.

In some implementations, the criteria include a desired characteristic of the route 200 defined by the waypoints L and the ordering of the waypoints L. In some cases, the desired characteristic is a desired length of the route 200. The length of the route 200 has, for example, the minimum length possible among the potential combinations of orderings for the waypoints L. In some cases, the desired characteristic of the route 200 corresponds to an ordering of the waypoints L such that the waypoints L in the same zone are adjacent to one another, e.g., such that the robot 100 consecutively moves through waypoints in the same zone during the patrol operation.

In some implementations, the operational setting of the robot 100 is selected automatically during the automatic waypoint generation operation 904a. In some examples, the data collected using the sensor system 502 during the setup operation 902 serve as inputs for the automatic selection of the selected heights. The system 700, for example, identifies household objects in the imagery captured by the camera 108 during the setup operation 902. The system 700 automatically identifies household objects to be monitored by the user, e.g., objects in the household that may have operational states or statuses that would be beneficial for the user to monitor. In some cases, the household object corresponds to one of the connected devices 706. In other cases, the household object corresponds to an object with multiple states, e.g., active and inactive states, open and closed states, etc. The object is, for example, a stove, an oven, a refrigerator, an appliance, a door, a lighting element, a connected device, etc. Based on the data collected using the sensor system 502, the selected heights at the selected waypoints L are automatically selected such that the camera 108 is able to capture imagery of the household objects. In some cases, multiple selected heights are automatically selected for each selected waypoint L, e.g., such that the camera 108 at each waypoint L captures imagery of objects at different heights.

During the guided waypoint selection operation 904b, the user defines one or more of the waypoints L. The monitoring system 700, e.g., the robot 100, the remote computing system 702, or other nodes of the monitoring system 700, receives the user selection of a waypoint and stores the waypoint. In some cases, the user selects the waypoint from the representation of the floorplan of the enclosure space 10 displayed on the user terminal. In some cases, the user selects the waypoint by guiding the robot 100 to a physical location within the enclosure space 10 and operating a user input device for a node of the monitoring system 700 to store the current location of the robot 100. In some cases, the user selects the operational setting for the robot 100 for a waypoint, e.g., selects the height setting for the camera 108 and/or the variable height member 106 at the waypoint.

In some implementations, the waypoint selection operation 904 includes a combination of the automatic waypoint selection operation 904a and the guided waypoint selection operation 904b. The user, for example, reviews automatically selected locations and revises the automatically-selected location, e.g., by editing coordinates of the location. In some cases, the user revises locations previously selected by the user, e.g., adds new locations or removes locations. In some cases, the user operates the user terminal to modify the generated zones, e.g., by adding divisions or removing divisions automatically generated. The system 700 then revises the automatically selected locations based on the user's modifications to the zones. Alternatively or additionally, the user modifies the route 200 in a manner to cause the robot 100 to traverse a particular area within the enclosure space 10 or to prevent the robot 100 from traversing a particular area within the enclosure space 10.

Figure 10A:
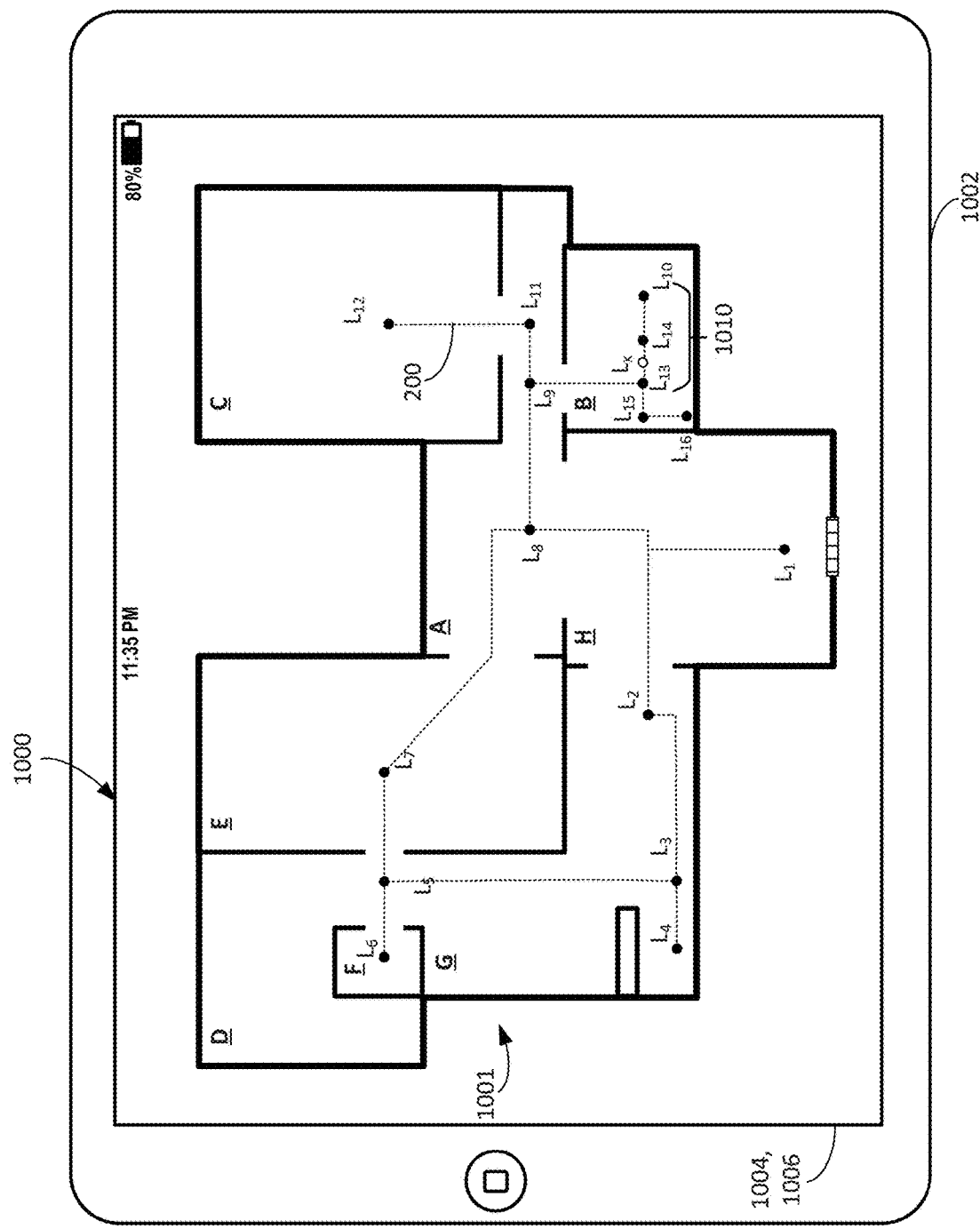
FIG. 10A is a plan view of the user terminal presenting a floorplan of the enclosure space with a patrol route overlaid on the floorplan.

In some examples, referring to FIG. 10A, a display 1004 of a user terminal 1002 presents a floorplan view in which an interactive representation 1000 illustrating a floorplan 1001 of the enclosure space 10 is presented to the user. While the example shown in FIG. 10A depicts the user terminal 1002 as including the display 1004 as a user output device and the touchscreen 1006 as a user input device, other input and output devices as described herein are appropriate.

The floorplan 1001 is a top view representation of the enclosure space 10, in particular, of traversable and non-traversable portions of the enclosure space 10. The floorplan 1001 includes, for example, open traversable floor space and walls defining boundaries for the traversable floor space. In some implementations, the floorplan 1001 is formed based on the robot map constructed using the mapping system 508. In some examples, indicators are shown on the floorplan 1001 to indicate locations of devices in the enclosure space 10, e.g., the devices described with respect to and shown in FIG. 8. In some examples, an indicator is shown to indicate a location of the robot 100.

The route 200 and the waypoints L shown in FIG. 10A are generated during the waypoint selection operation 904. The system 700 enables the user, using the user terminal 1002, to adjust a characteristic of the route 200 and the waypoints L, such as a number of waypoints, a coordinate of one or more the waypoints L, a setting associated with one or more of the waypoints L, a name for one of the waypoints L, a segment of the route 200, etc.

When the user operates the user terminal 1002 to adjust the number of waypoints, the user adds additional waypoints to the waypoints L defining the route 200 stored in the system 700 or removes existing waypoints L from the route 200 stored in the system 700. The route 200 is accordingly adjusted when waypoints are added or removed. The user adds waypoints, for example, in an area of the enclosure space 10 where the user wishes to have more imagery captured or wishes to capture 360-degree imagery. The user removes waypoints, for example, in a particular area of the enclosure space 10 where the user wishes to prevent image capture or where the user wishes to decrease the amount of imagery captured.

Rather than or in addition to adding or removing waypoints, in some cases, the user revises a waypoint by adjusting a set of coordinates defining the waypoint. When the coordinates of the waypoint are adjusted, the route 200 is adjusted to pass through the revised waypoint.

When the user operates the user terminal 1002 to adjust a setting associated with a waypoint, the user revises an operational setting of the robot 100 that is selected when the robot 100 arrives at the waypoint. In some cases, the operational setting corresponds to a height setting for the camera 108 and the variable height member 106, e.g., the selected heights at a waypoint.

When the user operates the user terminal 1002 to adjust a segment of the route 200, the user selects a segment of the route 200, e.g., between two adjacent waypoints, and adjusts a trajectory of the segment of the route 200. In some examples, the user adjusts the trajectory of the route 200 so that the robot 100 avoids a particular traversable portion of the floor surface 20.

In some cases, the user operates the user terminal 1002 to select a name for a waypoint. The user, in some cases, accepts or edits the automatically generated name.

Figure 10B:
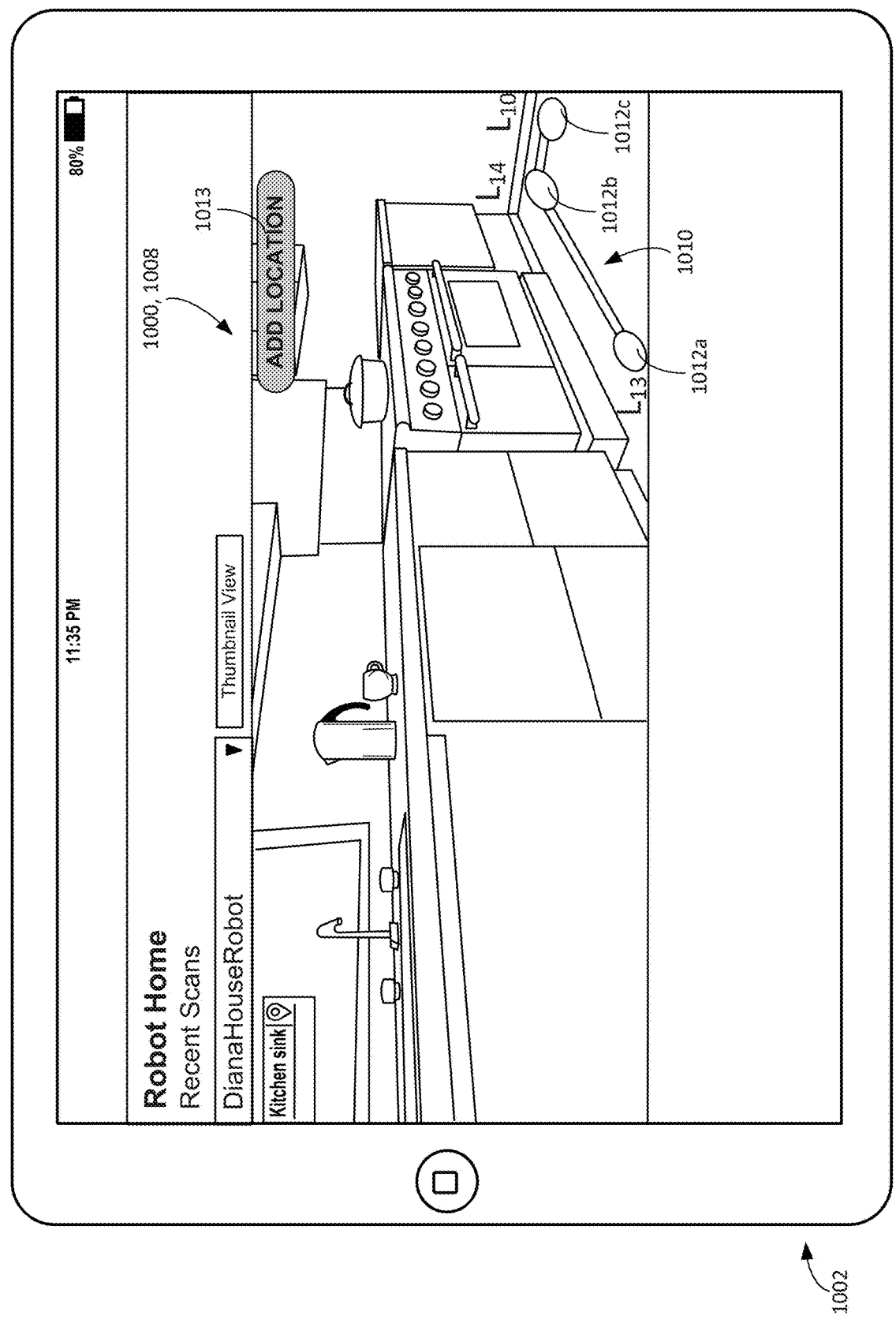
FIG. 10B is a plan view of the user terminal presenting an interactive representation of the enclosure space and a portion of the patrol route through the enclosure space.
Figure 10C:
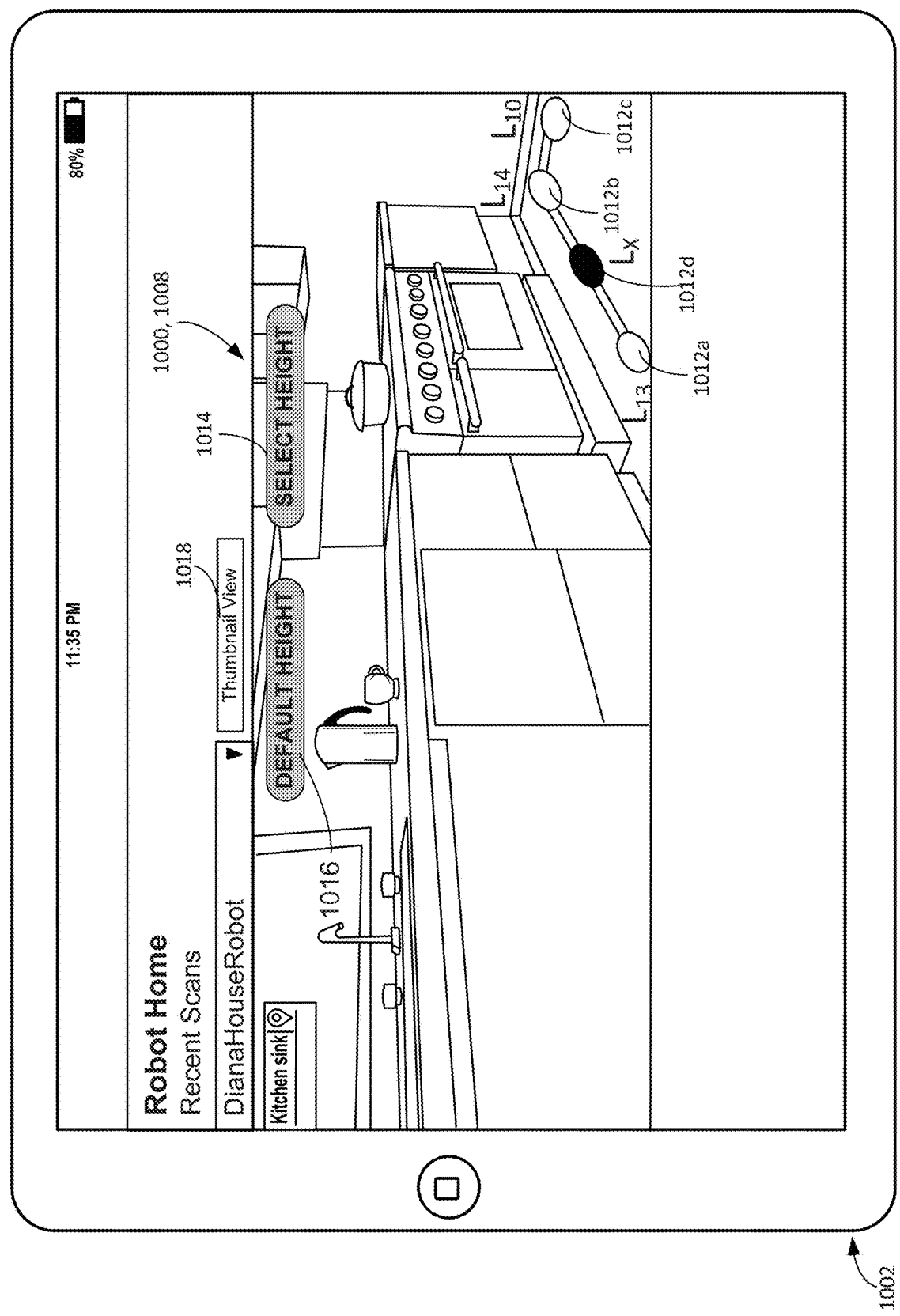
FIG. 10C is a plan view of the user terminal presenting the interactive representation of FIG. 10B, the portion of the patrol route of FIG. 10B, and a waypoint to be added to the patrol route.

FIGS. 10A-10C depict a specific example in which the user operates the user terminal 1002 to add a waypoint to the route 200. The user operates the user terminal 1002 to view imagery associated with a segment 1010 of the route 200. The segment 1010 includes the waypoints $L_{13}$, $L_{14}$, and $L_{10}$ located in zone B. The user operates the touchscreen 1006 to select the zone B and/or the segment 1010 of the route 200.

As shown in FIG. 10B, in response to the user selection, the user terminal 1002 presents an interactive representation 1000 formed from the imagery captured by the robot 100. In particular, the user terminal 1002 presents a view 1008 of the interactive representation 1000, the view 1008 being formed from imagery captured in zone B during the setup operation 902. Indicators 1012a, 1012b, 1012c are overlaid on the interactive representation 1000 to indicate the locations of the waypoints $L_{13}$, $L_{14}$, and $L_{10}$, respectively, on the view 1008 presented to the user.

In the examples described with respect to FIGS. 10B and 10C, the user interacts with the user terminal 1002 to add additional waypoints to the route 200. The user operates the user terminal 1002 to initiate a waypoint selection mode in which the user can operate the user terminal 1002 to select a location along the route 200 at which an additional waypoint should be added. The user, for example, operates the user terminal 1002 to invoke an "Add Location" user input button 1013 to initiate the waypoint selection mode.

As shown in FIG. 10C, in the waypoint selection mode, the user selects a location at which a new waypoint $L_X$ is to be added to the route 200. An indicator 1012d is overlaid on the view 1008 to indicate the location of the new waypoint $L_X$. The location is, for example, offset along the segment 1010 from the waypoints $L_{13}$, $L_{14}$, and $L_{10}$ that have already been stored. In some examples, the location of the waypoint $L_X$ is determined by extrapolating its coordinates from the coordinates of the waypoint $L_{13}$ and the waypoint $L_{14}$. After the new waypoint $L_X$ and its associated settings are selected, a new route is determined to accommodate the new waypoint $L_X$.

In some cases, if the location of the new waypoint $L_X$ is along the segment 1010, as shown in FIG. 10C, the route 200 does not change due to the addition of the new waypoint $L_X$. In some cases, the location of the new waypoint $L_X$ is not along the segment 1010 or along the route 200, and the route 200 accordingly is modified to enable the robot 100 to move through each of the existing waypoints $L_{13}$, $L_{14}$, $L_{10}$ and the newly added waypoint $L_X$.

In some implementations, in the waypoint selection mode, the user selects a height setting of the camera 108 and/or the variable height member 106 for the waypoint $L_X$. In some examples, the user operates the user terminal 1002 to invoke a "Select Height" input button 1014 to provide a user-selected height to associated with the waypoint $L_X$. In some cases, the user selects multiple height settings for the new waypoint $L_X$ such that the camera 108 captures imagery at each of the multiple heights at the new waypoint $L_X$ during the patrol operation 906.

In some examples, the user operates the user terminal 1002 to invoke a "Default Height" input button 1016 such that a default height setting is associated with the waypoint $L_X$. The default height setting is, for example, a height setting of the camera 108 such that imagery is captured at a vantage point familiar to the user.

In some implementations, to add a new waypoint, rather than selecting a location on the user terminal, the user guides the robot 100 to a location within the enclosure space 10 where the user wishes to add the new waypoint. When the robot 100 is at the location, the user operates the monitoring system 700, e.g., operates a corresponding user input device on the robot 100 or operates the touchscreen 1006 of the user terminal 1002, to cause the monitoring system 700 to store the current location of the robot 100 as a new waypoint. In some cases, when the robot 100 is at the new waypoint, the user selects an operational setting for the robot 100, e.g., a height setting for the camera 108, to be associated with the new waypoint. The monitoring system 700 accordingly stores the new waypoint along with the selected height setting and/or the selected operational setting.

While some example processes of adding waypoint to the route 200 are described with respect to FIG. 10C, in other examples as described herein, the user operates the user terminal 1002 to remove a waypoint or to revise coordinates of a waypoint. Other characteristics of the route 200 can be revised as well, such as the name assigned to the waypoints.

In some implementations, the robot 100 adjusts its operations based on a user-selected restricted zone of the enclosure space 10. The robot 100, for example, performs a predetermined behavior upon entering the restricted zone during the patrol operation 906. The restricted zone is defined based on a user selection of, for example, one or more of zones, one or more of waypoints, or a portion of the route 200.

In some examples of the restricted zone, the restricted zone corresponds to a portion of the enclosure space 10 within which the robot 100 is prohibited from capturing imagery or other sensor readings. The robot 100, for example, operates in a privacy mode in the restricted zone. In some cases, during the patrol operation 906, the robot 100 moves through the restricted zone but does not capture imagery or other sensor readings. In some cases, the robot 100 only captures readings from the navigational sensors 606 so that the robot 100 can navigate through the restricted zone, but the robot 100 does not capture any readings that would be intrusive to the user, e.g., imagery.

In further examples of the restricted zone, the restricted zone corresponds to a portion of the enclosure space 10 within which the camera 108 is operated at a particular setting. In some cases, when the robot 100 is traversing the portion of the route through the restricted zone, the robot 100 operates the camera 108 such that the camera 108 is unable to capture imagery of the enclosure space 10. The robot 100, for example, inhibits operations of the camera 108 of the robot 100 by operating the camera 108 by retracting the variable height member 106 and the camera 108 into the chassis 102 of the robot 100. In this regard, in the privacy mode, the camera 108 is positioned such that imagery of the enclosure space 10 cannot be captured.

In additional examples of the restricted zone, the restricted zone corresponds to, for example, a zone through which movement of the robot 100 is inhibited. During the patrol operation 906, the route 200 of the robot 100 does not traverse the restricted zone. In some cases, the robot 100 moves at a slower or faster speed upon entering the restricted zone.

Figure 11:
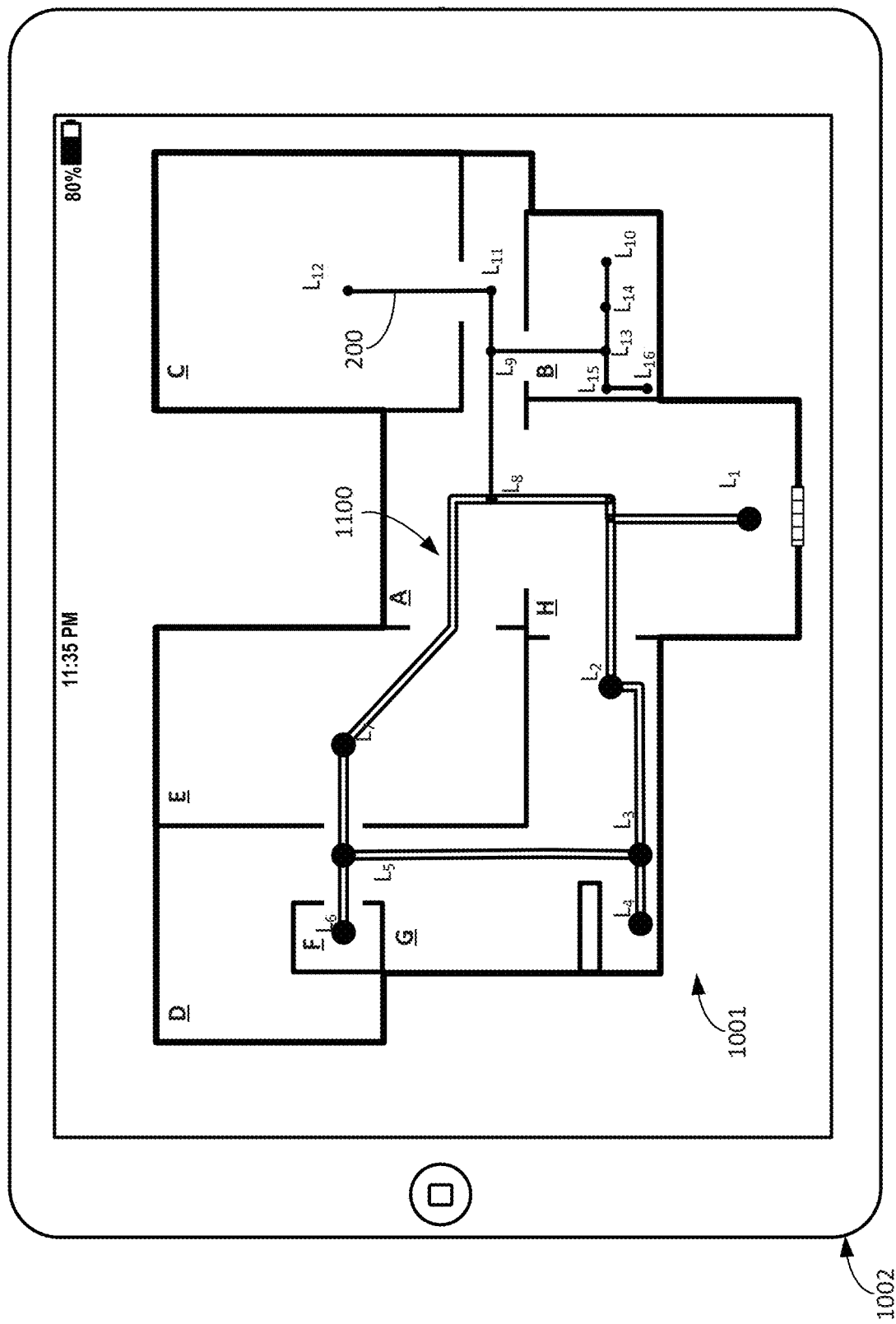
FIG. 11 is a plan view of the user terminal presenting the floor plan of the enclosure space of FIG. 2, a patrol route overlaid on the floorplan, and a restricted zone overlaid on the floor plan.

In the example depicted in FIG. 11, the user terminal 1002 presents the floorplan 1001 of the enclosure space 10, and the user operates the user terminal 1002 to select a portion of the enclosure space 10 to define as the restricted zone. In some cases, as shown in the example of FIG. 11, the restricted zone 1100 is defined by a user selection of a portion of the route 200 including the paths between the waypoints $L_1$-$L_7$. Alternatively, the restricted zone 1100 is defined by a user selection of waypoints $L_1$-$L_7$. In some cases, the restricted zone 1100 is defined by a user selection of the zones D-H.

After the waypoint selection operation 904, e.g., after the waypoints L are defined, the patrol operation 906 is executed to cause the robot 100 to follow a route, e.g., the route 200, through the enclosure space 10. During the patrol operation 906, the robot 100 moves to one or more waypoints, e.g., one or more of the waypoints L defined during the waypoint selection operation 904. The robot 100, for example, moves through the route 200 or a portion of the route 200. In some cases, at each of the waypoints, the robot 100 operates its systems in accordance to the corresponding operational setting selected during the waypoint selection operation 904. If the operational setting corresponds to a height setting selected during the waypoint selection operation 904, the robot 100 sets the height of the camera 108 based on the height setting.

The robot 100 captures sensor readings, including imagery, while traveling along the route 200 and through the waypoints L. As described herein, while located at a waypoint, the robot 100 captures sensor readings and imagery. In some implementations, the robot 100 captures sensor readings while the robot 100 travels along the route 200 from one waypoint to another waypoint. In some cases, the robot 100 stops at each waypoint L and rotates to capture imagery having an angular extent about the waypoint L. As the robot 100 travels between waypoints, the robot 100 continues to capture imagery but does not stop to rotate to capture imagery. Alternatively, rather than capturing imagery between waypoints, the robot 100 only captures imagery at the waypoints L. In some cases, between waypoints, the robot 100 captures other sensor readings.

The patrol operation can include an autonomous traversal operation. In some examples, during the patrol operation 906, the robot 100 performs the autonomous traversal operation through the enclosure space 10. The robot 100 autonomously navigates to the waypoints L within the enclosure space 10 using the robot map. At each of the waypoints L, the robot 100 autonomously sets the height of the camera 108 in accordance to the height selected during the waypoint selection operation 904. The robot 100 sets the height to the selected height associated with a waypoint upon arriving at the waypoint. The robot 100 then captures sensor readings using the sensor system 502. The robot 100, for example, captures imagery at the waypoint. If multiple height settings are associated with a particular waypoint, the camera 108 is positioned at each of the heights to capture imagery at the waypoint. Referring back to FIG. 11, if the keep-out zone 1100 is selected, the robot 100 autonomously moves through the waypoints $L_8$-$L_{15}$ to perform the autonomous traversal operation. In some cases, after completing an autonomous traversal operation, the robot 100 returns to the dock station 810 (shown in FIG. 8) for charging and storage with the variable height member 106 fully retracted and the camera 108 enclosed within the chassis 102. In such a state, the camera 108 provides privacy to occupants in the enclosure space 10.

The patrol operation 906 includes traversal operations subsequent to the initial traversal operation performed during the setup operation 902 to update the map. In some examples, during each subsequent traversal operation performed by the robot 100, the robot 100 updates the map to improve reliability of poses of the robot 100 using signals from the navigation sensors 606. The robot 100 automatically re-samples and collects readings using the sensor system 502. The robot map is updated as confidence of mapping data for the robot map varies in subsequent traversals. By updating the persistent map over subsequent traversal of the enclosure space 10, the robot 100 compensates for any shift in localization attributable to changes in conditions of the enclosure space 10, e.g., a variance in lighting conditions, a variance in placement of objects, etc. In some examples, the robot 100 explores the enclosure space 10 beyond areas trained in the initial setup run. In this regard, the robot 100 generates information about the enclosure space 10 during portions of or all of subsequent traversals.

The patrol operation 906 includes, in some cases, an autonomous patrol operation 906a. During the autonomous patrol operation 906a, the monitoring system 700 automatically initiates the autonomous traversal operation of the robot 100 through the enclosure space 10. The robot 100 conducts an autonomous traversal operation through the enclosure space 10 during the autonomous patrol operation 906a. The robot 100, for example, performs this autonomous traversal operation in accordance to a schedule. The robot 100 initiates the autonomous patrol operation 906a at one or more times throughout a day, a week, a month, etc. The schedule includes, for example, an initiation time, a duration, and/or an end time for the autonomous patrol operation 906a.

In some implementations, the schedule is automatically selected. The monitoring system 700 tracks occupancy of the enclosure space 10 over a period of time, e.g., a week or a month, and generates a patrol schedule for the robot 100 based on the accumulated tracking data. The monitoring system 700, for example, automatically generates the patrol schedule such that the robot 100 performs autonomous traversal operations when the enclosure space 10 is predicted to be unoccupied. The monitoring system 700 tracks occupancy of the enclosure space 10 using sensors of the sensor system 502 and/or sensors of connected devices within the enclosure space 10.

Alternatively, rather than initiating the autonomous traversal operation based on a schedule, the monitoring system 700 determines that the enclosure space 10 is not currently occupied based on sensors of connected devices of the monitoring system 700 and initiates the autonomous traversal operation. The monitoring system 700, for example, determines that human motion is not detected within the enclosure space 10. In response to detecting a lack of occupancy within the enclosure space 10, the monitoring system 700 initiates the autonomous traversal operation.

In some implementations, the user operates the monitoring system 700 to select the schedule for the robot 100, e.g., as part of the waypoint selection operation 904. The user, for example, operates the user terminal to set a schedule for the autonomous traversal operations during the waypoint selection operation 904, and the schedule is stored in the monitoring system 700. The monitoring system 700 initiates an autonomous traversal operation in accordance to the user-selected schedule.

In some implementations, the user selects an occupancy setting of the monitoring system 700 to define an amount of time between a detection of a lack of occupancy and an initiation of the patrol operation 906. For example, after the user-selected amount of time has elapsed after a first detection of a lack of occupancy within the enclosure space 10, the monitoring system 700 autonomously initiates the autonomous traversal of the robot 100.

During a guided patrol operation 906b, the robot 100 receives a user command through the monitoring system 700 to navigate the robot 100 through the enclosure space 10. In some examples, the robot 100 initiates a traversal operation through the enclosure space 10 in response to the user command. In some cases, the user command corresponds to a user command to initiate the autonomous traversal operation through each of the waypoints $L_1$-$L_{16}$. In other examples, the robot 100 performs the autonomous traversal operation through a subset of the waypoints, e.g., the waypoints $L_8$-$L_{16}$ as described with respect to FIG. 10A. In some cases, the user command includes a selection of one of the waypoints. In response to the user command, the robot 100 performs the autonomous traversal operation to move to the selected waypoint.

Alternatively, during the guided patrol operation 906b, the user command corresponds to a series of commands to guide movement of the robot 100. In this regard, the user manually moves the robot 100 and/or remotely guides the robot 100 to move through the enclosure space 10. The user, for example, operates the user terminal to transmit movement commands to the robot 100. The robot 100 moves across the floor surface 20 according to the movement commands. In some cases, the user issues operational commands to cause the robot 100 to collect data, e.g., to capture imagery up to 360 degrees around a particular waypoint. In some cases, the imagery includes between 4 and 1000 images that span an angular extent up to 360 degrees around the waypoint.

Figure 12A:
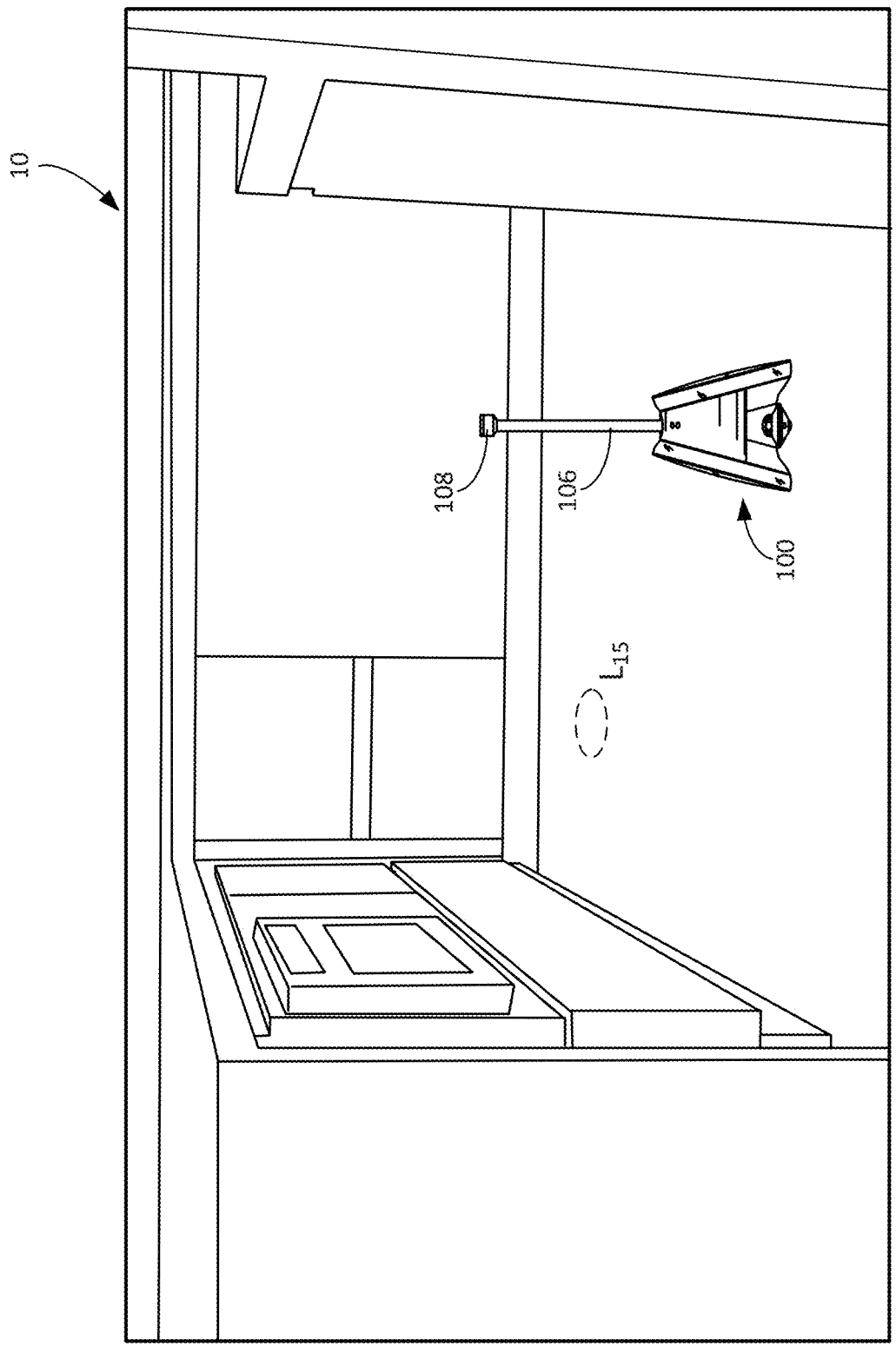
FIG. 12A is a perspective view of the robot at a waypoint in the enclosure space to capture imagery of a sink.

FIG. 12A depicts the robot 100 during an example of the patrol operation 906. In this example, during the patrol operation 906, the robot 100 moves through the enclosure space 10 to arrive at the waypoint $L_{15}$. As described herein, in some cases, the robot 100 performs an autonomous traversal operation during the autonomous patrol operation 906a or during the guided patrol operation 906b to move to the waypoint $L_{15}$. In other cases, the user guides the robot 100 to the waypoint $L_{15}$ during the guided patrol operation 906b. The user guides the robot 100, for example, by issuing a series of movement commands to the robot 100 to move the robot 100 to the waypoint $L_{15}$.

Figure 12B:
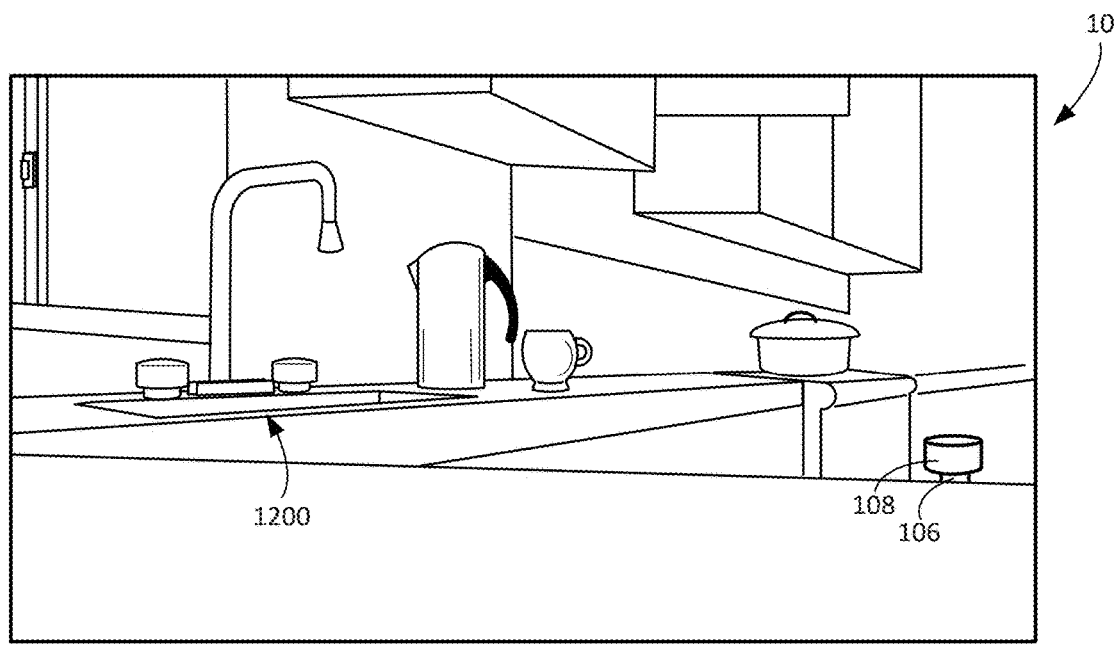
FIGS. 12B, 12D, and 12F are a sequence of views depicting the robot of FIG. 12A protracting a variable height member to capture imagery of the sink.
Figure 12C:
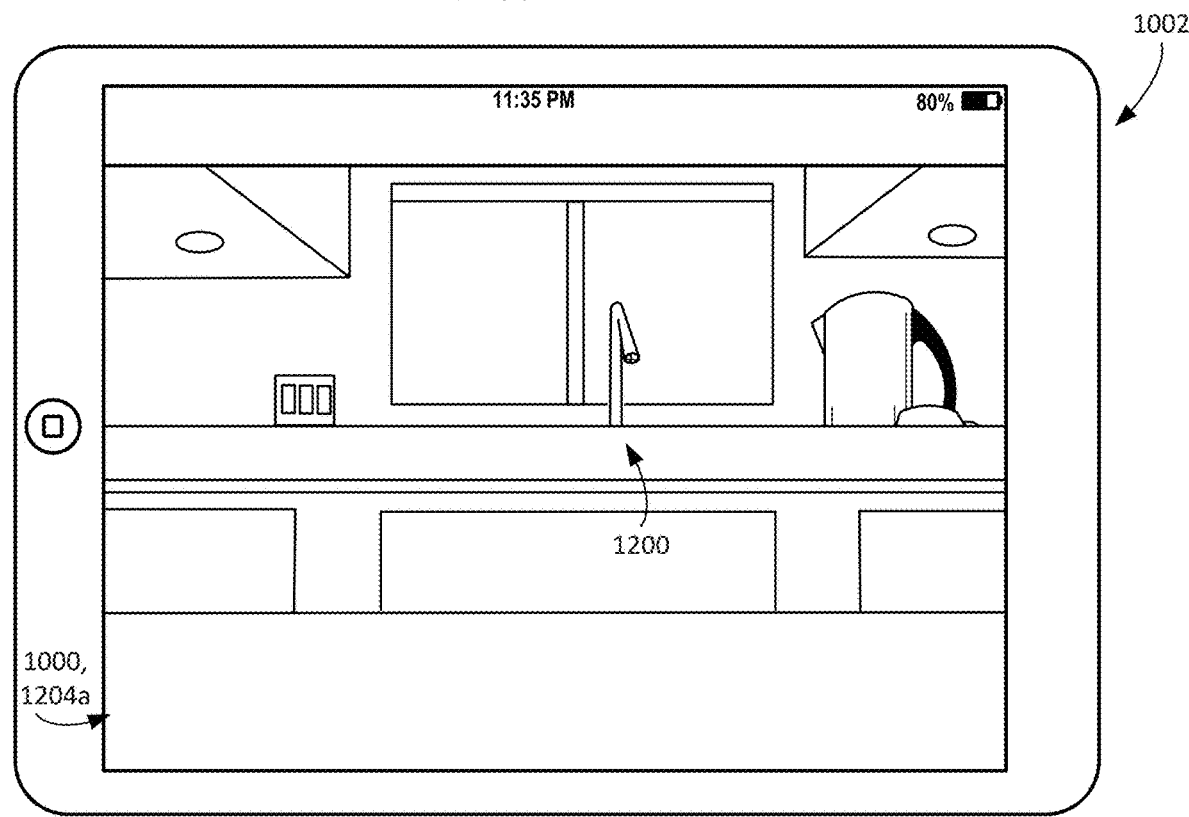
FIGS. 12C, 12E, and 12G are a sequence of plan views of the user terminal presenting views formed from imagery captured by the robot with the variable height member in positions shown in FIGS. 12B, 12D, and 12F, respectively.
Figure 12D:
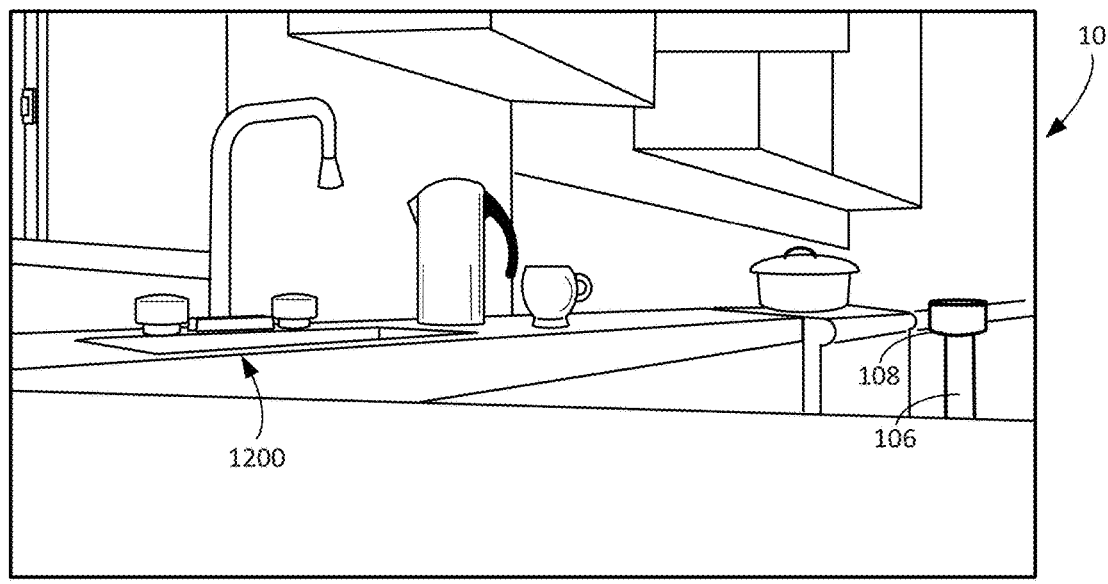
Figure 12E:
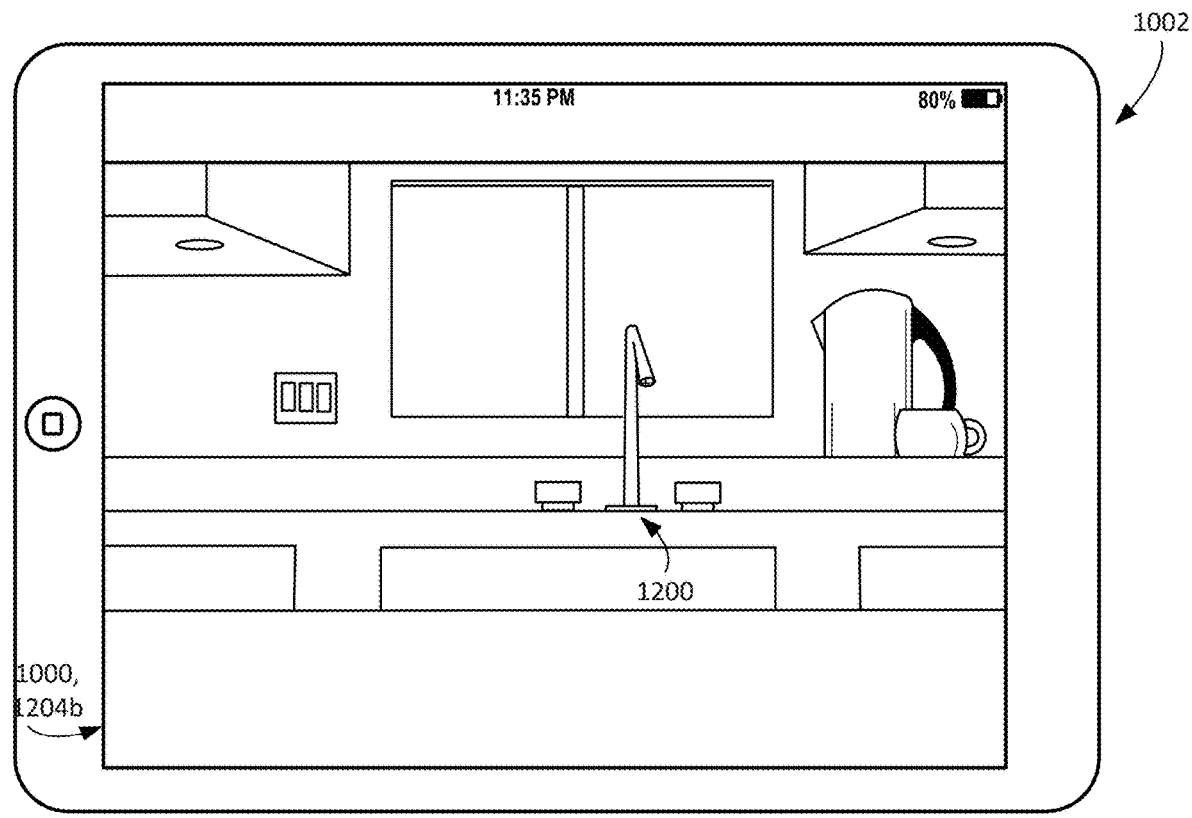
Figure 12F:
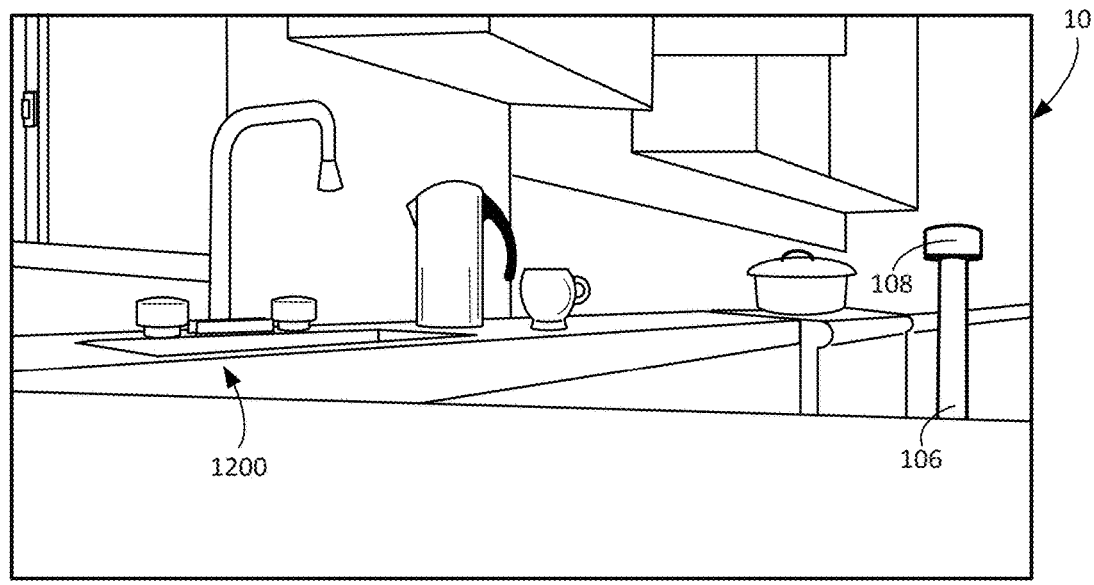

Upon arriving at the waypoint $L_{15}$, the robot 100 operates according to an operational setting. FIGS. 12B, 12D, and 12F depict a sequence of images of the robot 100 as the robot 100 operates its camera 108 and the variable height member 106 to set a height of the camera 108 to enable the camera 108 to capture imagery of a target object, e.g., a sink 1200. Upon reaching the height shown in FIG. 12F, the camera 108 is positioned to capture imagery of the sink 1200. In some cases, if the robot 100 is performing the autonomous traversal operation, the robot 100 arrives at the waypoint $L_{15}$ and autonomously sets the height of the camera 108 to the appropriate height to capture imagery of the sink 1200. The height, for example, is determined during the waypoint selection operation 904 based on the data collected during the setup operation 902. In some cases, if the robot 100 is operating based on user commands during the user guided patrol operation 906b, the robot 100 sets the height of the camera 108 in accordance to a user command. The user issues a series of commands to increase or decrease the height of the camera 108.

During a monitoring operation 908, the user monitors the data collected by the robot 100 during the patrol operation 906. To enable the user to monitor the collected data, the robot 100 transmits the data to the monitoring system 700, and an interactive representation of the enclosure space 10 is presented to the user through a user terminal. The robot 100, for example, transmits data representing the imagery and any other data collected by the sensor system 502 through the monitoring system 700, e.g., to the remote computing system 702 and/or to the user terminal. During the monitoring operation 908, the user terminal presents the data in real time in a real time monitoring operation. Alternatively, the user terminal presents earlier stored data to be reviewed by the user, e.g., in a review operation.

The interactive representation presented to the user on the user terminal 1002 during the monitoring operation 908 can include views formed from images captured at multiple waypoints, multiple images captures at a single waypoint, or a combination of images captures at multiple waypoints and multiple images captured at a single waypoint. In some examples, the images captured at different waypoints each form a different portion of the interactive representation, e.g., a different view of the interactive representation. The imagery captured at a particular waypoint includes, for example, multiple images that are combined to create a linked portion of the interactive representation at the waypoint. The images, for example, include overlapping portions that enable the images to be combined and formed into contiguous views at the waypoint, e.g., to form a panoramic view.

In some implementations, the monitoring operation 908 includes the real time monitoring operation in which the robot 100, for example, transmits the data to the monitoring system 700 for the user to monitor the data in real time. During the real time monitoring operation, the monitoring operation 908 occurs concurrently with the patrol operation 906 such that the user can monitor the data collected by the robot 100 as the robot traverses the enclosure space 10 collect the data. While the robot 100 navigates about the enclosure space 10 and captures imagery of the enclosure spaced 10, the user terminal presents a view of the enclosure space 10 corresponding to imagery presently being captured by the robot 100. The user terminal, in this regard, presents a live video feed of the enclosure space 10 to the user. In some cases, the real time monitoring operation is initiated in response to a user input on the user terminal. The robot 100 receives a signal representing the user input and initiates transmission of collected data to the user terminal so that the user can monitor the data in real time.

Figure 12G:
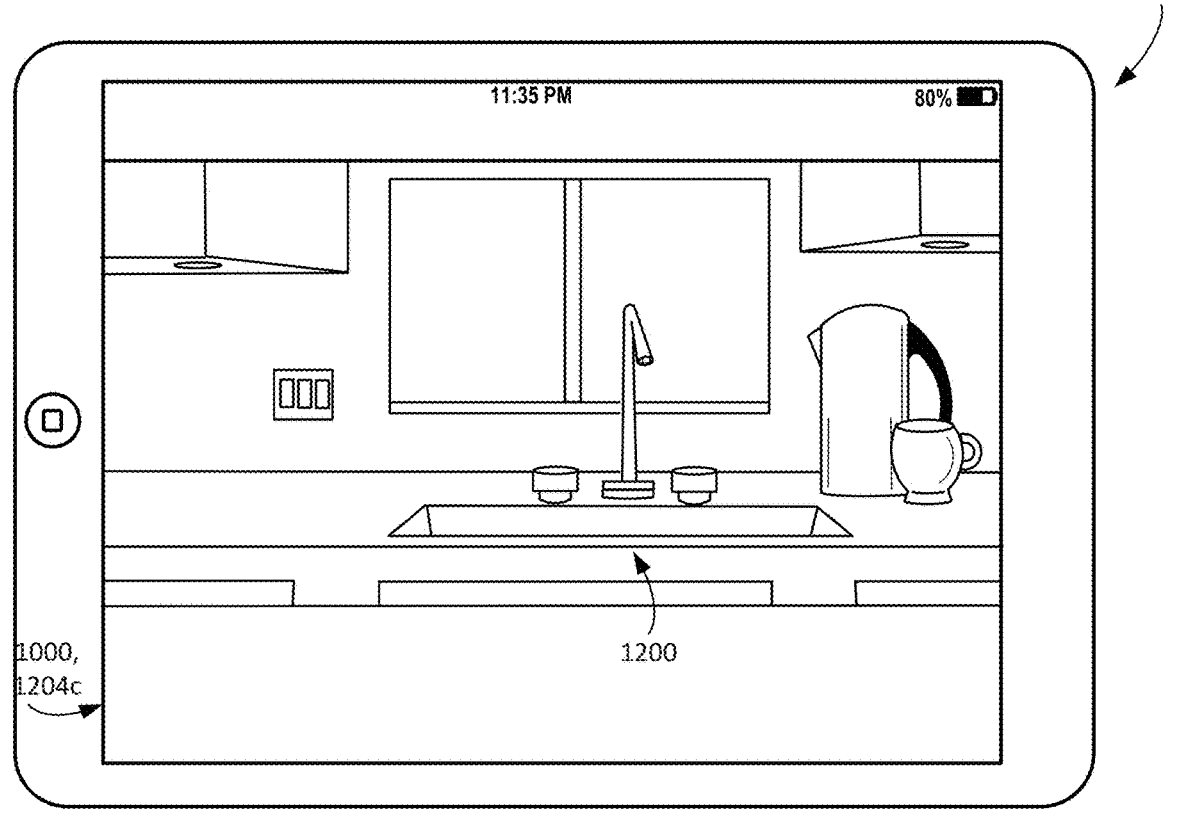

In some examples of the monitoring operation 908, the robot 100 collects and transmits data that enables a user to monitor a particular object in the enclosure space 10. For example, as shown in FIGS. 12C, 12E, and 12G, the user terminal 1002 presents views 1204a, 1204b, 1204c including the sink 1200 to enable the user to monitor the sink 1200. In a real time monitoring operation, the user terminal presents the views 1204a, 1204b, 1204c in real time to enable the user to monitor the sink 1200 on the user terminal 1002 in real time, e.g., as the robot 100 is performing the patrol operation 906 to capture the imagery of the sink 1200.

In some examples of the real time monitoring operation, the user terminal 1002 presents an interactive representation of the enclosure space 10. The user operates the user terminal 1002 to adjust the view presented on the user terminal 1002 in real time. While the user monitors the data in real time, the user operates the user terminal to provide navigational commands to the robot 100, as described with respect to the user guided patrol operation 906b. In some examples of the real time monitoring operation, as described with respect to FIGS. 3A-3D, the user interacts with the interactive representation to initiate an operation of the robot 100, e.g., a translation operation, a rotation operation, or a zoom operation.

As an alternative to or in addition to the real time monitoring operation described herein, the monitoring operation 908 includes a review operation in which the robot 100 transmits the data to be stored in the monitoring system 700 to enable the user to monitor the stored data at a later time. The user terminal 1002, for example, accesses previously stored imagery captured by the robot 100 during the patrol operation 906. The user operates the user terminal 1002 to monitor views formed from imagery captured by the robot 100 at an earlier time. The views are presented, for example, at least 5 to 10 seconds after the robot 100 captures the imagery. Data representing the imagery is, for example, first stored and then is later accessed by the user terminal to present the user with the interactive representation.

Figure 13:
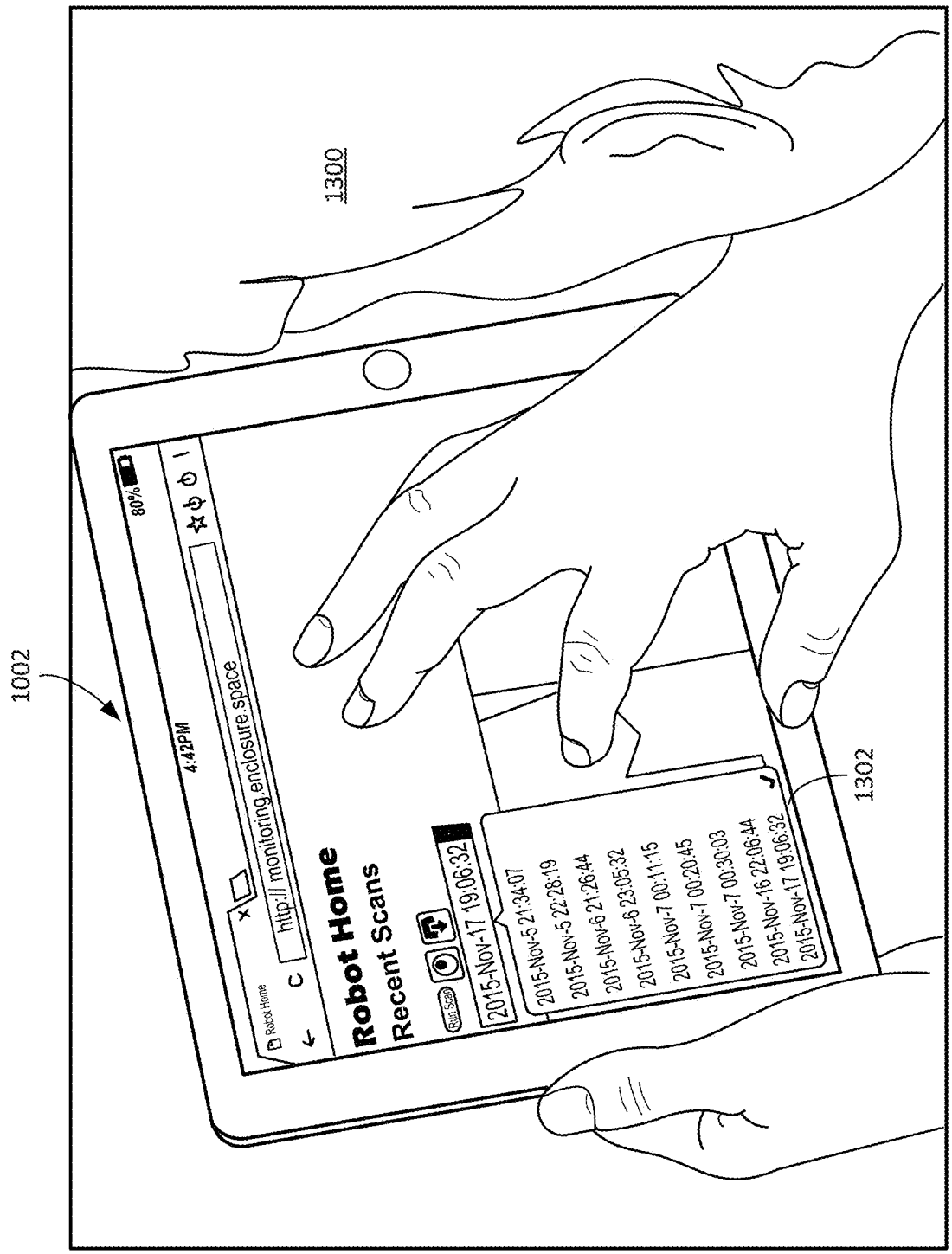
FIG. 13 depicts a user interacting with the user terminal to select a view of an interactive representation of the enclosure space to be presented on the user terminal.

In some examples of the review operation, the user terminal in a history review mode presents a history of captured imagery. As shown in FIG. 13, a user 1300 operates the user terminal 1002, which presents the data gathered by the robot 100 during the patrol operation 906. The user 1300, for example, operates the user terminal 1002 to view a history of the data collected over a period of time. The user terminal 1002 presents a selection menu 1302 that includes a user selectable list of views of the enclosure space 10 formed from imagery captured by the robot 100 during a traversal operation through the enclosure space 10. Each item of the list includes, for example, a time stamp associated with a time that the imagery was captured by the robot 100. In some cases, each item of the list is associated with a name of a zone or room within the enclosure space 10.

In some implementations, the system 700 automatically compares the imagery of the area of interest and detects a discrepancy between imagery captured at a first earlier time and imagery captured at a second later time. The system 700, for example, causes the user terminal 1002 to issue an alert indicative of the discrepancy. The user terminal 1002 presents a view of the enclosure space 10, and an indicator indicating the discrepancy overlaid on the view of the enclosure space 10, e.g., by highlighting the discrepancy or presenting an indicator noting the discrepancy. In some cases, the area of interest is a surface in the enclosure space 10, e.g., a kitchen counter. The system 700 compares imagery of a kitchen counter captured at different times, e.g., before and after the user has departed the enclosure space 10. The system 700 determines that the user has forgotten an item, e.g., a wallet, on the kitchen counter prior to departing the enclosure space 10. The system 700 then transmits a signal to a user-carried computing device, e.g., the remote user terminal 704, to cause an automated alert to be issued to inform the user of the forgotten item. The automated alert includes, for example, a view formed from imagery of the kitchen counter with the forgotten item.

In some implementations, the user 1300 operates the user terminal 1002 to present a representation of imagery of an area of interest captured at multiple different times. The user terminal 1002, for instance, presents multiple views on the display 1004, thereby presenting a side-by-side comparison of views formed from imagery of the area of interest captured at different times. The user terminal 1002, for example, presents a view formed from the imagery captured at an earlier time and simultaneously presents another view formed from the imagery captured at a later time. The side-by-side comparison can be used to highlight a discrepancy in imagery captured at different times.

In additional examples of the review operation, the user operates the user terminal to present views of the enclosure space 10 in a walkthrough mode. In the walkthrough mode, the views are presented in a sequence based on relative locations on the floor surface 20 at which the imagery for the views was captured by the robot 100. The user terminal accesses stored imagery and presents the imagery in a manner that preserves the relative locations at which the imagery was captured, thereby providing the user with the effect of virtually walking through the enclosure space 10.

In some implementations of the walkthrough mode, the imagery is captured at multiple waypoints, and the sequence of the imagery presented on the user terminal is based on the adjacency of the waypoints. During the review operation, the user terminal presenting a view at a particular waypoint is operable by the user to present a view at any adjacent waypoint. In some examples, the imagery captured by the robot 100 at three sequential waypoints, e.g., the waypoints $L_{10}$, $L_{14}$, $L_{13}$, are formed into a sequence of views of the enclosure space 10 to be presented on the user terminal. During the review operation, if a view associated with the waypoint $L_{10}$ is presented on the user terminal, to cause the user terminal to present a view associated with the waypoint $L_{13}$, the user operates the user terminal to present imagery at the waypoint $L_{14}$, and then further operates the user terminal to present imagery at the waypoint $L_{13}$. The views are thus sequentially presented in accordance to relative locations of the waypoints $L_{10}$, $L_{14}$, and $L_{13}$ along the route 200.

Figure 14A:
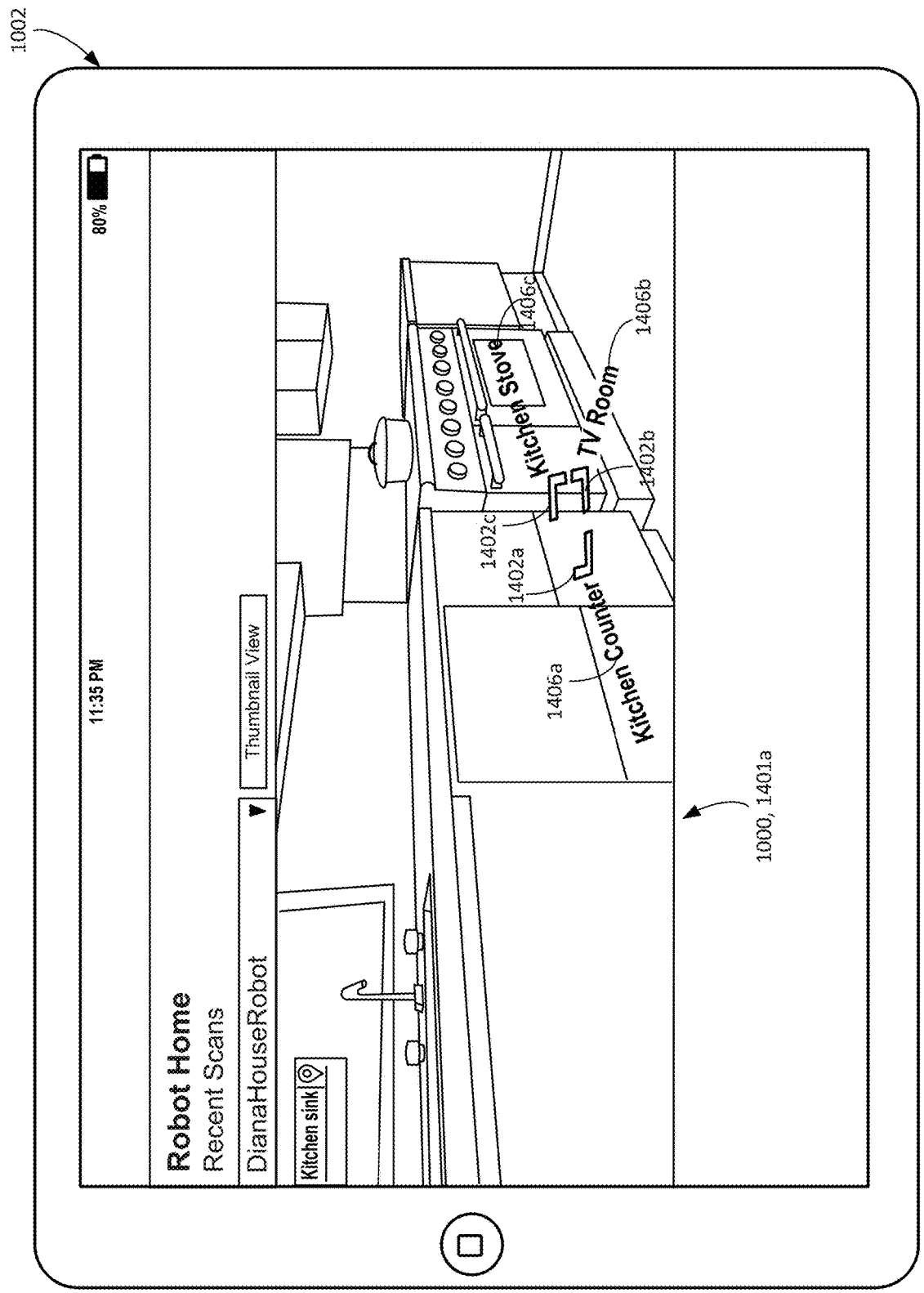
FIGS. 14A-14C are plan views of the user terminal presenting views of an interactive representation formed from imagery captured at different waypoints in the enclosure space.
Figure 14B:
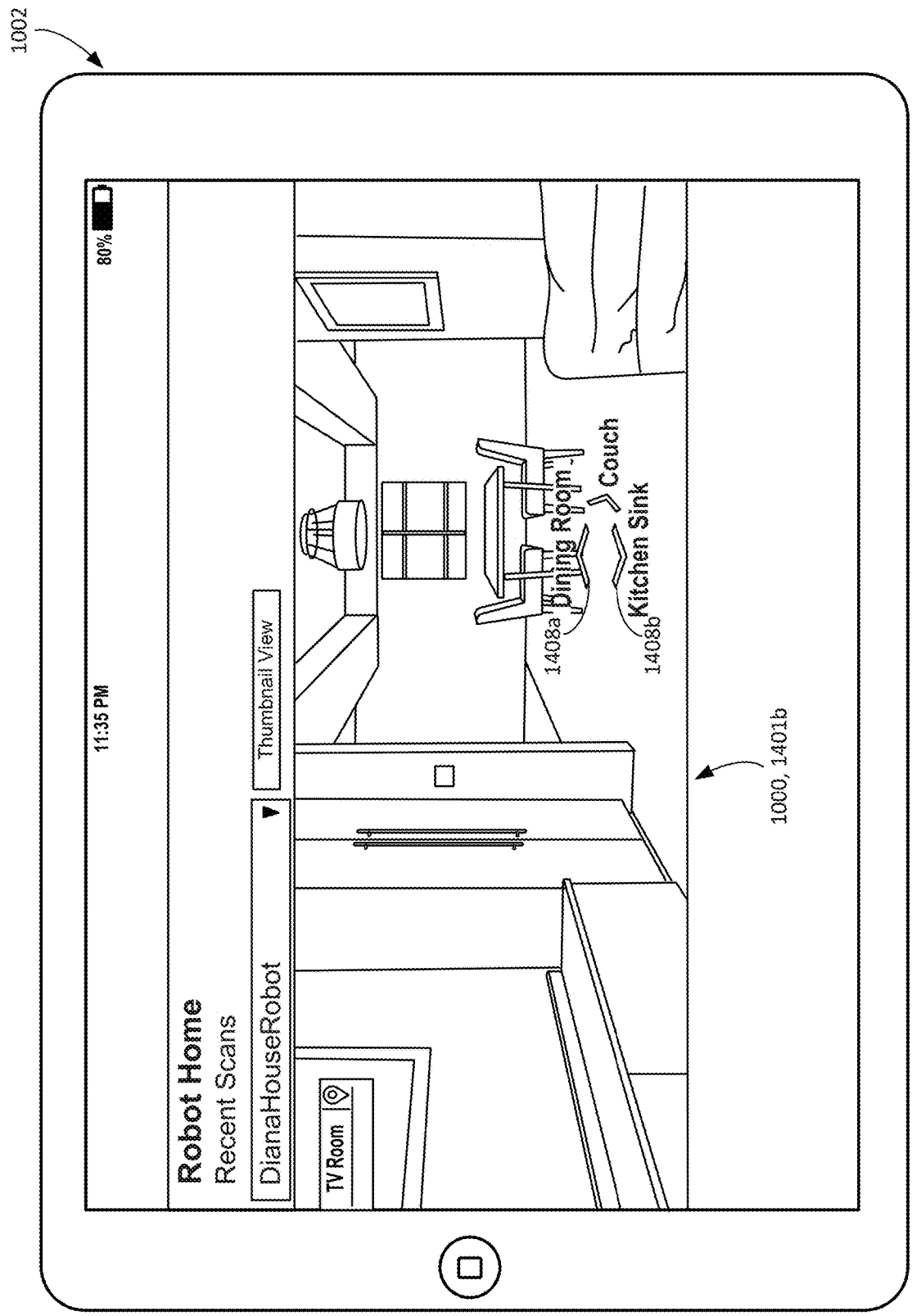
Figure 14C:
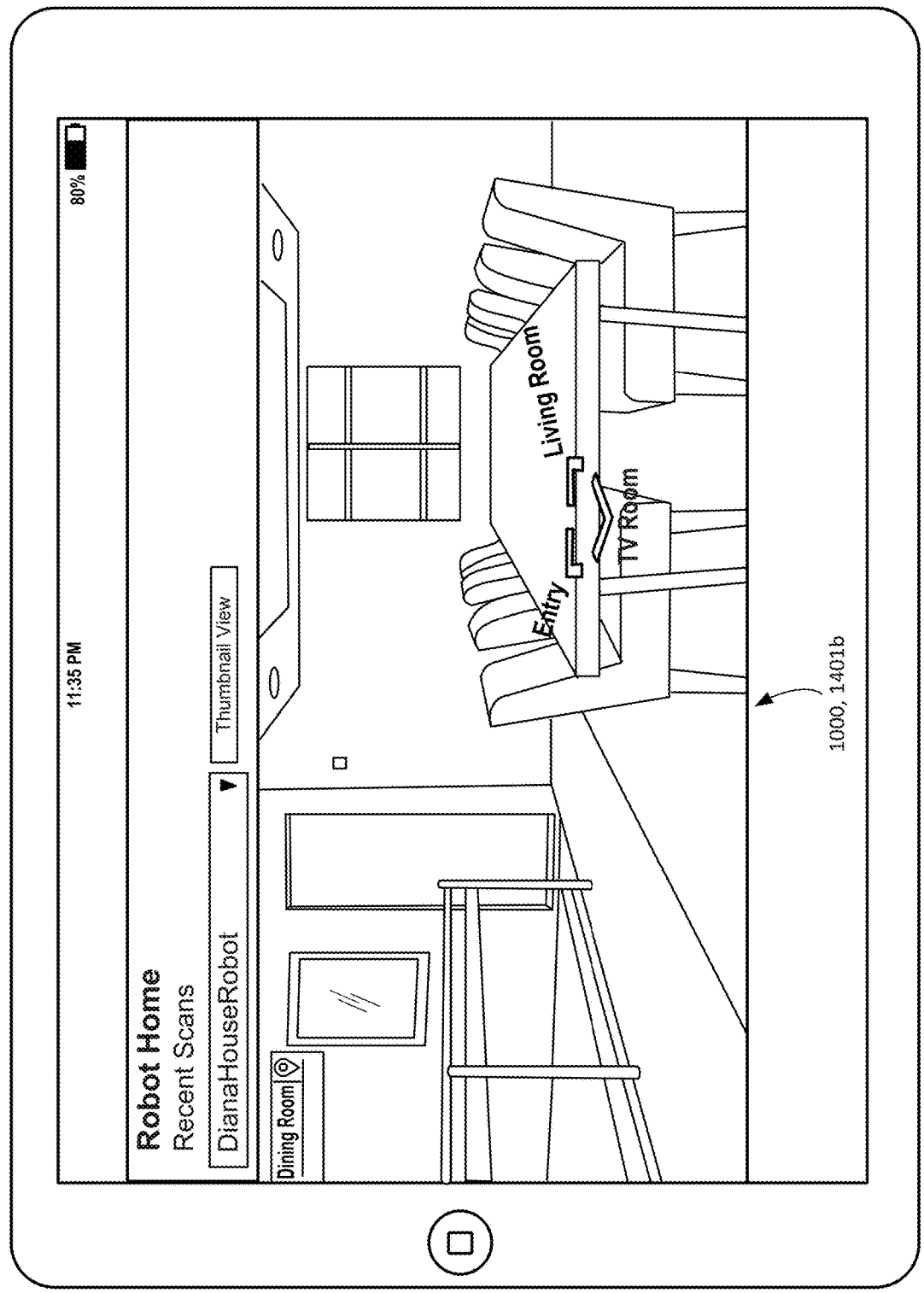

In some examples of the walkthrough mode, as shown in FIGS. 14A-14C, the user terminal 1002 presents views 1401a, 1401b, 1401c of the interactive representation 1000 of the enclosure space 10. The views 1401a, 1401b, 1401c are formed from imagery captured in zones B, A, and C of the enclosure space 10, respectively.

In FIG. 14A, the user terminal 1002 presents the view 1401a corresponding to imagery captured by the robot 100 at a particular waypoint, e.g., the waypoint $L_{13}$ shown in FIG. 10A. The user terminal 1002 also presents a directional label 1402a overlaid on the view 1401a that, when invoked by the user, causes the user terminal 1002 to present a new view of the interactive representation 1000. The interactive representation 1000 is shifted in manner to provide the user with the effect of virtually navigating through the enclosure space 10 using the interactive representation 1000.

The directional label 1402a is one of multiple directional labels 1402a, 1402b, 1402c. In response to a user invocation of a user interface element associated with one of the directional labels 1402a, 1402b, 1402c, the view presented on the user terminal 1002 is changed to a view at a waypoint adjacent to the waypoint corresponding to the view 1401a. In some cases, if the waypoint for the view 1401a is waypoint $L_{13}$ shown in FIG. 10A, the adjacent waypoints are waypoints $L_9$, $L_{14}$, and $L_{15}$. When the user invokes a user interface element corresponding to one of the directional labels 1402a, 1402b, 1402c, the user terminal 1002 shifts the view to a new view formed from the imagery captured at the corresponding adjacent waypoint $L_9$, $L_{14}$, and $L_{15}$, respectively. The user invokes, for example, a touchscreen of the user terminal 1002 proximate the location of the directional label 1402a, 1402b, 1402c to invoke the user interface element corresponding to one of the directional labels 1402a, 1402b, 1402c. If the user invokes the user interface element corresponding to the directional label 1402b, the interactive representation 1000 is shifted such that the view 1401b, shown in FIG. 14B, is presented on the user terminal 1002.

In additional examples, if the waypoint for the view 1401b is waypoint $L_9$, the adjacent waypoints are waypoints $L_{13}$, $L_8$, $L_{11}$. If the user invokes the user interface element corresponding to the directional label 1408a shown in FIG. 14B, the view 1401c, shown in FIG. 14C, is presented on the user terminal 1002. The view 1401c, for example, corresponds to the waypoint $L_8$. If the user invokes the user interface element corresponding to the directional label 1408b, the user causes the user terminal 1002 to return to the view 1401a shown in FIG. 14A.

In some implementations, the user terminal 1002 presents waypoint names 1406a, 1406b, 1406c proximate the corresponding directional label 1402a, 1402b, 1402c to indicate the names of the adjacent waypoints $L_9$, $L_{14}$, $L_{15}$, as described herein. In the example of FIG. 14A, the names for waypoints $L_9$, $L_{14}$, and $L_{15}$ are "TV Room," "Kitchen Sink," and "Kitchen Stove."

In some implementations of the walkthrough mode, when the user operates the user terminal to shift the interactive representation 1000 from an initial view at an initial waypoint to a new view at an adjacent waypoint, the new view corresponds to imagery captured at orientation and height settings that are the same as the settings for the imagery of the original view. For example, the views 1401a, 1401b, 1401c are formed from imagery captured by the camera 108 with the camera 108 at the same orientation and height relative to the chassis 102 of the robot 100.

In additional examples of the review operation, the user operates the user terminal 1002 in a waypoint view mode in which the user terminal 1002 to monitor views formed from imagery captured at a single waypoint. In particular, the user terminal presents views formed from imagery captured by robot 100 using multiple different camera settings at the waypoint.

In some examples of the waypoint view mode, the imagery captured for the view 1401a shown in FIG. 14A corresponds to imagery captured at a particular orientation and/or a particular height of the camera 108 of the robot 100 relative to the chassis 102 of the robot 100. If the robot 100 was operated to capture additional imagery at the waypoint $L_{13}$ with the camera 108 at different orientations and/or different heights, the user terminal 1002 is operable to present additional views corresponding to this additional imagery. For each of the views 1401b, 1401c, the user terminal 1002 is operable to present additional views formed from imagery captured with the camera 108 at different orientations and/or different heights.

While FIGS. 12C, 12E, and 12G are described as being views presented during the real time monitoring operation, in some implementations, each of the views corresponds to views presented during the review operation. In this regard, the user terminal accesses previously stored data collected by the robot 100 to present the views 1204a, 1204b, 1204c. The views 1204a, 1204b, 1204c correspond to imagery captured with the camera 108 at multiple heights at a particular waypoint. As described herein, the waypoint at which the imagery for the views 1204a, 1204b, 1204c is captured corresponds to, for example, the waypoint $L_{14}$, e.g., corresponding to the name "Kitchen Sink." Each of the views 1204a, 1204b, 1204c correspond to imagery captured at a different height at the waypoint $L_{14}$. In the waypoint view mode, the user terminal presenting one of the views 1204a, 1204b, 1204c is operable by the user to present the other views.

In further examples of the waypoint view mode, FIGS. 15A-15C show multiple views 1500a, 1500b, 1500c corresponding to imagery captured with the camera 108 at multiple orientations at a particular waypoint, e.g., the waypoint $L_{16}$. Each of the views 1500a, 1500b, 1500c corresponds to imagery captured at a different orientation at the waypoint $L_{16}$. The views 1500a, 1500b, 1500c are formed from stitched imagery captured at the waypoint $L_{16}$. The stitched imagery, for example, span an angular extent greater than an angular extent that would be possible with a single image.

In some implementations, the user terminal 1002 presents a directional label 1502 associated with a user interface element that can be invoked by the user to change the view presented on the user terminal 1002. The user operates the user terminal 1002 by invoking the user interface element corresponding to the directional label 1502 to shift the view 1500a, 1500b, 1500c to a view formed from imagery captured at an adjacent waypoint $L_{15}$. The view for the waypoint $L_{15}$ is, in some cases, one of multiple views for the waypoint $L_{15}$. In some cases, the user terminal 1002 presents the directional label 1502 overlaid on each of the views 1500a, 1500b, 1500c of the interactive representation 1000. In this regard, the user can operate the user terminal 1002 to shift the interactive representation 1000 to the new view for the waypoint $L_{15}$ from any of the views 1500a, 1500b, or 1500c at the waypoint $L_{16}$. In some cases, when the interactive representation 1000 is shifted to the new view at the adjacent waypoint $L_{15}$, the new view is formed from imagery captured using camera settings similar to camera settings used to capture the imagery for the initial view at the waypoint $L_{14}$, e.g., the view 1500a, 1500b, or 1500c.

While FIGS. 15A-15C depict the views 1500a, 1500b, 1500c representing imagery less than 360 degrees around the waypoint $L_{14}$, in some cases, the views 1500a, 1500b, 1500c are a series of linked views forming between a 180-degree view and 360-degree view around the waypoint $L_{16}$. Alternatively, the series of linked views form a 360-degree view or a panoramic view of the enclosure space 10 at the waypoint $L_{16}$. The linked views are formed from at least 2 images captured by the robot 100.

While the user can operate the user terminal to shift the interactive representation to present views captured at different orientations and heights at a particular waypoint as described with respect to FIGS. 12C, 12E, 12G, and 15A-15C, in some implementations, the user operates the user terminal to shift the interactive representation in other ways. In some examples of interacting with the interactive representation, the user operates the user terminal 1002 to shift the interactive representation to present a zoomed-in view or a zoomed-out view. The zoomed-in view and the zoomed-out view presented on the user terminal 1002 are, for example, formed from a digital zoom effect applied after the imagery is captured by the camera 108. In some cases, the user operates the user terminal 1002 to present a view captured by the camera 108 having operational settings that vary in ways in addition to orientation and height. The zoomed-in view and the zoomed-out view, for example, correspond to imagery captured by the camera at a zoom setting of the camera 108 that is more zoomed-in or zoomed-out, respectively, than the zoom setting of the camera 108 used to capture the imagery for an initial view shown on the user terminal 1002. In further examples of interacting with the interactive representation, the user operates the user terminal 1002 to shift the interactive representation to present a view formed from imagery captured at a different pan position or tilt orientation of the camera 108.

Having knowledge and information about conditions of the enclosure space 10 enables a user to make smart home management decisions, e.g., for increased physical comfort and financial savings from improved energy management. To inform the user of these conditions, the user terminal presents indicators superimposed on the interactive representation. In some cases, the indicators are indicative of sensor readings captured by sensors within the enclosure space 10, e.g., sensors of the robot 100 and/or sensors of other connected devices 706. In some cases, the indicators are indicative of sensor data captured that pertain to structures, devices, or other objects in the enclosure space 10.

Because the sensor data are localized to locations within the enclosure space 10, e.g., using the mapping system 508, the user terminal, in some cases, superimposes the indicator on a portion of the interactive representation based on the localization information. The user terminal, for example, superimposes sensor readings on the interactive representation at the location within the enclosure space 10 at which the sensor readings were collected by the robot 100. The user terminal presents these sensor readings to provide a visual representation of how a sensed condition varies throughout the enclosure space 10.

The system 700 can monitor a variety of conditions in the enclosure space 10. In some cases, the system 700 is used for remotely monitoring a non-visible condition in the enclosure space 10, e.g., temperature, toxin, humidity, and similar air quality measurements, and overlaying an indicator on the interactive representation 1000 corresponding to the location within the enclosure space 10 that the condition was measured.

Figure 16A:
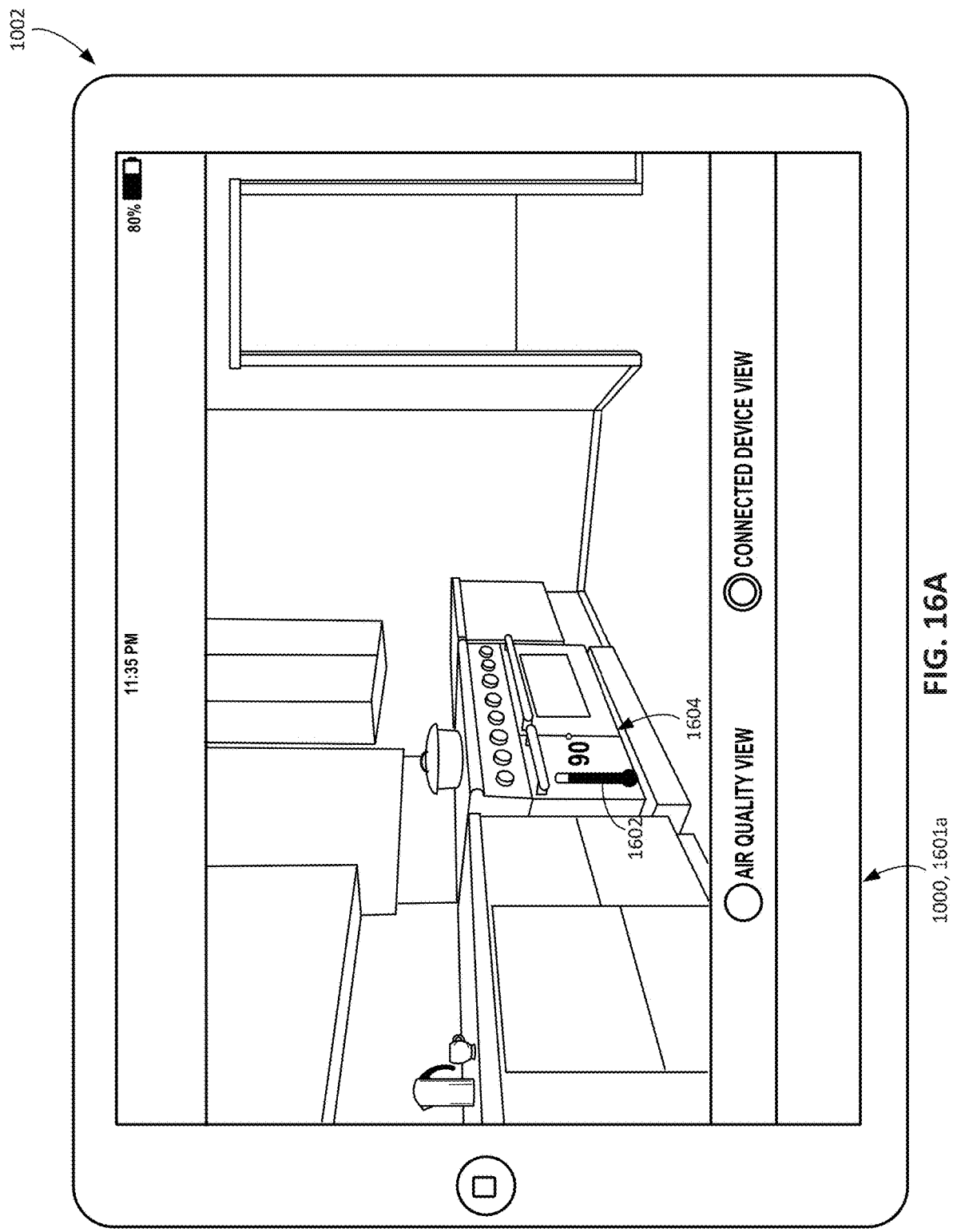
Figure 16B:
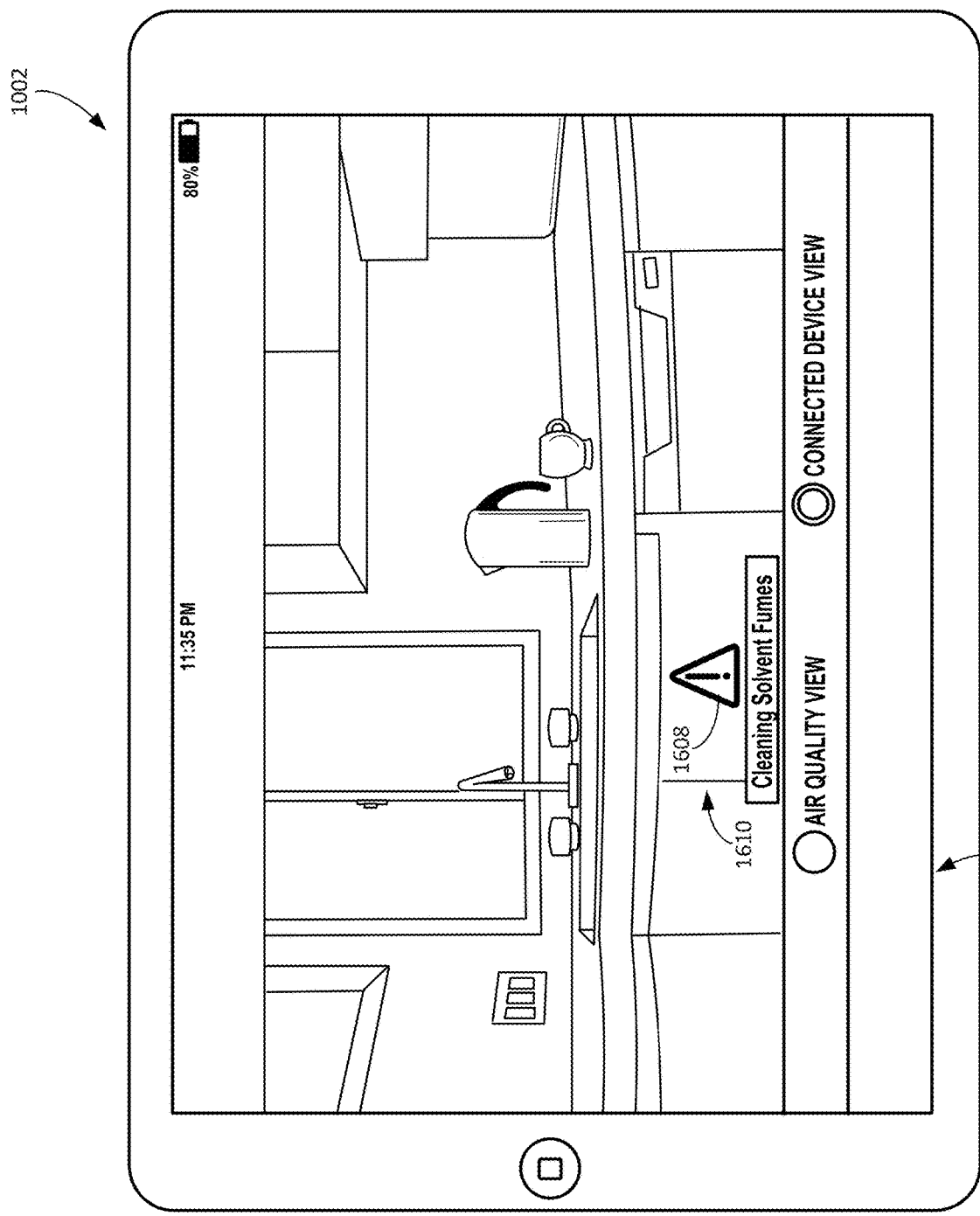

FIGS. 16A-16C depict examples in which the robot 100 collects sensor data to be used for generating user indicators superimposed on the interactive representation 1000 presented to the user. FIG. 16A depicts an example of sensor readings overlaid on a view 1601a of the interactive representation 1000 presented on the user terminal 1002. In some examples, an indicator 1602 is superimposed on the location of the stove 1604 in the interactive representation 1000. The indicator 1602 represents a value of a temperature reading captured by the robot 100. If the monitoring operation is a real time monitoring operation, in some cases, the temperature reading corresponds to a current temperature of the stove 1604.

If the monitoring operation is a review operation, the temperature reading corresponds to a previously captured temperature reading of the stove 1604, e.g., stored in the monitoring system 700. In some cases, to collect the sensor data for the indicator 1602, during the patrol operation 906, the robot 100 traverses through the enclosure space 10 first to a location in front of the stove 1604, then to the location at which the robot 100 captures the imagery for the view 1601a.

FIG. 16B depicts an example of an air quality indicator 1608 overlaid on a view 1601b of the interactive representation 1000 presented on the user terminal 1002. The air quality indicator 1608 is, for example, an alert indicator that indicates the presence of an airborne pollutant, e.g., solvent fumes, adjacent a kitchen cabinet 1610. The robot 100 detects the solvent fumes, for example, using the air quality sensor 616 of the sensor system 502 during the patrol operation 906. Based on the air quality indicator 1608, the user may perform an action to address the underlying cause of the air quality indicator 1608, for example, by sealing a container containing the solvent.

In some implementations, the air quality indicator 1608 indicates a type of the airborne pollutant, e.g., particulate matter, sulfur oxides, nitrogen oxides, volatile organic compounds, carbon monoxide, ammonia, ground-level ozone, pollen, dust, or other particulate matter. The air quality indicator 1608 indicates, for example, the presence of the airborne pollutant detected by the robot 100 during the patrol operation 906 through the enclosure space 10. The air quality indicator 1608 indicates, for example, that an amount of the airborne pollutant is unsafe for a human in the enclosure space 10.

FIG. 16C depicts an example of a view 1601c on which a temperature indicator 1612 and a moisture indicator 1614 are superimposed. The temperature indicator 1612 indicates the temperature at a location of the enclosure space 10 that is not near the location at which the imagery for the view 1601c was captured. The location of the temperature indicator 1612 is, for example, within another zone of the enclosure space 10, farther than 1, 2, or 3 meters from the location for the view 1601c, etc. The moisture indicator 1614 indicates the moisture content near a ceiling 1618 of the enclosure space 10. Based on the temperature indicator 1612 and the moisture indicator 1614, the user can operate the HVAC system 804, ventilation devices, air conditioning devices, humidifying devices, or other devices to adjust the temperature and the moisture content of the enclosure space 10 to a desired temperature and moisture content.

In some implementations, a 2D or a 3D map of a condition of the enclosure space 10 is generated based on the sensor readings of the condition. For example, if the condition is an air quality, the system 700 generates a 2D or 3D map of the air quality through the enclosure space 10. The user terminal 1002 is operable to present the map to the user. If the map indicates a specific area of the enclosure space 10, e.g., a particular zone, has relatively lower air quality, the user can perform corrective action to improve the air quality in the specific area.

In some implementations, an indicator is superimposed on the interactive representation to indicate a gradient, a trend, or other variation in a condition in the enclosure space 10. Sensor readings from the robot 100 are, for example, captured over a distance. The indicator is generated from these sensor readings and are presented on the user terminal superimposed on the interactive representation to indicate directionality or variation. For example, if the condition is temperature, the indicator includes color ranging from blue (representing cooler temperature) to blue (representing warmer temperatures) overlaid on the interactive representation to indicate the portions of the enclosure space 10 that are cooler and the portions that are warmer. Based on the presented indicator, the user can adjust operations of cooling and heating devices to create a more even temperature distribution throughout the enclosure space 10. In some implementations, the condition is air flow, the indicator includes an arrow to indicate the directionality of the air flow within the enclosure space 10. Based on this indicator, the user can determine a location of an air leak within the enclosure space 10. To improve insulation of the enclosure space 10, the user can seal the air leak. In some cases, the condition is a concentration of an airborne pollutant, and the indicator includes an arrow indicate the direction of higher concentration of the airborne pollutant within the enclosure space 10. Based on this indicator, the user can search for a source of the airborne pollutant.

In some implementations, the robot 100 generates sensor readings at each of the locations and heights that the camera 108 is operated to capture imagery within the enclosure space 10. Alternatively, the robot 100 generates sensor readings at multiple locations and heights for the camera 108 when images are not captured by the camera 108. An indicator is present within the views presented to the user at a location between waypoints L of the robot 100.

Figure 17A:
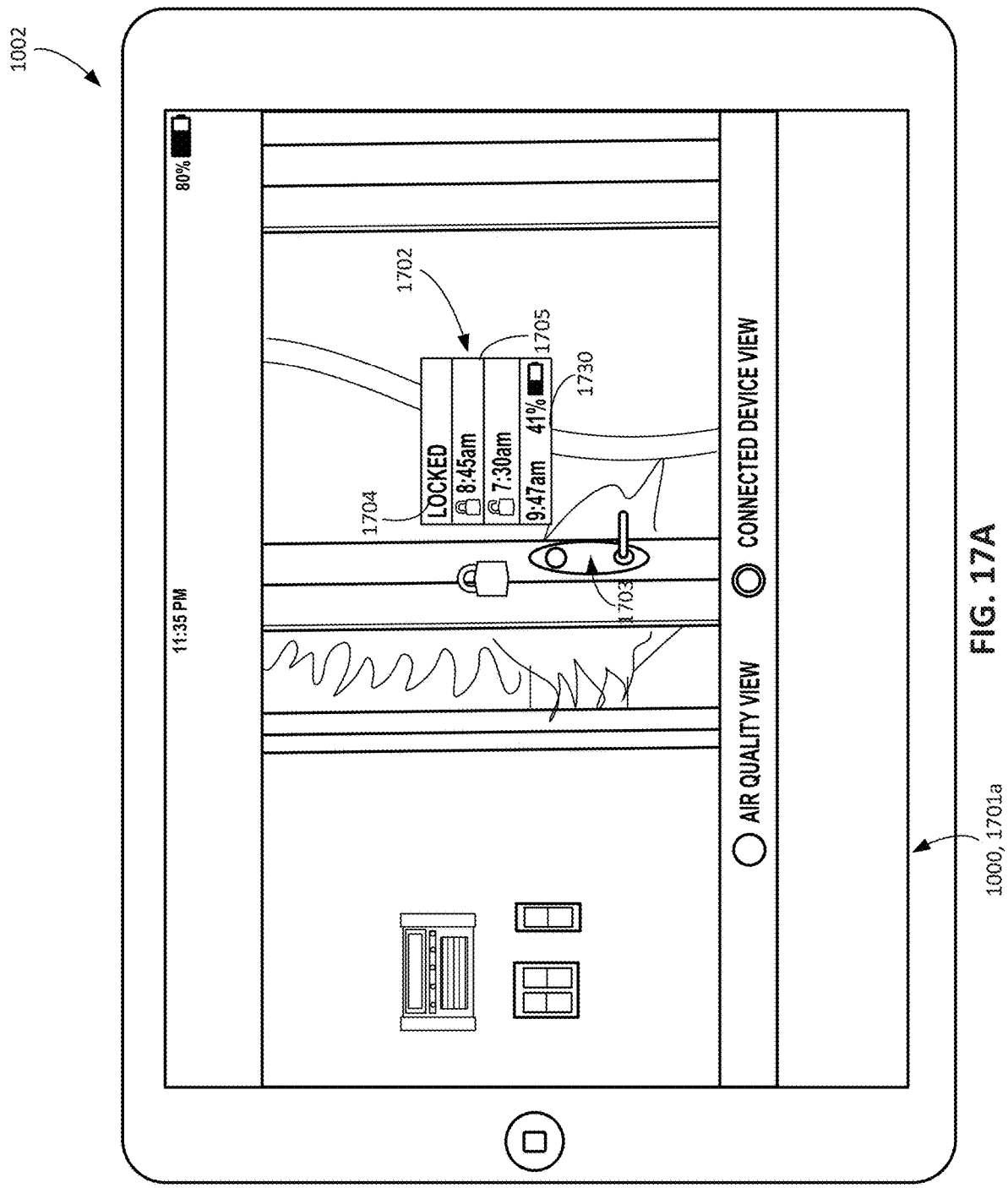
FIGS. 17A-17C are plan views of the user terminal presenting views of an interactive representation of the enclosure space overlaid with indicators of devices in the enclosure space.
Figure 17B:
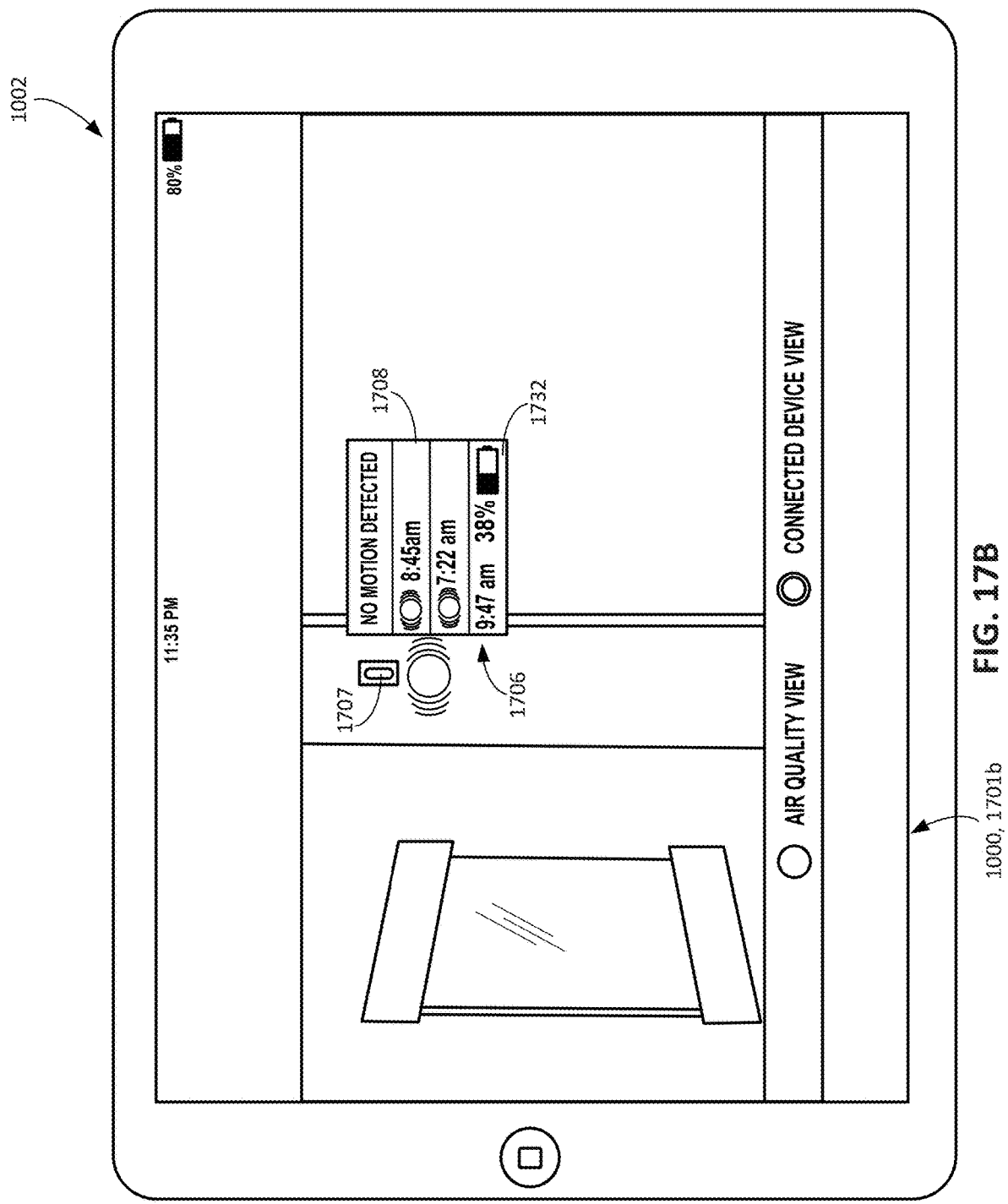
Figure 17C:
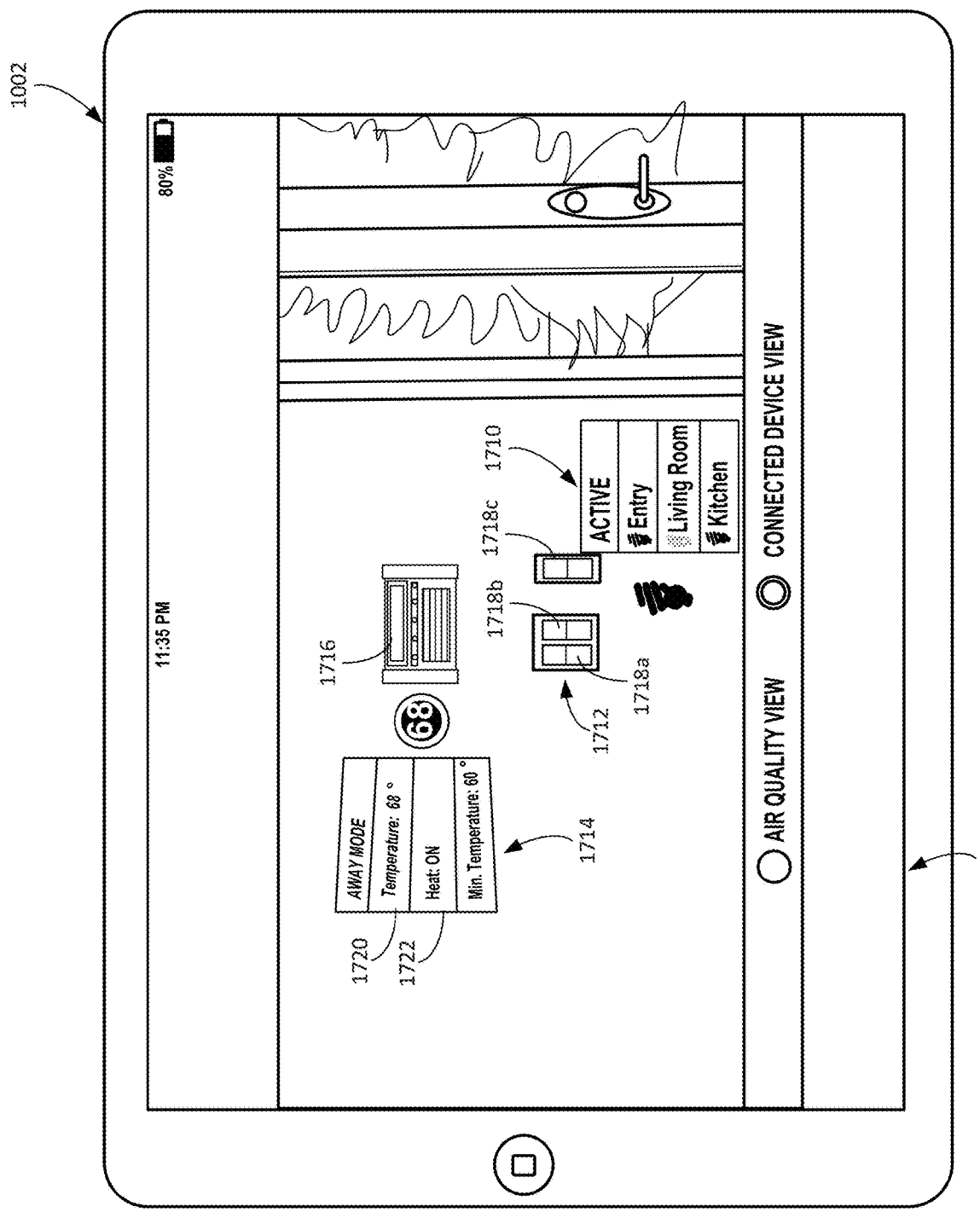

In some implementations, information associated with a device in the enclosure space 10 is overlaid or positioned adjacent to the device in the interactive representation presented to the user. FIGS. 17A-17C depict examples in which the user terminal 1002 overlays information on views based on imagery captured by the robot 100 and information collected from other connected devices 706 within the enclosure space 10. The connected devices 706, for example, gather sensor data and wirelessly transmit the data to the system 700. As described with respect to the mapping system 508, the robot 100 detects the location of each of the connected devices 706 during the patrol operation 906, and locations of the connected devices 706 are estimated in the robot map. In some cases, the connected devices 706 are identified within the views presented to the user on the user terminal 1002 based on object recognition performed on the imagery captured by the robot 100.

As described with respect to FIGS. 17A-17C, indicators, e.g., icons indicative of the connected devices, are overlaid on the interactive representation to indicate the location of connected devices and to indicate information pertaining to the connected devices. FIG. 17A depicts an example in which the user terminal 1002 presents an information box 1702 representing information received from a connected door lock 1703. The information box 1702 is superimposed on a view 1701a that includes the connected door lock 1703. The connected door lock 1703 is, for example, one of the automation controller devices described herein. The information box 1702 includes, for example, a current state 1704 of the door lock 1703 (e.g., unlocked, locked) and a history 1705 of state changes of the door lock 1703. Each listing in the history 1705 of the state of the door lock 1703 includes, for example, a time stamp associated with the state change. In some cases, the information box 1702 further includes an identity of the person who last changed the state of the door lock 1703. The information box 1706 further includes other status information 1730 of the door lock 1703, such as a battery life of the door lock 1703 and a local time for the door lock 1703.

FIG. 17B depicts an example in which the user terminal 1002 presents an information box 1706 representing information received from a motion detector 1707. The information box 1706 is superimposed on a view 1701b that includes the motion detector 1707. The motion detector 1707 is, for example, one of the environmental sensing devices described herein. The information box 1706 presents a history 1708 of motion events detected by the motion detector 1707. Each listing in the history 1708 of detect motion events includes, for example, a time stamp associated with the detection. The information box 1706 further includes other status information 1732 of the motion detector 1707, such as a battery life of the motion detector 1707 and a local time for the motion detector 1707.

FIG. 17C depicts an example in which the user terminal 1002 presents an information box 1710 representing information received from a connected lighting control system 1712 and an information box 1714 representing information received from a connected thermostat 1716. The information box 1710 and the information box 1714 are superimposed on a view 1701c that includes manually operable user control devices 1718a-1718c of the lighting control system 1712 and the thermostat 1716.

The connected lighting control system 1712 is, for example, one of the automation controller devices described herein. In the example depict in FIG. 17C, the connected lighting control system 1712 includes manually operable user control devices 1718a-1718c. The information box 1710 for the connected lighting control system 1712 includes a current state of each of the user control devices 1718a-1718c visible in the view 1701b. In particular, the information box 1710 indicates whether a lighting element associated with a given user control device is active or inactive.

The connected thermostat 1716 is, for example, both an environmental sensing device and an automation controller device. The connected thermostat 1716 includes a temperature sensor to measure a current temperature in the enclosure space 10 and a control system to operate the HVAC system of the enclosure space 10 to control the current temperature in the enclosure space 10. In the example depicted in FIG. 17C, the information box 1714 includes a current temperature 1720 measured by the temperature sensor of the connected thermostat 1716 and operational settings 1722 selectable using the control system of the connected thermostat 1716. The operational settings 1722 include, for example, a mode of operation, e.g., an "Away" mode in which the HVAC system is operated to conserve energy or a "Home" mode in which the HVAC system is operated to improve comfort levels for a human in the enclosure space 10. In some cases, the operational settings 1722 include a state of a heating operation of the HVAC system, e.g., active or inactive.

While the examples described with respect to FIGS. 16A-17C illustrate providing the user with information boxes indicative of conditions in the enclosure space 10, in some implementations, the indicators overlaid on the views presented on the user terminal 1002 include customized imagery unique to the particular condition indicated by the indicators. For example, referring to FIG. 17A, an indicator showing a locked padlock is overlaid on the view 1701a to indicate that the connected door lock 1703 is a locked state. An indicator showing an unlocked padlock is overlaid if the connected door lock 1703 is in an unlocked state.

While the examples described with respect to FIGS. 16A-17C illustrate monitoring conditions in the enclosure space 10 and providing the user with indicators of the conditions, in some implementations, the system 700 monitors the conditions in the enclosure space 10 and controls the robot 100 based on the monitoring. The system 700, for example, monitors states of connected devices, and the robot 100 performs a particular operation when a particular state of a connected device is detected. In some examples, the robot 100 moves near the connected device and then captures imagery. The captured imagery is then transmitted in real time to the user terminal 1002 to enable presentation of views of the connected device in real time. The views of the interactive representation are presented in real time so that the user can be quickly notified of a state of the connected device and, if appropriate, change the state of the connected device accordingly.

In some implementations, the particular state and the particular operation are both selected by the user. Examples of these states and operations are described with respect to FIGS. 17A-17C. In some examples, referring back to FIG. 17A, the user operates the user terminal 1002 to select a setting of the robot 100 that causes the robot 100 to provide real time views of the connected door lock 1703 when the connected door lock 1703 is in an unlocked state. In some cases, the setting causes the robot 100 to perform such operations when the connected door lock 1703 is in the unlocked state for a predefined duration of time, e.g., 5 to 30 minutes. When the connected door lock 1703 is in the unlocked state, the robot 100 autonomously moves to a region within the enclosure space 10 near the connected door lock 1703. The user terminal 1002 presents the interactive representation shown in FIG. 17A to indicate to the user that the connected door lock 1703 is in the unlocked state. In some examples, the user interacts with the interactive representation to change the state of the connected door lock 1703 from the unlocked state to the locked state. Alternatively, the user manually interacts with the connected door lock 1703 to place the connected door lock 1703 in the locked state.

In some examples, referring back to FIG. 17B, the user operates the user terminal 1002 to select a setting to cause the robot 100 to perform an operation in response to detection of motion by the motion detector 1707. In particular, each time the motion detector 1707 detects motion, the robot 100 performs an operation to autonomously move to a region within the enclosure space 10 near the motion detector 1707. In some cases, the robot 100 performs the operation in response to detection of motion by the motion detector 1707 only when the user is not present within the enclosure space 10. The user terminal 1002 presents, in real time, the interactive representation shown in FIG. 17B to notify the user that the motion detector 1707 has detected motion. The view on the user terminal 1002 can thus, in real time, inform the user of the source of the motion detected by the motion detector 1707. Alternatively, rather than moving to the region near the motion detector 1707, the robot 100 performs a patrol operation through the enclosure space 10 to each of the waypoints when the motion is detected by the motion detector 1707.

In some examples, referring back to FIG. 17C, the user operates the user terminal 1002 to select a setting to cause the robot 100 to perform an operation in response to the connected thermostat 1716 detecting a particular value of temperature. The value of the temperature is, for example, outside a predefined range of temperature. The predefined range is, for example, between 15 and 30 degrees Celsius, e.g., between 18 and 24 degrees Celsius, 20 and 22 degrees Celsius, 59 degrees Fahrenheit and 86 degrees Fahrenheit, 65 degrees Fahrenheit and 75 degrees Fahrenheit, 68 degrees Fahrenheit and 72 degrees Fahrenheit. The predefined range, in some cases, is a user-selected range. The robot 100 autonomously moves to a region within the enclosure space 10 near the connected thermostat 1716 when a temperature measured by the connected thermostat 1716 is outside of the predefined range. The user terminal 1002 presents, in real time, the interactive representation shown in FIG. 17C to notify the user that the connected thermostat 1716 has detected a temperature outside of the predefined range. The view on the user terminal 1002 can, in real time, inform the user of the source of the motion detected by the motion detector 1707.

While FIGS. 17A-17C depict connected devices shown in views of the enclosure space 10 presented to the user through the user terminal 1002, in some implementations, information pertaining to the connected devices are present in other ways. Locations of connected devices are, for example, indicated in a floorplan view, e.g., a floorplan view similar to the floorplan view depicted in FIG. 10A. The robot detects the locations of the connected devices during the patrol operation 906, and data representing the robot map including the locations of the connected devices are transmitted to enable the user terminal 1002 to present the floorplan 1001 and to present indicators indicative of the locations of the connected devices. For example, the robot 100 moves through the enclosure space during the patrol operation 906 and detects the connected devices within the enclosure space 10 including the connected door lock 1703, the motion detector 1707, the connected lighting control system 1712, and the connected thermostat 1716. These devices are placed within the robot map constructed by the robot 100. When the user accesses the floorplan view, the floorplan 1001 is presented on the user terminal 1002 with the indicators overlaid on the floorplan 1001 to provide the user with physical location context of the connected devices. The floorplan view provides the user with physical context for the connected devices so that the user can distinguish between connected devices of the same type based on locations of the connected devices in the floorplan view. The enclosure space 10 includes, for example, two connected devices of the same type, e.g., two connected lighting control systems, and the user is able to distinguish between the two connected devices based on their locations within the floorplan view.

Data associated with the connected devices are transmitted through the monitoring system 700 to enable the user terminal 1002 to be operated to monitor or control operations of the connected devices. The indicators in the floorplan view are, for example, selectable by user operation of the user input devices of the user terminal 1002 so that the user select a particular connected device and monitor and/or control the operations of the selected connected device. In this regard, even if the connected devices can be monitored and controlled through other portals accessible by the user terminal 1002, the portal associated with the robot 100 and the monitoring system 700 enables the user to monitor or control operations of several connected devices without having to switch between different portals. Rather than operating the user terminal 1002, to control and monitor the connected devices through different applications accessing several portals, the user can control the user terminal 1002 using a single application that can receive and transmit data through each of the portals. Alternatively, the monitoring system 700 can be configured in such a manner that the connected devices generate and transmit data through the monitoring system 700 such that the user terminal 1002 only accesses a single portal to control the operations of several connected devices. The user can monitor and control operations of the robot 100 in one application and also monitor and control operations of the connected devices in the same application.

Sensor data collected by the selected connected device is transmitted through the monitoring system 700, and the user terminal 1002 then presents the data to the user through the user terminal 1002 when the user selects the particular connected device from the floorplan view. Alternatively or additionally, data indicative of commands selectable by the user to control operations of the connected device is transmitted through the monitoring system 700, and the user terminal 1002 then presents the data to the user through the user terminal 1002 when the user selects the particular connected device from the floorplan view. The user then operates the user terminal 1002 to select an operation to be performed by the selected connected device. The user terminal 1002 transmits, to the monitoring system 700, data representing a command to perform this operation. In particular, the data are transmitted to cause the selected connected device to perform the user-selected operation.

In some cases, the connected device generates the sensor data or the command data and directly transmits the data through the monitoring system 700. In some cases, the connected device generates the data and transmits the data to an external portal that is accessible by the user to monitor and control the connected device. The monitoring system 700 accesses the data from the external portal to enable the user terminal 1002 to present the data to the user through the interactive representations described herein. In some cases, if a command is selected through the interactive representation, data representing the command is directly transmitted to the connected device to control the operation of the connected device. Alternatively, the command data is transmitted to the external portal from the monitoring system 700 to control the operation of the connected device.

In some examples, if the connected device is the connected door lock 1703 described with respect to FIG. 17A, selection of the indicator representing the connected door lock 1703 from the floorplan view causes the user terminal to present data representing a current state of the door lock 1703. If the user operates the user terminal 1002 to select and transmit a command, the command causes, for example, the connected door lock 1703 to be switched from the unlocked state to the locked state or vice versa.

In some examples, the connected device is the connected lighting control system 1712 described with respect to FIG. 17C. Selection of the indicator representing the connected lighting control system 1712 from the floorplan view causes the user terminal 1002 to present data representing a current state of the connected lighting control system 1712, e.g., the current state of each of the manually operable user control devices 1718a-1718c of the connected lighting control system 1712. Upon selecting the connected lighting control system 1712 from the floorplan view, the user is able to operate the user terminal to select and transmit a command to cause, for example, a state of one or more of the manually operable user control devices 1718a-1718c to switch from an on state to an off state or vice versa.

Other Alternative Examples

A number of implementations of autonomous mobile robots, monitoring systems, monitoring processes, and other related methods, systems, and devices have been described. Other alternative implementations are within the scope of this disclosure.

In some implementations, examples of user terminals described herein include a touchscreen, and the user performs specific interactions with a user terminal to alter views of the enclosure space presented on the user terminal. The user, for example, performs swiping operations on the touchscreen to modify the view presented on the user terminal. In some cases, the view is modified by causing the robot 100 to rotate and thereby alter the imagery captured by the robot 100. In some examples, a leftward or a rightward swipe causes a rotation of the view presented on the user terminal. A magnitude of the rotation is proportional to a length of the swipe. In some examples, an upward or a downward swipe causes an upward or downward translation of the view presented on the user terminal. A magnitude of the translation is proportional to a length of the swipe.

While the robot 100 is described as capturing imagery during the setup operation 902, in some implementations, the robot 100 generates other sensor data during its traversal through enclosure space 10 during the setup operation 902. The robot 100, for example, uses the sensor system 502 to generate sensor data pertaining to a condition of the enclosure space 10 during the setup operation 902. Based on the sensor data, the robot 100 determines an operational parameter for the camera setting during the patrol operation 906. In some examples, the robot 100 uses the light sensor 618 to measure ambient light within the enclosure space 10 at a particular time of the day. Based on sensor data generated by the light sensor 618 during the setup operation 902, the lighting conditions in the enclosure space at the time of the day are determined. In turn, based on the lighting conditions, a schedule is generated. The schedule generated during the waypoint selection operation 904, for example, is generated based on the lighting conditions.

In some examples of the patrol operation 906, the robot 100 moves along the route 200 to one of the waypoints L, and upon arriving at the waypoint, initiates imagery capture. The camera 108 is rotated to capture imagery having an angular extent as determine during the waypoint selection operation 904. Alternatively, the robot 100 arrives at a waypoint, and the camera 108 is rotated by the amount of rotation to capture imagery having the angular extent. During this initial rotation, the camera 108 does not necessarily capture imagery, but rather detects lighting conditions around the waypoint, e.g., using the light sensor 618 of the sensor system 502 or a light meter of the camera 108. Based on the lighting conditions about the waypoint, the camera 108 is rotated again. During this subsequent rotation, the camera 108 is operated to capture imagery having the desired angular extent. As the camera 108 is operated to capture the imagery, the robot 100 controls other settings of the camera 108 to control an exposure of the captured imagery are selected based on the lighting conditions detected during the first rotation. For example, the aperture settings, the shutter speed settings, and the exposure index are controlled during the subsequent rotation based on the detected lighting conditions. Such a process enables the captured imagery to be adjusted according to varying light conditions in the enclosure space 10 at each waypoint. The initial rotation of the camera 108 allows the camera settings to be controlled based on lighting conditions detected immediately before the camera 108 is operated to capture the imagery.

While the examples in FIGS. 10A-10C describe a single route 200, in some implementations, during the waypoint selection operation 904, multiple sets of locations are selected to define multiple routes through the enclosure space 10. In some examples, during the waypoint selection operation 904, the user creates different routes for different modes of operation for the robot 100. For example, the user may create one route for when the enclosure space 10 is occupied and another route for when the enclosure space 10 is unoccupied. During the patrol operation 906, the robot 100 follows one of the routes through the enclosure space 10.

While the user terminal has been described to be operable to present a single view of the interactive representation, in some implementations, the user terminal presents multiple views of the interactive representation at once. In some examples, in a thumbnail view mode, the user terminal presents a thumbnail view that includes each of the multiple views formed from the imagery captured by the robot 100 at a single waypoint. As shown in FIG. 10C, to invoke the thumbnail view mode, the user invokes the user interface element associated with a "Thumbnail View" input button 1018. The thumbnail view, for example, corresponds to a panoramic thumbnail view formed from multiple images captured at the waypoint with the camera 108 at different orientation settings. Alternatively or additionally, the thumbnail view is formed from multiple images captured at the waypoint with the camera 108 at different height settings. In some examples of the thumbnail view mode, the user terminal presents a thumbnail view for each waypoint L of the enclosure space 10.

While information from stationary devices has been described to be overlaid on the interactive representation in FIGS. 16A-16C and 17A-17C, in some implementations, the user terminal 1002 presents information associated with moving objects in the enclosure space 10. In some examples, the user terminal 1002 presents a predicted path of an object moving through the enclosure space 10. The robot 100, for example, captures sequential imagery of the object as the object moves through the enclosure space 10. Based on the imagery, a path of the object is predicted and overlaid on the interactive representation presented to the user. In some implementations, the predicted path is further based on information collected from one of the connected devices 706. The connected device 706 includes, for example, a motion sensor to estimate a pose of the object relative to the connected device 706, relative to the robot 100, or relative to another object in the enclosure space 10.

While the interactive representation has been described to be formed from data collected from a single robot, in some implementations, the interactive representation is formed from data collected from multiple robots, e.g., such as the robot 100. The enclosure space 10 includes, for example, multiple autonomous monitoring robots that traverse the enclosure space 10 to capture imagery of the enclosure space 10. The system 700 combines the data and provides an interactive representation based on the imagery captured by each of the robots. In some implementations, the interactive representation is formed from data collected from multiple robots and from data generated by one or more of the connected devices 706.

While the user terminal has been described to be operable to change a view of the interactive representation, in some cases, the user operates the user terminal to superimpose an indicator, a message, or other digital item onto the interactive representation. If the interactive representation is presented on a user terminal at a later time, the digital item remains superimposed on the interactive representation, e.g., fixed to a location in the enclosure space 10 at which the digital item was originally superimposed. The user can place the digital item to provide information to another user with access to the interactive representation. The digital item includes, for example, messages for a remote user at a remote user terminal and/or other users within the enclosure space 10. In some implementations, the digital items include indicators of a restricted zone, e.g., the restricted zone 1100, in the enclosure space 10.

The robots described herein can be controlled, at least in part, using one or more computer program products, e.g., one or more computer programs tangibly embodied in one or more information carriers, such as one or more non-transitory machine-readable media, for execution by, or to control the operation of, one or more data processing apparatus, e.g., a programmable processor, a computer, multiple computers, and/or programmable logic components.

Operations associated with controlling the robots described herein can be performed by one or more programmable processors executing one or more computer programs to perform the functions described herein. A computer program can be written in any form of programming language, including compiled or interpreted languages, and it can be deployed in any form, including as a stand-alone program or as a module, component, subroutine, or other unit suitable for use in a computing environment. Control over all or part of the robots described herein can be implemented using special purpose logic circuitry, e.g., an FPGA (field programmable gate array) and/or an ASIC (application-specific integrated circuit).

The controllers described herein can include one or more processors. Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as mass PCBs for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

The implementations described herein elsewhere may be modified in ways in addition to those described herein. Accordingly, other implementations are within the scope of the claims that follow.

What is claimed is:

1. A method comprising:

receiving, by a user computing device in communication with a communication network, imagery captured by an autonomous mobile robot in an environment, the imagery representing at least a portion of an electronic device in the environment, the autonomous mobile robot and the electronic device being in communication with the communication network, and the electronic device having a plurality of possible statuses comprising a first status and a second status;

receiving, by the user computing device, data indicative of a current status of the electronic device; and presenting, by the user computing device and in response to the current status of the electronic device corresponding to the first status of the electronic device, a representation of the imagery captured by the autonomous mobile robot and an indicator of the current status of the electronic device, the indicator being superimposed on a first portion of the representation proximate to a second portion of the representation, and the second portion of the representation representing at least the portion of the electronic device.

2. The method of claim 1, further comprising transmitting, to the autonomous mobile robot, one or more commands to cause the autonomous mobile robot to be moved to a user-selected location within the environment, wherein the autonomous mobile robot at the user-selected location captures the imagery representing at least the portion of the electronic device and transmits the data indicative of the current status of the electronic device to the user computing device in response to the current status of the electronic device corresponding to the first status of the electronic device.

3. The method of claim 2, wherein transmitting the one or more commands to cause the autonomous mobile robot to be moved to the user-selected location within the environment comprises:
 transmitting, to the autonomous mobile robot, the one or more commands to cause a camera of the autonomous mobile robot to be moved to a user-selected height associated with a location of the electronic device, the camera capturing the imagery representing at least the portion of the electronic device.

4. The method of claim 1, wherein the autonomous mobile robot captures the imagery representing at least the portion of the electronic device during a patrol routine, wherein the representation of the imagery represents a view of the environment from a vantage point of the autonomous mobile robot.

5. The method of claim 1, wherein presenting the representation of the imagery and the indicator comprises:
 presenting an interactive representation of the environment, the interactive representation comprising the representation of the imagery and the indicator.

6. The method of claim 1, wherein the electronic device comprises a door lock, the first status of the door lock corresponds to an open state, and the second status of the door lock corresponds to a closed state.

7. The method of claim 1, wherein the current status comprises information indicative of an event detected by a sensor of the electronic device.

8. The method of claim 7, wherein the electronic device is a motion sensor, and the detected event involves motion detected in the environment.

9. The method of claim 1, wherein:
 the indicator is a first indicator, and
 presenting the representation of the imagery and the first indicator comprises presenting a second indicator of battery level of the electronic device.

10. The method of claim 1, further comprising:
 presenting an affordance overlaid on the representation of the imagery, the affordance usable by a user to operate the electronic device.

11. The method of claim 1, wherein the indicator is an enclosed information indicator superimposed on the first portion of the representation proximate to the second portion of the representation, the enclosed information indicator containing information indicative of the current status, the history of the statuses of the electronic device, and a battery life.

12. The method of claim 1, wherein:
 the data indicative of the current status of the electronic device is further indicative of a history of statuses of the electronic device, the indicator of the current status of the electronic device is further indicative of the history of the statuses of the electronic device, and
the indicator indicates time stamps associated with changes in the statuses represented in the history of the statuses.

13. The method of claim 1, wherein:
the data indicative of the current status of the electronic device is further indicative of a history of statuses of the electronic device,
the indicator of the current status of the electronic device is further indicative of the history of the statuses of the electronic device,
the indicator is a first indicator comprising textual information indicative of the current status and the history of the statuses, and
presenting the representation of the imagery and the indicator comprises:
 presenting a second indicator comprising status imagery indicative of the current status, the second indicator being superimposed on a third portion of the representation proximate to the second portion of the representation.

14. The method of claim 1, further comprising:
assigning a name to a waypoint for the autonomous mobile robot, the waypoint being associated with the electronic device;
presenting, by the user computing device, names associated with user-selectable waypoints for the autonomous mobile robot, the user-selectable waypoints comprising the waypoint, and the names comprising the name assigned to the waypoint;
receiving, by the user computing device, a user selection of the waypoint;
transmitting, to the autonomous mobile robot and in response to the user selection, a command to move the autonomous mobile robot to a location associated with the waypoint and to move a camera of the autonomous mobile robot to a height associated with the waypoint to capture the imagery representing at least the portion of the electronic device.

15. The method of claim 1, further comprising:
receiving a user selection of a particular status for causing the representation of the imagery and the indicator to be presented by the user computing device, the user selection of the particular status corresponding to a user selection of the first status.

16. The method of claim 15, further comprising:
receiving a user selection of a particular operation to be performed by the autonomous mobile robot in response to the current status of the electronic device corresponding to the particular status, the user selection of the particular operation corresponding to a user selection of an operation of the autonomous mobile robot to transmit the imagery captured by the autonomous mobile robot to the user computing device.

17. The method of claim 15, further comprising:
receiving a user selection of a particular operation to be performed by the autonomous mobile robot in response to the current status of the electronic device corresponding to the particular status, the user selection of the particular operation corresponding to a user selection of an operation of the autonomous mobile robot to move to a region within the environment in which the electronic device is located.

18. An autonomous mobile robot comprising:
a chassis;
a drive to move the autonomous mobile robot about an environment;
a camera movable relative to the chassis; and
a controller configured to wirelessly communicate with a communications network, the controller configured to perform operations comprising:
  directing the camera toward an electronic device in the environment, the electronic device connected to the communications network, the electronic device having a plurality of possible statuses comprising a first status and a second status,
  capturing, using the camera, imagery of the electronic device, and
  transmitting data to cause a remote user device to provide, in response to a current status of the electronic device corresponding to the first status, a representation of the imagery of the electronic device and an indicator of the current status of the electronic device, the indicator being superimposed on a first portion of the representation proximate to a second portion of the representation, and the second portion of the representation representing at least a portion of the electronic device.

19. The autonomous mobile robot of claim 18, wherein:
the operations comprise operating the drive to navigate the autonomous mobile robot to a location within the environment, the location being selected based on the current status of the autonomous mobile robot, and
directing the camera toward the electronic device comprises directing the camera toward the electronic device while the autonomous mobile robot is at the location.

20. The autonomous mobile robot of claim 18, wherein the electronic device comprises a door lock, the first status of the door lock corresponds to an open state, and the second status of the door lock corresponds to a closed state.

21. The autonomous mobile robot of claim 18, wherein the current status corresponds to an event detected by a sensor of the electronic device, wherein the electronic device is a motion sensor, and the detected event involves motion detected in the environment.

22. The autonomous mobile robot of claim 18, wherein:
the data indicative of the current status of the electronic device is further indicative of a history of statuses of the electronic device,
the indicator of the current status of the electronic device is further indicative of the history of the statuses of the electronic device,
the indicator is a first indicator comprising textual information indicative of the current status and the history of the statuses, and
transmitting the data to cause the remote user device to provide the representation of the imagery of the electronic device and the indicator comprises:
  transmitting the data to cause the remote user device to provide a second indicator comprising status imagery indicative of the current status, the second indicator being superimposed on a third portion of the representation proximate to the second portion of the representation.

23. A user operable computing device comprising:
a wireless communicator configured to communicate with a communication network;
a display; and
a controller operably connected to the wireless communicator and the display, the controller configured to execute instructions to perform operations comprising:
  receiving imagery captured by an autonomous mobile robot in an environment, the imagery representing at least a portion of an electronic device in the environment, the autonomous mobile robot and the electronic device being in communication with the communication network, and the electronic device having a plurality of possible statuses comprising a first status and a second status,
  receiving data indicative of a current status of the electronic device, and
  presenting, on the display and in response to the current status of the electronic device corresponding to the first status of the electronic device, a representation of the imagery captured by the autonomous mobile robot and an indicator of the current status of the electronic device, the indicator being superimposed on a first portion of the representation proximate to a second portion of the representation, and the second portion of the representation representing at least the portion of the electronic device.

24. The user operable computing device of claim 23, further comprising a user input device operable to generate one or more commands for the autonomous mobile robot,
wherein the operations further comprise transmitting, to the autonomous mobile robot, the one or more commands to cause the autonomous mobile robot to be moved to a user-selected location within the environment and to cause a camera of the autonomous mobile robot to be moved to a user-selected height, wherein the autonomous mobile robot at the user-selected location captures the imagery representing at least the portion of the electronic device.

25. The user operable computing device of claim 23, wherein presenting the representation of the imagery and the indicator of the status of the electronic device comprises:
presenting an interactive representation of the environment, the interactive representation comprising the representation of the imagery and the indicator of the status of the electronic device.

26. The user operable computing device of claim 23, wherein:
the electronic device comprises a door lock, the first status of the door lock corresponds to an open state, and the second status of the door lock corresponds to a closed state.

27. The user operable computing device of claim 23, wherein:
the data indicative of the current status of the electronic device is further indicative of a history of statuses of the electronic device,
the indicator of the current status of the electronic device is further indicative of the history of the statuses of the electronic device, and
the current status corresponds to an event detected by a sensor of the electronic device, the electronic device is a motion sensor, and the detected event involves motion detected in the environment, and
the history of the statuses of the electronic device corresponds to a history of events detected by the electronic device.

28. The user operable computing device of claim 23, wherein:
- the data indicative of the current status of the electronic device is further indicative of a history of statuses of the electronic device,
- the indicator of the current status of the electronic device is further indicative of the history of the statuses of the electronic device,
- the indicator is a first indicator comprising textual information indicative of the current status and the history of the statuses, and
- presenting the representation of the imagery and the indicator comprises:
    - presenting a second indicator comprising status imagery indicative of the current status, the second indicator being superimposed on a third portion of the representation proximate to the second portion of the representation.

\* \* \* \* \*

UNITED STATES PATENT AND TRADEMARK OFFICE
CERTIFICATE OF CORRECTION

| | | |
|---|---|---|
| PATENT NO. | : 11,662,722 B2 | Page 1 of 1 |
| APPLICATION NO. | : 16/564355 | |
| DATED | : May 30, 2023 | |
| INVENTOR(S) | : Michael J. Dooley et al. | |

It is certified that error appears in the above-identified patent and that said Letters Patent is hereby corrected as shown below:

On the Title Page

In the publication:
Column 2, Line 1 – delete "Gadgetrfy." and insert -- Gadgetify. --.

Signed and Sealed this
Twenty-fifth Day of July, 2023

Katherine Kelly Vidal
*Director of the United States Patent and Trademark Office*